US009298676B2

(12) United States Patent
Tokunaga

(10) Patent No.: US 9,298,676 B2
(45) Date of Patent: *Mar. 29, 2016

(54) LAYOUT DETERMINATION METHOD, LAYOUT DETERMINATION APPARATUS, AND LAYOUT DETERMINATION PROGRAM

(75) Inventor: Momoe Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,113

(22) Filed: Nov. 17, 2011

(65) Prior Publication Data

US 2012/0066588 A1 Mar. 15, 2012

Related U.S. Application Data

(63) Continuation of application No. 11/398,117, filed on Apr. 5, 2006, now Pat. No. 8,086,958.

(30) Foreign Application Priority Data

Jun. 29, 2005 (JP) ................................. 2005-189938

(51) Int. Cl.
*G06F 17/22* (2006.01)
*G06F 17/21* (2006.01)
*G06F 17/24* (2006.01)
*G06F 3/0481* (2013.01)

(52) U.S. Cl.
CPC ............ *G06F 17/211* (2013.01); *G06F 3/0481* (2013.01); *G06F 17/24* (2013.01)

(58) Field of Classification Search
USPC ................. 715/200–202, 204, 205, 207, 234, 715/243–246, 251–253, 273
See application file for complete search history.

(56) References Cited

U.S. PATENT DOCUMENTS

| 5,060,170 | A | * | 10/1991 | Bourgeois et al. | 715/788 |
|---|---|---|---|---|---|
| 5,333,039 | A | * | 7/1994 | Sagara | 399/4 |
| 5,796,401 | A | * | 8/1998 | Winer | 345/619 |
| 5,812,128 | A | * | 9/1998 | Sterling, IV | 715/762 |
| 6,144,974 | A | * | 11/2000 | Gartland | 715/205 |
| 6,222,947 | B1 | * | 4/2001 | Koba | 382/284 |
| 6,298,358 | B1 | * | 10/2001 | Gormish | 715/236 |
| 6,380,954 | B1 | * | 4/2002 | Gunther | 715/764 |
| 6,782,141 | B1 | * | 8/2004 | Coleman et al. | 382/291 |
| 6,826,727 | B1 | * | 11/2004 | Mohr et al. | 715/235 |
| 6,963,672 | B1 | * | 11/2005 | Watanabe et al. | 382/305 |
| 7,046,246 | B2 | * | 5/2006 | Saitou | G06T 11/206 345/440 |
| 7,212,309 | B1 | * | 5/2007 | Sellers et al. | 358/1.2 |
| 7,430,713 | B2 | * | 9/2008 | Kobashi et al. | 715/244 |
| 7,468,805 | B2 | * | 12/2008 | Lo | G06F 17/212 358/1.18 |
| 7,548,334 | B2 | * | 6/2009 | Lo et al. | 358/1.15 |
| 7,554,689 | B2 | * | 6/2009 | Tonisson | G06F 17/211 358/1.18 |
| 7,634,725 | B2 | * | 12/2009 | Nishikawa | 715/243 |
| 7,692,834 | B2 | * | 4/2010 | Matsuzaki | 358/528 |
| 7,712,026 | B2 | * | 5/2010 | Kobashi et al. | 715/243 |

(Continued)

*Primary Examiner* — Maikhanh Nguyen
(74) *Attorney, Agent, or Firm* — Canon USA Inc. IP Division

(57) ABSTRACT

A layout determination method is provided in which, if arrangement information of areas laid out on a predetermined page satisfies a condition set for the predetermined page, a distance between objects arranged on a page different from the predetermined page is changed and a relayout process is carried out. The layout determination method prevents creation of a new page even when content data to be arranged overflows from the predetermined page.

12 Claims, 42 Drawing Sheets

(56) References Cited

U.S. PATENT DOCUMENTS

| | | | |
|---|---|---|---|
| 7,735,004 B2* | 6/2010 | Kobashi et al. | 715/243 |
| 7,903,277 B2* | 3/2011 | Cudd et al. | 358/1.18 |
| 2003/0226113 A1* | 12/2003 | Altman et al. | 715/520 |
| 2004/0105127 A1* | 6/2004 | Cudd et al. | 358/1.18 |
| 2004/0255245 A1* | 12/2004 | Yamada et al. | 715/517 |
| 2005/0094205 A1* | 5/2005 | Lo | G06F 17/243 358/1.18 |
| 2005/0094206 A1* | 5/2005 | Tonisson | G06F 17/248 358/1.18 |
| 2005/0094207 A1* | 5/2005 | Lo et al. | 358/1.18 |
| 2005/0160194 A1* | 7/2005 | Bango et al. | 710/8 |
| 2005/0172224 A1* | 8/2005 | Kobashi et al. | 715/517 |
| 2005/0172225 A1* | 8/2005 | Kobashi et al. | 715/517 |
| 2005/0172226 A1* | 8/2005 | Kobashi et al. | 715/517 |
| 2006/0029293 A1* | 2/2006 | Matsuzaki | 382/298 |
| 2007/0273895 A1* | 11/2007 | Cudd et al. | 358/1.1 |

* cited by examiner

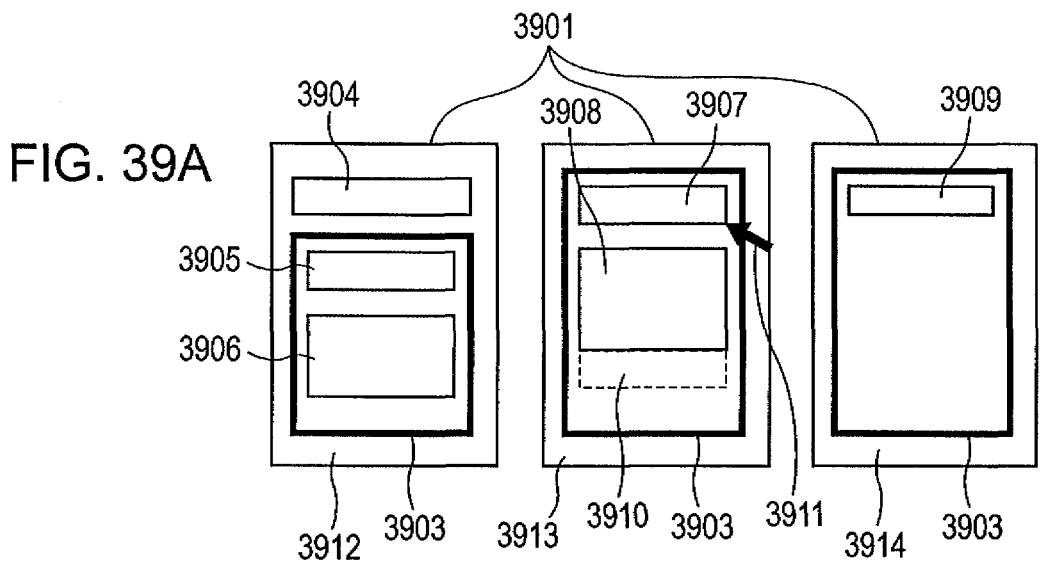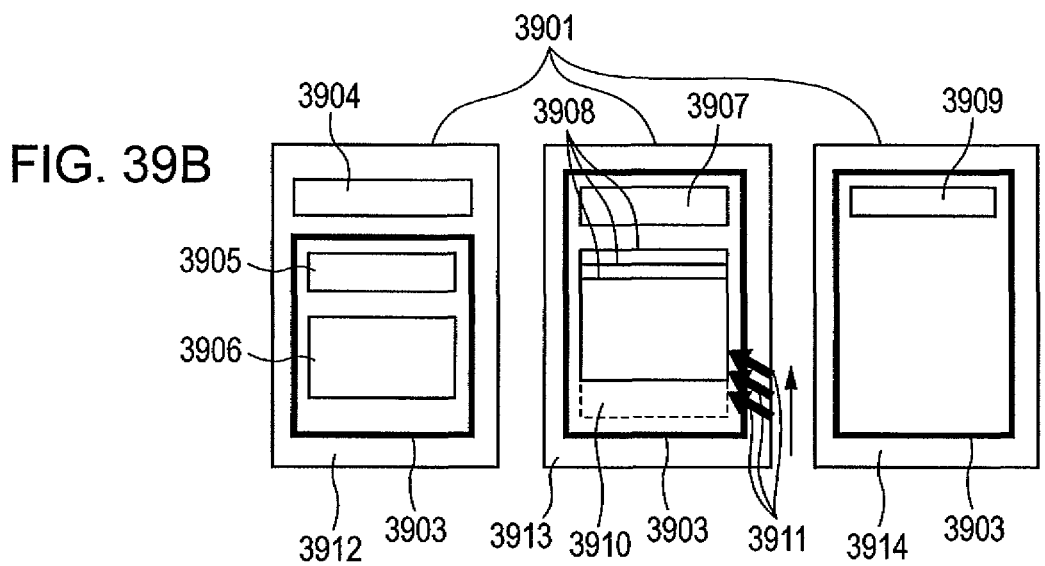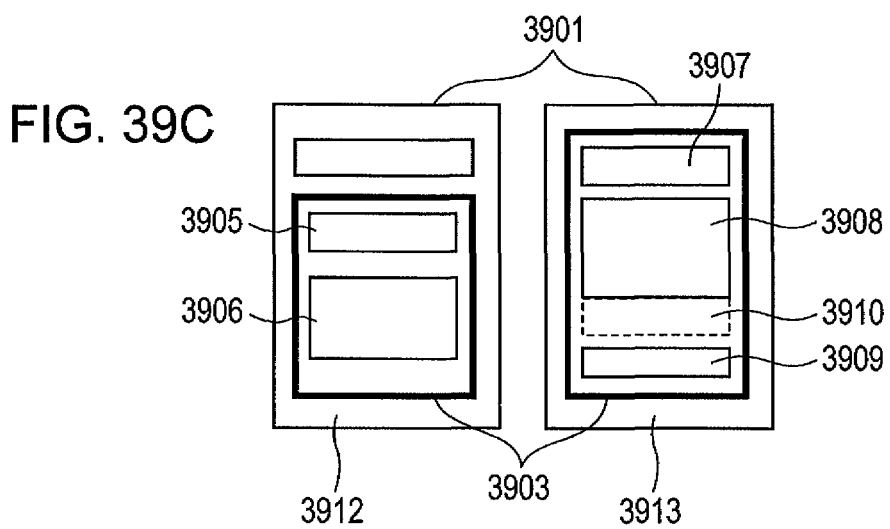

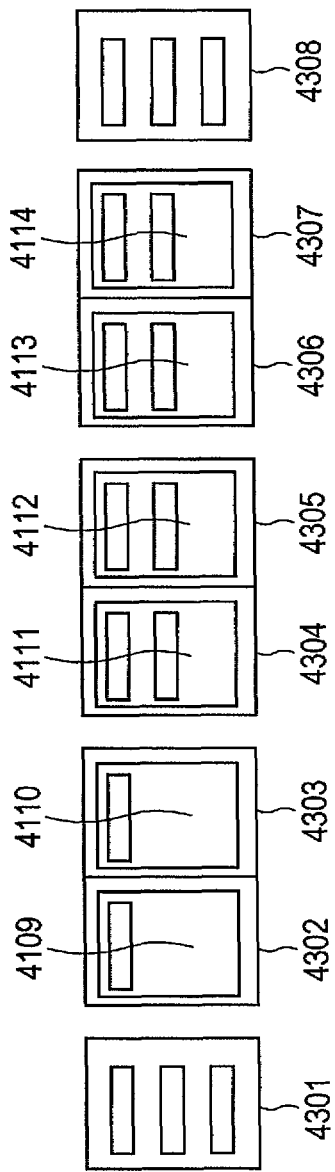
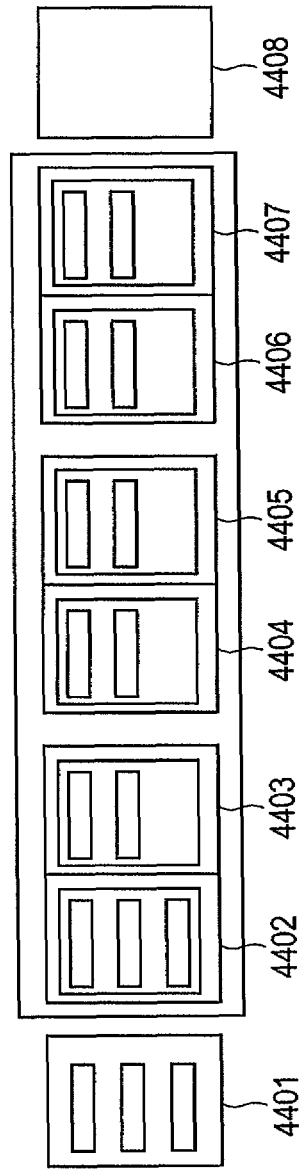

LAYOUT DETERMINATION METHOD, LAYOUT DETERMINATION APPARATUS, AND LAYOUT DETERMINATION PROGRAM

CROSS REFERENCE TO RELATED APPLICATIONS

The present application is a Continuation of U.S. patent application Ser. No. 11/398,117 filed Apr. 5, 2006, now U.S. Pat. No. 8,086,958 B2 issued Dec. 27, 2011, which claims priority from Japanese Patent Application No. 2005-189938 filed Jun. 29, 2005, the entire contents of each of which are hereby incorporated by reference.

BACKGROUND OF THE INVENTION

1. Field of the Invention

The present invention relates to an apparatus and a layout technique in an automatic layout system.

2. Description of the Related Art

Recently, with shorter product life cycles due to increasing product variety and customers' trends towards personalized service due to the widespread use of the Internet, there has been a growing demand for customer relationship management (CRM) and one-to-one marketing. These approaches contribute to the increase in customer satisfaction so that potential customers can be found and customer retention is more likely.

The customer relationship management is a technique for increasing customer satisfaction by providing a customer with a response corresponding to the customer's needs based on a customer database so as to increase the profitability of a business, such as a corporation. The one-to-one marketing is one type of database marketing technique, in which age, gender, interests, preferences, and purchase histories of customers are stored in a database, and the information is analyzed to provide a customer with a proposal personalized to the customer's need. The typical application of the one-to-one marketing is variable printing. Recently, with the advance of desktop publishing (DTP) technology and widespread use of digital print apparatuses, a variable print system that personalizes a document and prints it for each customer has been developed. Accordingly, there has been a growing need for a document in which contents whose amounts vary depending on each customer are appropriately laid out.

In known variable print systems, layout frames (also referred to as "containers") are generated on a document, the content in each container is associated with a record and a field of a database that satisfy predetermined conditions. By associating the database with the layout, the variable print can be achieved.

However, the size of a container to which text and images are inserted is fixed. Accordingly, if content data larger than the size of the container in the database is inserted into the container, the text overlaps and clipping of images occurs. By contrast, if the size of the content data is smaller than the container size, a white space is generated in the container.

To solve these problems, Japanese Patent Laid-Open No. 7-129658 discloses a technology in which, when the size of a character area becomes large, the size of the adjacent area is reduced. As a character is input to the character area, the size of the character area is increased. Also, the size of an area adjacent to the character area is reduced.

Additionally, Japanese Patent Laid-Open No. 2000-48216 discloses a technology in which a plurality of product information items (product records) is arranged in a layout area on a page.

In this technology, a master component (corresponding to a sub template in this specification) including layouts (e.g., arrangement of a product name, an image, and a price) is prepared first. A specific master component is set for each product information item. Subsequently, data for the product information item (e.g., a product name, an image, and a price) are arranged in predetermined areas in the master component. Thereafter, the data are sequentially arranged in specified locations of layout areas on a page.

The technology according to Japanese Patent Laid-Open No. 7-129658 discusses that the character area is increased as text is input. However, when the size of the character area is increased, the adjacent area is reduced to maintain a spacing therebetween. Accordingly, as the input amount of the text increases, the adjacent area disadvantageously continues to be reduced.

In addition, the technology according to Japanese Patent Laid-Open No. 7-129658 does not take into consideration a variable print system that generates a personalized document for each customer by inserting the content data into the area while associating a database with each area.

Furthermore, the technology according to Japanese Patent Laid-Open No. 2000-48216 has a possibility that a specified page to be laid out cannot contain an image component block in which data of the records are inserted depending on the number of the records to be arranged in the layout area. Japanese Patent Laid-Open No. 2000-48216 describes a technology in which, when the page to be laid out spans multiple pages, an image component block that cannot be contained in one page is automatically arranged on the subsequent page.

However, according to this technology described in Japanese Patent Laid-Open No. 2000-48216, even one image component block arranged on the subsequent page requires the generation of a new page. Consequently, the new page contains only the one image component block and a large amount of white space area. Thus, the appearance of the page is degraded. Furthermore, this may cause print costs to be higher than necessary.

SUMMARY OF THE INVENTION

The present invention provides an apparatus and a layout technique in an automatic layout system.

According to an aspect of the present invention, a layout determination method is provided in an information processing apparatus for dynamically changing a layout in accordance with content data to be laid out. The layout determination method includes (a) determining positions of areas into which the content data are inserted based on sizes of the content data and a distance between areas specified by a user, (b) determining whether arrangement information about an area arranged on a predetermined page satisfies a condition set for the page by recognizing page positions at which each of the areas is arranged based on the positions of the areas determined in (a), and (c) changing a distance between areas arranged on a page different from the predetermined page if (b) determines that the arrangement information about the area arranged on the predetermined page does not satisfy the condition set for the page. At that time, (a) redetermines the position of areas into which the content data is inserted using the distance between areas changed in (c).

According to another aspect of the present invention, an information processing apparatus for dynamically changing a layout in accordance with content data to be laid out includes first determination means for determining positions of areas into which the content data are inserted based on sizes of the content data and a distance between areas specified by a user, second determination means for determining whether arrangement information about an area arranged on a predetermined page satisfies a condition set for the page by recognizing page positions at which each of the areas is arranged based on the positions of the areas determined by the first determination means, and changing means for changing a distance between areas arranged on a page different from the predetermined page if the second determination means determines that the arrangement information about the area arranged on the predetermined page does not satisfy the condition set for the page. At that time, the first determination means redetermines the position of areas into which the content data is inserted using the distance between areas changed by the changing means.

According to still another aspect of the present invention, a computer-readable medium includes a layout determination program provided in an information processing apparatus for dynamically changing a layout in accordance with content data to be laid out. The layout determination program includes program code for executing a method including (a) determining positions of areas into which the content data are inserted based on sizes of the content data and a distance between areas specified by a user, (b) determining whether arrangement information about an area arranged on a predetermined page satisfies a condition set for the page by recognizing page positions at which each of the areas is arranged based on the positions of the areas determined in (a), and (c) changing a distance between areas arranged on a page different from the predetermined page if (b) determines that the arrangement information about the area arranged on the predetermined page does not satisfy the condition set for the page. At that time, (a) redetermines the position of areas into which the content data is inserted using the distance between areas changed in (c).

Further features of the present invention will become apparent from the following description of exemplary embodiments with reference to the attached drawings.

BRIEF DESCRIPTION OF THE DRAWINGS

FIG. 31A illustrates an exemplary priority setting dialog window while

FIG. 39A illustrates a result of a layout process is completed according to an embodiment of the present invention.

FIG. 39B illustrates a mouse operation to move a sub template according to an embodiment of the present invention.

FIG. 39C illustrates the result of a relayout process is completed according to an embodiment of the present invention.

FIG. 43 illustrates a result of a relayout process in a bookbinding print mode.

FIG. 44 illustrates a result of a relayout process in a bookbinding print mode.

DESCRIPTION OF THE EMBODIMENTS

First Exemplary Embodiment

Figure 1A:
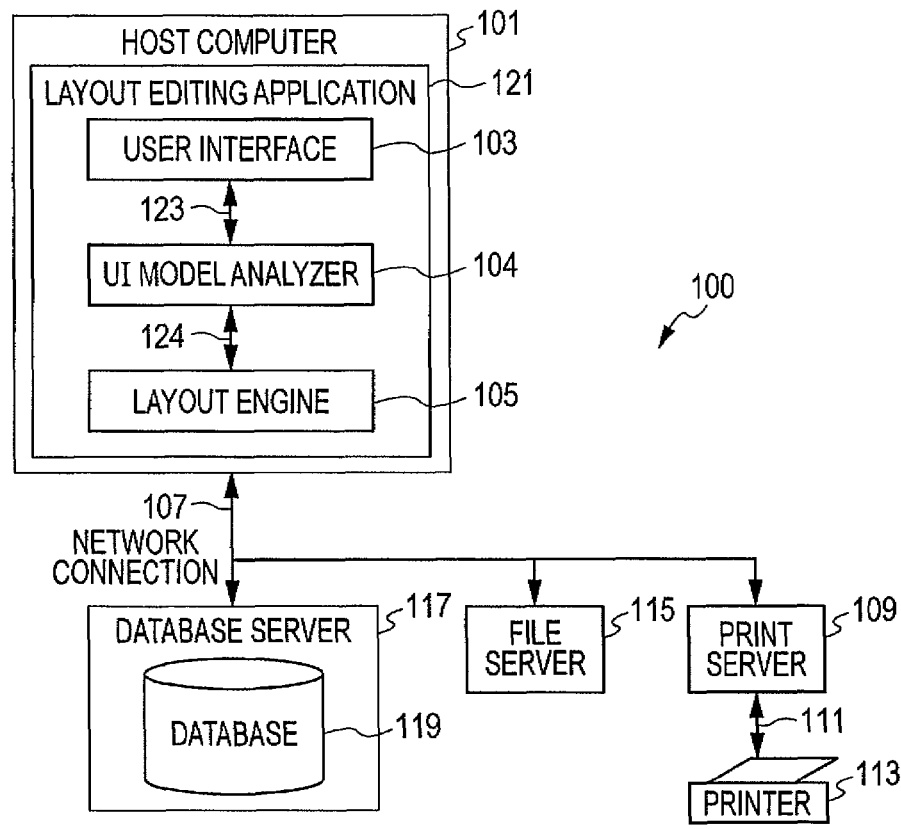
FIG. 1A illustrates an exemplary configuration of a computer system according to an embodiment of the present invention.

FIG. 1A illustrates a system 100 that prints a variable data document. A method used in the system 100 is executed by a general-purpose host computer 101, which will be described in detail with reference to FIG. 1B. A process of the system 100 is executed by the general-purpose host computer 101 illustrated in FIG. 1B. As a layout editing application program 121 executable on the system 100, the process is executed entirely or in part by software. In particular, a layout editing step and a subsequent printing step are executed in response to an instruction from software executed by the host computer 101.

The software is stored in a computer-readable medium including, for example, a storage unit, which is described below. The software is loaded to a computer from the computer-readable medium and is executed by the host computer 101. A computer-readable medium including such software and a computer program is referred to herein as a computer program product. By using the computer program product on the computer, an apparatus suitable for document layout editing and a variable print is provided.

An input unit including a keyboard 132 and a pointing device, such as a mouse 133, is connected to the host computer 101. Also, an output unit including a display unit 144 and an optional local printer 145 are connected to the host computer 101. An input/output (I/O) interface 138 can connect the host computer 101 to another computer in the system 100 via a network 107. Examples of the network 107 include a local area network (LAN) and a wide area network (WAN).

Typically, the host computer 101 includes at least one processor unit 135, a memory unit 136 (e.g., a semiconductor random access memory (RAM) or a semiconductor read only memory (ROM)), an I/O interface including a video interface 137, and another I/O interface 143 for the keyboard 132 and the mouse 133. A storage unit 139 typically includes a hard disk drive 140 and a floppy disk drive 141. The storage unit 139 may include a magnetic tape drive (not shown). A compact disc read-only memory (CD-ROM) 142 is provided as a nonvolatile data source. The host computer 101 supports an operating system, such as GNU/LINUX or Microsoft Windows, and other widely-used operating systems. The various components of the host computer 101, such as those described above, communicate with each other via a system bus 134.

Figure 1B:
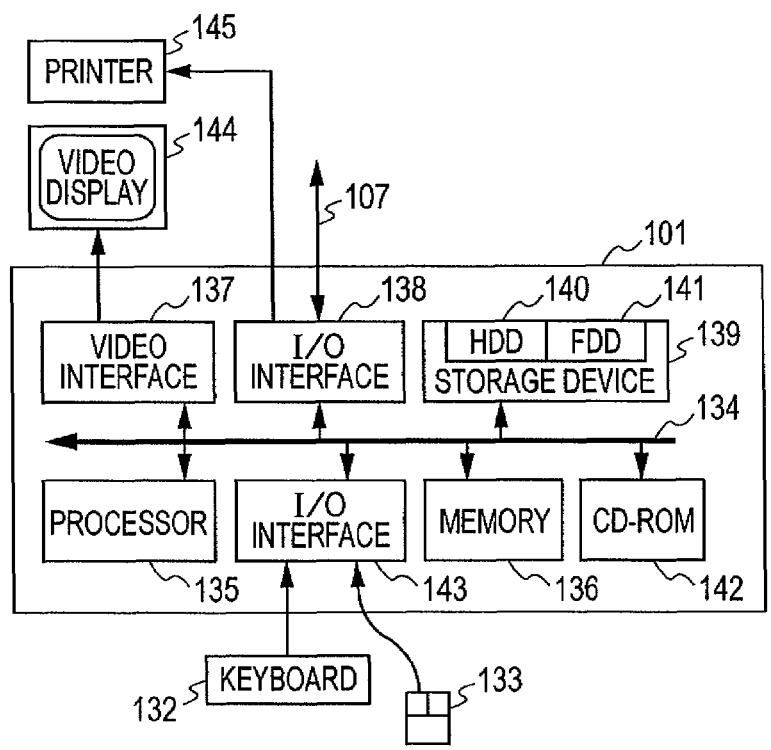
FIG. 1B illustrates exemplary computer modules of the computer system shown in FIG. 1A.

Examples of the host computer 101 shown in FIG. 1B include an IBM-compatible PC, a Sparc Station available from Sun Microsystems, Inc., and a computer system including the IBM-compatible PC or the Sparc Station.

Typically, the layout editing application program 121 is resident in the hard disk drive 140. The layout editing application program 121 is loaded, executed, and controlled by the processor unit 135. The program and data obtained from the network 107 are stored in the hard disk drive 140 or the memory unit 136. Alternatively, the layout editing application program 121 may be downloaded by a user via the network 107. Furthermore, the layout editing application program 121 may be loaded into the host computer 101 from a magnetic tape, a ROM, an integrated circuit, a magneto optical disk, a wireless communication, an infrared communication with another device, a computer-readable card (e.g., PCMCIA card), an e-mail communication, or a Web site on the Internet. These media are only examples, and other computer-readable media may be used.

The layout editing application program 121 includes three software components for performing a variable data print (VDP). The first component is a layout engine 105, which computes the positions of rectangles and lines on the basis of a limitation and size of the rectangles.

The second component is a user interface module (hereinafter simply referred to as a "user interface") 103, which provides a user with a mechanism to generate a document template and associate the document template with a data source.

The third component is a UI model analyzer 104, which converts user interface elements (e.g., container, anchor, slider, and link) provided by the user interface 103 to an internal format that can be recognized by the layout engine 105. That is, the UI model analyzer 104 allows the user interface 103 to be replaced with a user interface having a different display/input format without modifying the layout engine 105.

The user interface 103, the UI model analyzer 104, and the layout engine 105 communicate with each other via communication channels 123 and 124. In general, a database used for the document creation is a database 119 on a database server 117. The database 119 is generated by another computer that runs a database application.

The host computer 101 communicates with the database server 117 via the network 107. The layout editing application program 121 generates a document template, which is stored in the host computer 101 or a file server 115 which is usually configured by a computer different from the host computer 101. The layout editing application program 121 further generates a document composed of the document template merged with data.

The generated document is stored in a local file system of the host computer 101 or the file server 115, or is directly printed by a printer 113. A print server 109 is a computer that provides a network capability to a printer not directly connected to a network. In general, the print server 109 is connected to the printer 113 via a communication channel 111.

Figure 2:
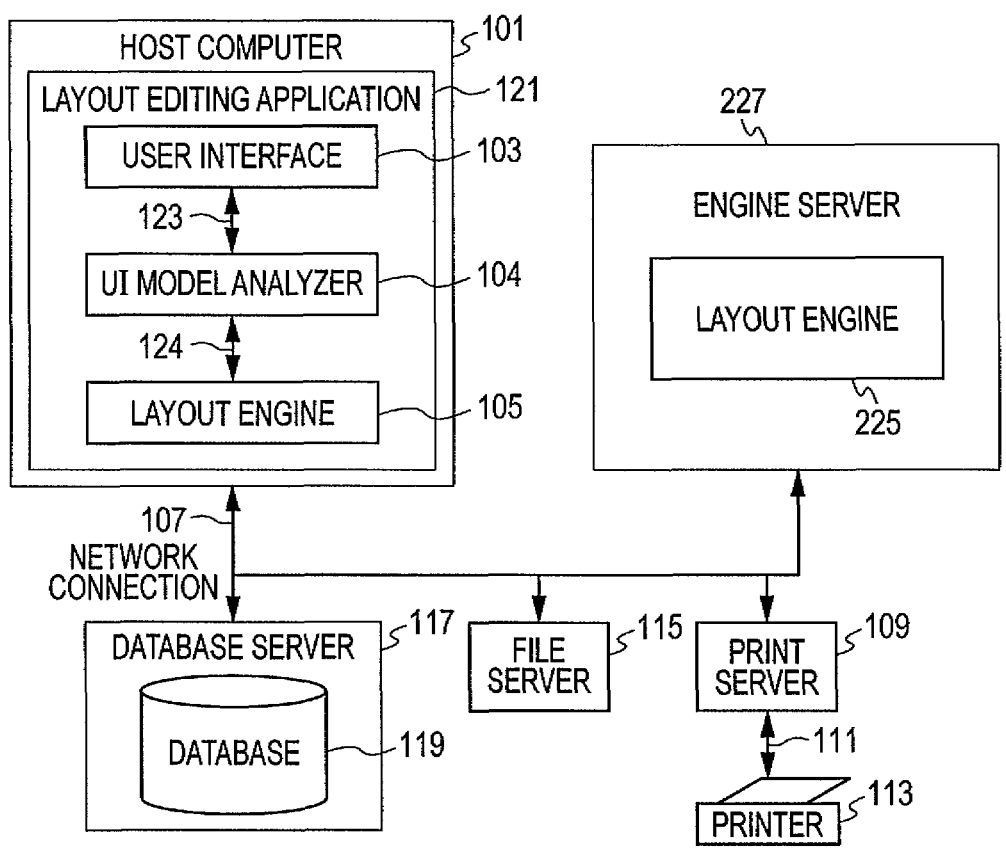
FIG. 2 illustrates an exemplary configuration of a computer system shown in FIG. 1A to which an engine server is added.

FIG. 2 is a diagram similar to FIG. 1A. However, in FIG. 2, an engine server 227 is added, which includes a separated version 225 of the layout engine 105. In general, the engine server 227 includes a computer. When being printed or being used for another purpose, a document template stored in the file server 115 can be connected to data stored in the database 119 by the separated version of the layout engine 225 so as to become a document. This operation is initiated via the user interface 103. Additionally, the layout editing application program 121 can select a specific record and print it.

Figure 40:
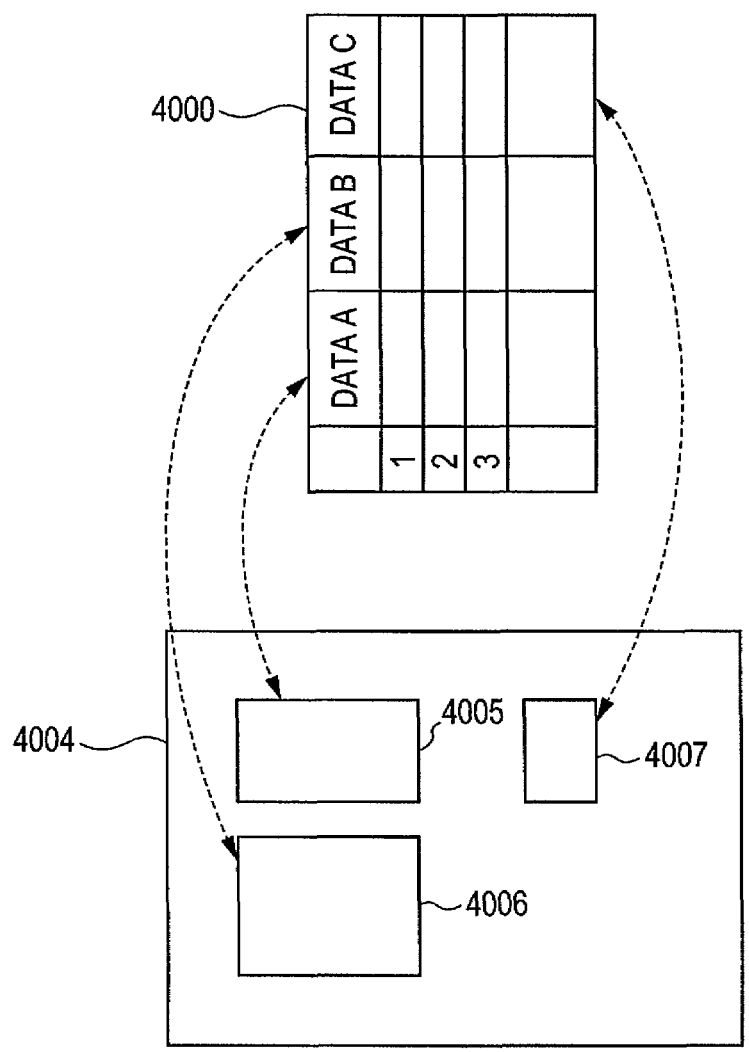
FIG. 40 illustrates a variable data print.

FIG. 40 is a diagram illustrating a variable data print process according to this embodiment. The user interface 103 of the layout editing application program 121 lays out a plurality of containers 4005 to 4007 on a page in response to a user instruction. The user interface 103 then provides constraint conditions about the positions and sizes to the containers so as to generate a document template 4004.

The user interface 103 then associates the document template 4004 with a data source 4000 (the database 119 in FIG. 1) and further associates each container with a data field in the data source 4000. The information that associates each container with a data field in the data source 4000 is written in the document template, which is stored in the hard disk drive 140 or the memory unit 136.

The data source 4000 is a file in which data items (variable data items) are stored on a record basis. The data source 4000 is stored in the hard disk drive 140. Upon receiving a print instruction or a preview instruction from a user, the layout engine 105 reads out variable data associated with the containers 4005 to 4007 of the document template from the data source 4000 and inserts the variable data into the containers 4005 to 4007 on a record basis. For example, the layout engine 105 inserts data fields A to C of a data record 1 into the containers 4005 to 4007, respectively. At that time, the layout engine 105 adjusts the size of each container in accordance with the size of data to be inserted into the container (layout adjustment). The manner in which the layout is adjusted is described later.

Upon receiving a preview instruction, the layout engine 105 generates a layout-adjusted document image and displays it on a screen of the display unit 144 as a preview. Upon receiving a print instruction, the layout engine 105 outputs a document image generated by the layout engine 105 itself or a printer driver to the print server 109 as print data. By sequentially processing the data records 1, 2, 3, . . ., a variable data print is achieved.

The data source 4000 used for generating a document may be, for example, the general-purpose database 119 on the database server 117, which is a computer that runs a database application. In this case, the host computer 101 can communicate with the database server 117 via the network 107 so as to receive the data source. The document template 4004 for a variable print generated by the layout editing application program 121 is stored in the host computer 101 or the file server 115 composed of a different computer. As described above in relation to FIG. 1A or FIG. 2, the layout engine 105 of the layout editing application program 121 generates a variable-data document composed of a document template merged with data. The generated document is stored in a local file system of the host computer 101 or the file server 115, or is transferred to the printer 113, which prints the document. The print server 109 is a computer that provides a network capability to a printer not directly connected to a network. In general, the print server 109 is connected to the printer 113 via the communication channel 111.

Configuration of Application Main Window

Figure 3:
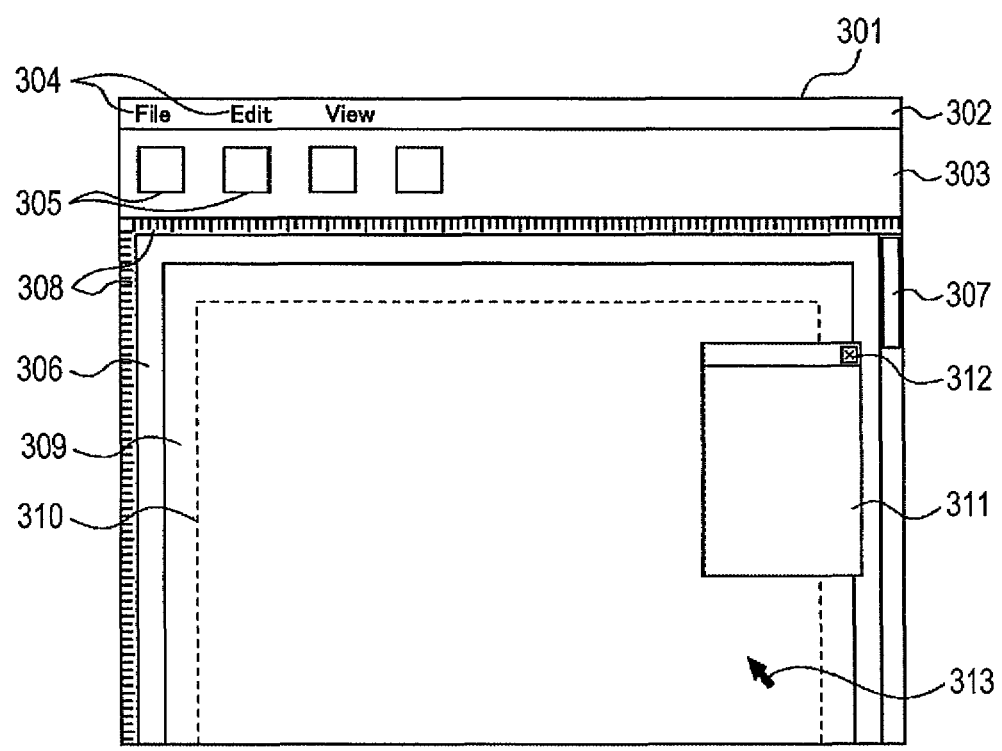
FIG. 3 illustrates a main window of a user interface according to an embodiment of the present invention.

The user interface 103 instructs the display unit 144 to display a user interface screen including an application window 301 shown in FIG. 3. The application window 301 includes a menu bar 302, a tool bar 303, a work area 306, and an optional palette 311.

The menu bar 302 and the tool bar 303 can be set to be invisible. Additionally, the menu bar 302 and the tool bar 303 can be moved to any location on the screen. By operating the mouse 133, the work area 306 can be moved on the screen as indicated by a cursor/pointer device 313 which indicates the position pointed to by the mouse 133.

Using a known technology, the menu bar 302 has a plurality of menu items 304, each of which is expandable using a hierarchy of menu options.

The tool bar 303 has a plurality of tool buttons and widgets 305, which can enter in a visible mode or an invisible mode by using a special mode of the application.

A ruler 308 is optional. The ruler 308 is used to indicate the positions of a pointer, a page, a line, a margin guide, a container or an object in the work area 306.

The palette 311 is used to access an additional function, such as a variable data library. The palette 311 has a window control 312 for moving, resizing, or closing the palette 311. The palette 311 is optional. The palette 311 is displayed in the foreground of the work area 306 or is hidden behind an object. The palette 311 may be limited to being displayed within the application window 301. Alternatively, the entire palette 311 or part of the palette 311 may be displayed outside the application window 301.

Figure 4:
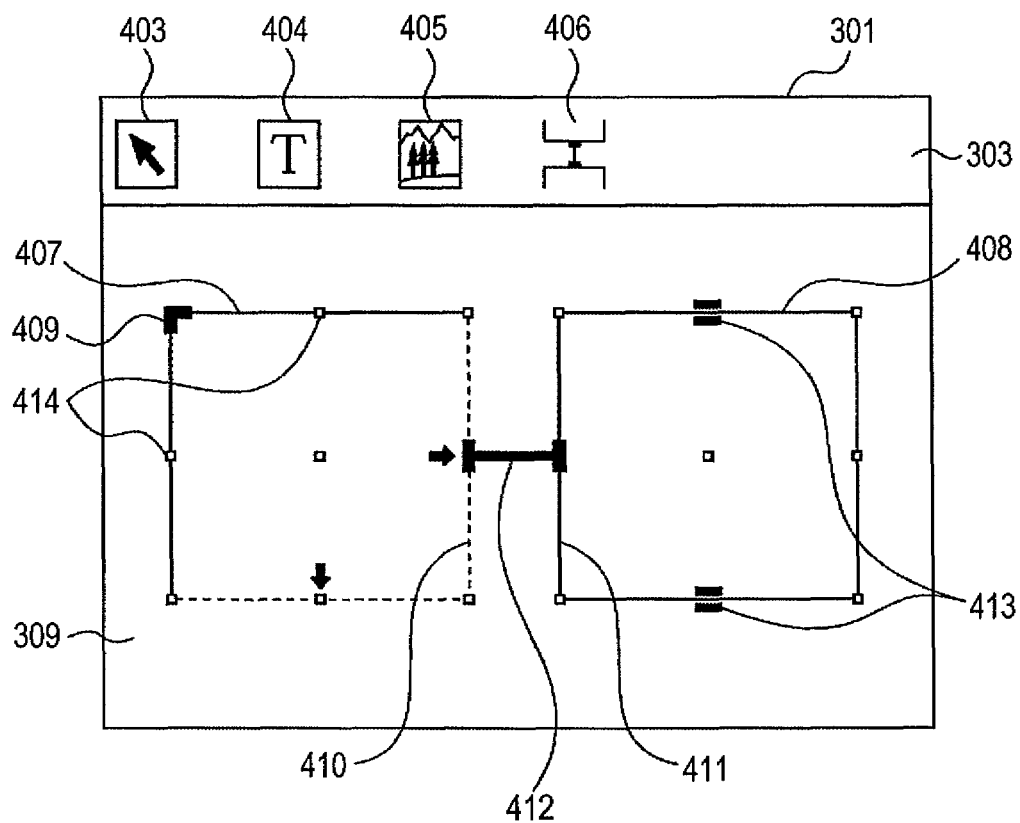
FIG. 4 illustrates exemplary containers including a link between the containers, an anchor, and a slider displayed using a screen, a tool, and an icon.

As shown in FIG. 4, the tool bar 303 includes user selectable "buttons" as follows:

(1) a select tool button 403: this is used to select a side of a container, to move the container, to resize the container, and to lock and unlock the container. By dragging a selection box around a container, the container can be selected. By selecting a plurality of containers while pressing the CTRL key, the plurality of containers can be selected;

(2) a text container tool button 404: this is used to create a container including static or variable text;

(3) an image container tool button 405: this is used to create a container including a static or variable image;

(4) a link tool button 406: this is used to create a link between containers. This is also used to control a link length.

As shown in FIG. 3, by laying out containers and links on a page, the application window 301 of the layout editing application program 121 can determine the basic layout. The term "basic layout" refers to a layout that is a base for a variable data print. When all the containers in a basic layout are fixed containers, the layouts of printouts for all the records are the same.

In contrast, when at least one container in a basic layout is a variable container, which is described below, the size and position of each container vary within the range of constraint conditions, which are described below, depending on the amount of data read out on a record basis. Accordingly, the document template generated by the layout editing application program 121 is used to determine only a basic layout. If the document template contains a variable container, the layout of a final printout is adjusted in accordance with readout data.

Document Template

In FIG. 3, the work area 306 is used to display and edit the design of a document template (hereinafter also referred to simply as a "template"). The work area 306 allows a user to view an outline of a document to be printed while the user designs a document template. Thus, the user can easily realize how the document merged with data in the database 119 changes depending on the amount of variable data.

In addition, when a database is associated with the document template, variable text or a variable image is displayed in the corresponding container so that the user can preview the current document.

Visual cues (e.g., a frame of a container, an anchor, a slider, and a link) that represent a document structure and a variable container of a document template are always displayed in a document template creation mode. In contrast, the visual cues are displayed only when a cursor is moved on a container or a container is selected in a preview mode in which variable data are inserted into the containers.

The work area 306 includes a scroll bar 307, an optional ruler 308, and a document template 309. The document template 309 can indicate the presence of a plurality of pages.

The page size of a given document template can be specified by a user using a known technique. For example, by selecting the "Page Setup" from the "File" menu, a dialog window for setting the page size appears. The user specifies the page size in the dialog window. The actual page count for each document may vary in accordance with variable data in the associated database. This is because, if the document template has a field (e.g., variable table) whose size is changed in accordance with the amount of variable data and if variable data that does not fit one page is input, an additional page may be generated automatically.

An optional border line 310 displayed in each page represents a maximum width of an object printable on the page (a page margin).

FIG. 4 illustrates examples of an object displayable on the one-page document template 309. The examples of an object include containers 407 and 408, an optional anchor icon 409, fixed sides 411 and 414, an unfixed side 410, a link 412, and sliders 413.

The anchor icon 409 can be set at a corner of a rectangular container, on the side of the container, or at the center of the container. As used herein, an "object" includes any of the elements that are displayable on a document template. When each object needs to be clearly distinguished, the object is referred to as its own name. When the anchor icon 409 is set, the position at which the anchor icon 409 is set is fixed. That is, in the example shown in FIG. 4, the anchor icon 409 is set on the upper left corner of the container 407. Accordingly, if variable data is inserted into the container 407 and if the image size or the amount of text of the variable data is large, the container 407 can be expanded towards the right direction and the downward direction.

For example, when the anchor icon 409 is set at one of the four sides of the container 407, that side is fixed and the other three sides can be expanded towards the corresponding directions. Additionally, when the anchor icon 409 is set at the center of the container 407, the center position of the container 407 is fixed and the container 407 is expandable towards the four directions while keeping the center position unchanged. Although the link 412 is described in detail below, a brief description is provided here. The link 412 indicates that the container 407 is associated with the container 408 and that the container 408 is movable to the right while keeping the length of the link 412 unchanged (the range of the length can be changed). If the link 412 is a flexible link, the length can be variable within the set range in accordance with the size of data inserted in. The sliders 413 indicate that the container 408 is movable in a direction along the sides on which the sliders 413 are set.

The container is described next. The container is a space which is located in a document template and into which a fixed or variable text/image to be rendered is inserted. This rendering space is referred to as a "partial area" or "data area." As shown in FIG. 4, a container is laid out along with other containers and objects. In response to a user instruction via a user interface screen, the container is moved, resized, or reconstructed. As used herein, data inserted into a container is referred to as "content" or "content data (variable data or field data)."

More precisely, a container has a collection of settings, a visual representation, an interacting operation, and an editing operation. The definition of a container is as follows:

(1) A container has a fixed or variable content. The variable content is dynamic, since there is a possibility that the data obtained from a database varies depending on a document, namely, a record of the database. However, since an animated image or a time-varying content generated by a method other than an animation is not suitable for a print operation, the container according to this embodiment does not contain such a variable content. Similarly, a fixed content is displayed in the same manner for all the documents using the container. However, when the fixed content is associated with a variable content using a link, the variable content may change the position of the fixed content for each document.

(2) A container has a decoration function applied to a content that is the same as a text setting function (e.g., background color setting, a border setting, and a font style setting). These settings are referred to as "container properties." The container properties can be set for each container. Alternatively, a user can specify container properties that are the same as another container's properties for a container.

(3) A container is merged with data stored in a database when a document is generated. The decoration function for any fixed content is visible in a printout. The variable content allows a specific data from a data source to be displayed. The representation of a container can be achieved on either a printout, a screen of the display unit 144, or both.

(4) A container has a user interface functioning as a visual cue as shown in FIG. 4. For example, the container has an interactive graphical user interface (GUI) for editing the container and performing graphic settings. Each element of the GUI is displayed on a screen of the display unit 144. However, the element is not printed on a document. The user interface 103 of the layout editing application program 121 has a function to display the container decoration function for, for example, a background color and a font, and further has a function to display the container settings and edit the settings.

Link

A link indicates a relationship between containers. More specifically, the relationship indicates a distance between the containers. The layout of two container associated with each other by a link is computed while considering an effect of a layout change of the other container. As shown in FIG. 4, the link 412 associates the container 407 with the container 408. A method for setting a link and a computation method of a layout of containers associated with each other by a link are described below.

Method for Setting Link

Figure 5:
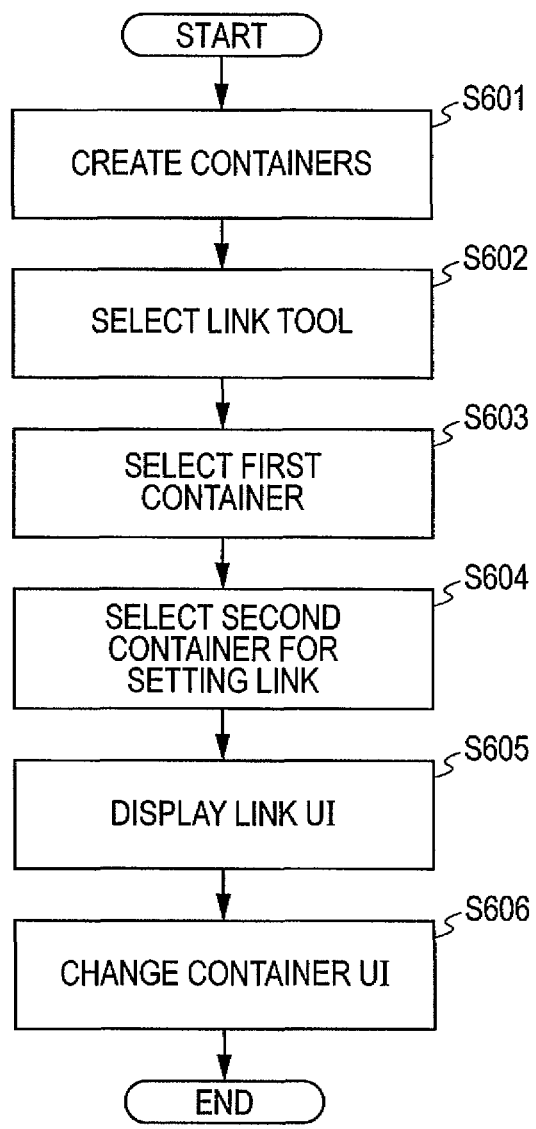
FIG. 5 is a flow chart illustrating a method for setting a link according to an embodiment of the present invention.
Figure 6:
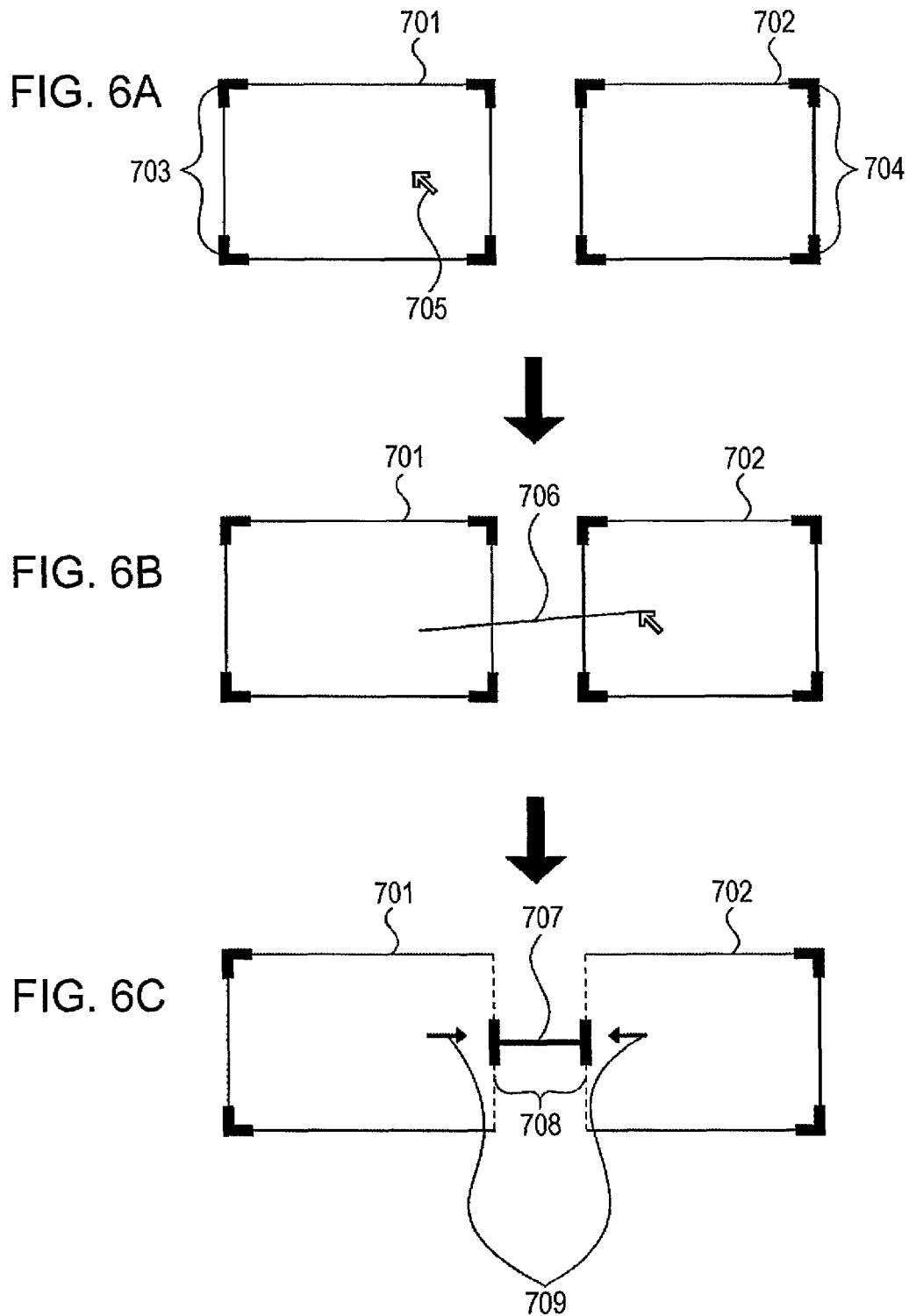
FIGS. 6A-C illustrate an example of a transition of a user interface when setting the link according to an embodiment of the present invention.

A method for setting a link that associates containers with each other is described next. FIG. 5 is a flow chart illustrating a method for setting a link. FIGS. 6A-C illustrate an example of a transition of a user interface (UI) when setting a link. The method for setting a link between containers is described with reference to FIGS. 5 and 6A-C. In this embodiment, a process in each step of the flow chart is executed by the processor unit 135 of an information processing apparatus (host computer).

At step S601, the layout editing application program 121 displays a selected document template to be edited in the work area 306 on a user interface screen. To set a link, (at least two) containers between which a link is set need to be created in the document template. FIGS. 6A-C illustrate the transition of the user interface when two containers are generated at step S601 and a link is set between the two containers.

At step S602, the layout editing application program 121 determines whether the above-described link tool is selected, that is, whether the link tool button 406 shown in FIG. 4 is clicked. Unless the link tool is selected, other processing is performed as needed and the process returns to step S602.

In FIG. 6A, containers 701 and 702 include only fixed sides. Additionally, anchor icons 703 and 704 are similar to the anchor icon 409 shown in FIG. 4 to function as anchors. A mouse pointer 705 is displayed in the container 701.

While the link tool is selected, a user selects one of the two containers (container 701 in this example) by clicking on the container, i.e., moving the mouse pointer 705 to be displayed in the container and clicking a button on the mouse 133.

In response to this operation, the user interface 103 of the layout editing application program 121 recognizes that a first container is selected (step S603). The user interface 103 then stores information for identifying the selected container in the memory unit 136. In addition, the user interface 103 displays a subsequent trace in accordance with the movement of the mouse cursor 705.

For example, a line 706 shown in FIG. 6B connects a clicked position shown in FIG. 6A to the current position of the mouse cursor. This UI allows the user to recognize at which position in the UI the link is to be set.

Subsequently, as shown in FIG. 6B, the user moves the mouse pointer to the other container (i.e., container 702), and clicks on the container. In response to this operation, the user interface 103 recognizes that a second container is selected (step S604). The layout editing application program 121 sets a link between the first container whose information is stored at step S603 and the second container whose selection is recognized at step S604.

When the link is set between the two containers 701 and 702 selected by the user, a link UI 707 is displayed (step S605). Furthermore, the container UI is displayed as shown in FIG. 6C (step S606).

That is, when the link is set, the container UI is automatically updated. Here, sides associated with the link become variable, and therefore, the sides are indicated by dotted lines. As shown in FIG. 6C, sides 708 are indicated by dotted lines and are variable.

When a link is set between the sides of containers, the sides need to become variable. Accordingly, the change in a mode of the sides of the containers shown in FIG. 6C occurs automatically. This change prevents the occurrence of inconsistency in that, although the link is set between the containers in order to adjust the layout, the adjustment of the layout cannot be carried out due to all of the sides of the containers being fixed. An indicator 709 is a visual mark that indicates, to the user, a direction in which the shapes of the containers can change after the link is set.

Although, in the example shown in FIG. 6C, the right side of the left container and the left side of the right container are changed to be variable, the change is not limited to this case. For example, the right container may be changed to the setting in which the right container has the slider 413 as shown in FIG. 4.

Layout Computing Process by Layout Engine
Layout Computing Method (Overview of Process Flow)

According to this embodiment, the layout editing application program 121 generates a container using the user interface 103. Subsequently, the layout editing application program 121 enters either a layout mode in which a layout is generated by determining the relationship between the generated containers (link setting) or a preview mode in which each record of a data source is inserted in the generated layout by the layout engine 105 and the result of the layout including the actual record is previewed. In the preview mode, the layout editing application program 121 computes the layout while inserting the content data stored in the record into the layout. It should be noted that, in the preview mode, the layout is computed only for the display. The layout engine 105 inserts data in each container and computes the layout for printing. However, the computing method for printing is the same as that in the preview mode. If a priority is assigned to a container into which content data is inserted, the layout is computed in accordance with the priority. In an example of the layout computation in accordance with a priority, the layout is computed so that the content data that is inserted into a container having a high priority is displayed while maintaining the original size (original data size).

Figure 7:
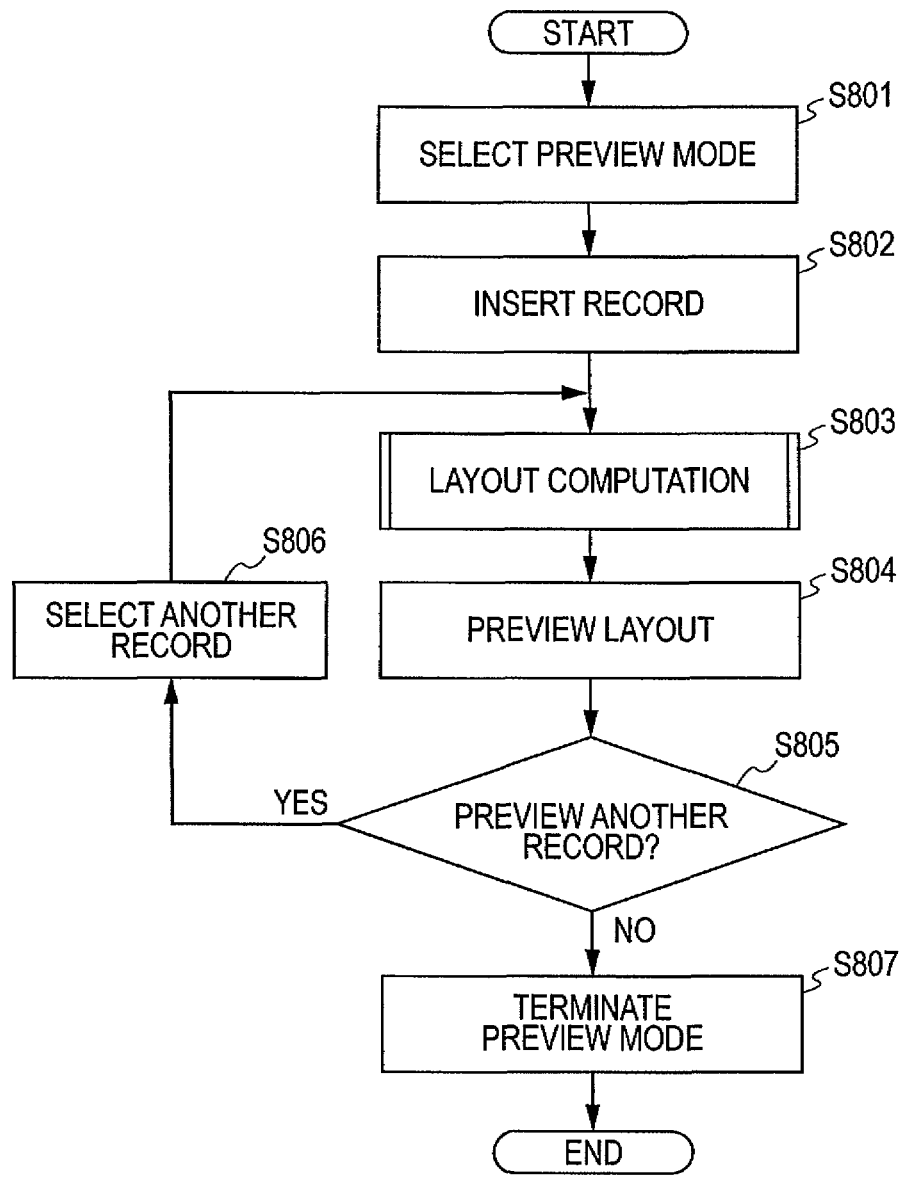
FIG. 7 illustrates a flow chart of an exemplary layout computing process by a layout engine.

FIG. 7 illustrates a flow chart of the layout computing process. A preview mode is selected first (step S801). In the preview mode, the layout editing application program 121 allows a user to select a record to be previewed from among records in a data source. The layout editing application program 121 then determines that data in each field of the selected record is inserted into the corresponding container (step S802).

If it is determined that the data of each field is inserted into the corresponding container, the layout editing application program 121 computes the layout of the record and adjusts the layout as needed (step S803). The layout computation carried out at step S803 will be described in detail below. Subsequently, the layout editing application program 121 displays the layout computed at step S803 (step S804).

The layout editing application program 121 then determines whether it carries out a preview for another record on the basis of a user instruction (step S805). If it is determined at step S805 that a preview is not necessary for another record, the layout editing application program 121 terminates the preview mode (step S807). However, if it is determined at step S805 that a preview is carried out for another record, the layout editing application program 121 selects another record, computes the layout for the selected record, and displays a preview of the record (step S806).

By contrast, during printing, a layout is sequentially computed for all the records to be printed. Accordingly, the need for step S804 is eliminated, and it is determined at step S805 whether all the records to be printed have been processed. At step S803, the result of the layout computation carried out is output for rendering. A printer driver then generates print data to output it to a printer. In this case, the process is completed when output of print data for all the records (all the records specified to be printed) is completed.

Layout Computing Method (Details)

The layout computing method carried out at step S803 is described in detail next. By applying a process according to this flow chart, the layout position and the size of an area (container or sub template described below) into which content data is inserted can be determined on the basis of the size of the content data.

Figure 8:
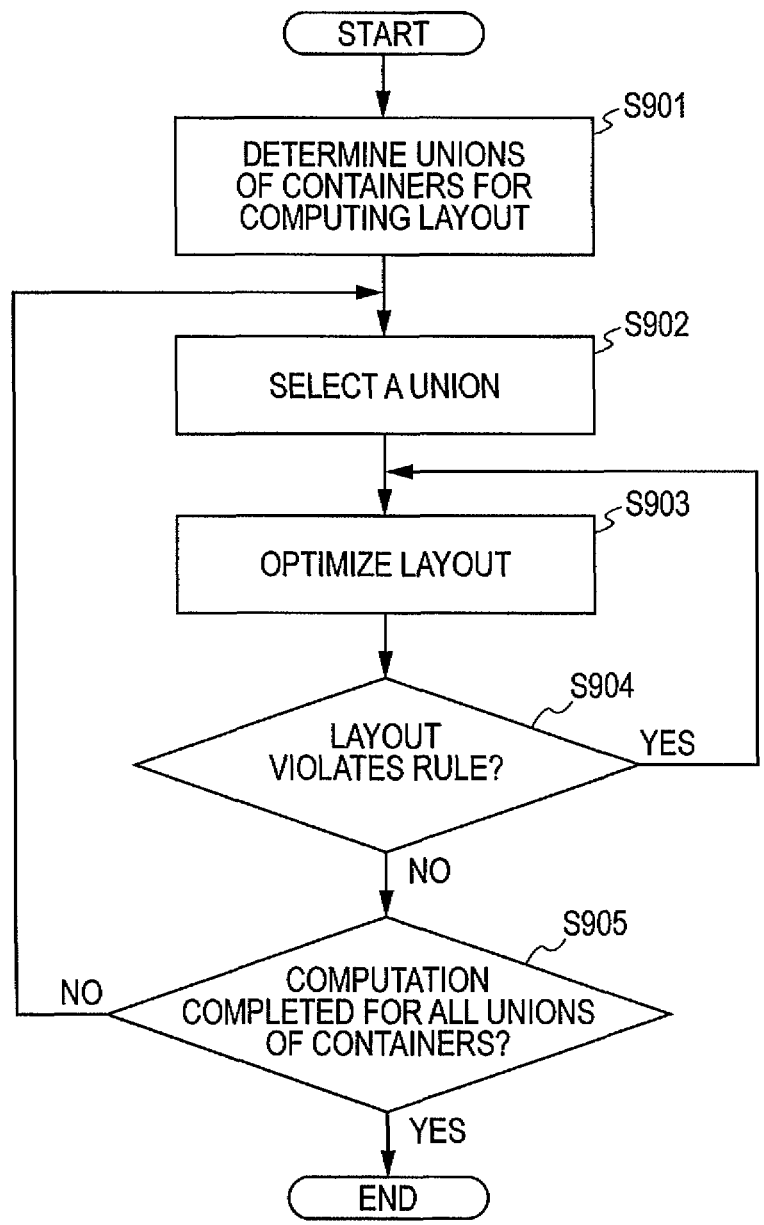
FIG. 8 is a flow chart of the layout computing method by the layout engine.

FIG. 8 illustrates a flow chart of the layout computing method when no priority is assigned to the layout. FIG. 9 illustrates an example of a UI display during the layout computation. Since the flow chart shown in FIG. 8 illustrates the layout computing method for only one record, this flow chart corresponds to a layout computing method used during a print or preview for one record of a variable data print. In the case of multiple records, the following process is repeated.

Figure 10:
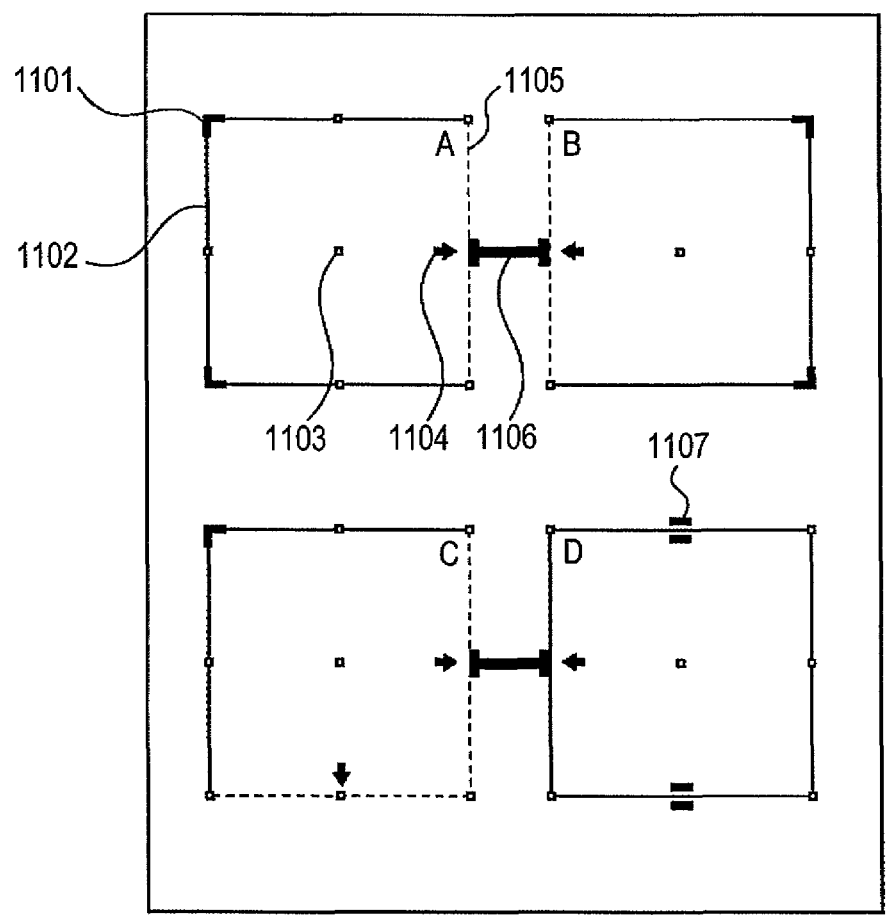
FIG. 10 illustrates an exemplary union of containers.

The layout editing application program 121 determines the unions of containers whose layouts are to be computed (step S901). Layout computation is carried out for a union of associated containers. For example, as shown in FIG. 10, four containers are laid out on a page and relationships among containers are set. In this example, a container A is associated with a container B by a link, while a container C is associated with a container D by a link. Therefore, the containers A and B form a first union and the containers C and D form a second union. That is, a group of containers connected with each other by links is identified as a union.

As described above, in FIG. 10 shown are an anchor 1101, a fixed side 1102, a controller 1103, an arrow 1104 indicating the change direction of a variable side, a variable side 1105, a link 1106, and a slider 1107.

Next, the layout editing application program 121 selects one of the unions of containers determined at step S901 in order to compute a layout (step S902). Subsequently, the layout is computed for the selected union of containers. The layout editing application program 121 computes sizes of the two containers A and B, which are variable elements included in the selected union of containers, assuming that the containers are not restricted by the size of an image or the amount of text inserted into the containers. More specifically, the layout editing application program 121 determines whether the container A is a container for image data or text data. This determination can be made by checking the attributes set for the containers.

The layout editing application program 121 then reads out the data to be inserted into the containers. If the container A is a container for image data, the size of the image data (the numbers of pixels for the width and height and the resolution) is determined to be the size of the container A when the container A has no restriction. If the container A is a container for text, the amount of text data inserted into the container A can be computed on the basis of the number of characters and the character attributes, such as the font type, font size, character pitch, and line pitch specified in the container attributes of the container A. Here, the container for text data has a restriction, since the aspect ratio of the container A cannot be determined unless the restriction exists.

In the example shown in FIG. 10, anchors are set at the upper left corner and the lower left corner of the container A, and therefore, the height (in the vertical direction) is fixed. Accordingly, the layout editing application program 121 determines whether the computed amount of data (text) can be inserted into the container A having the width (in the horizontal direction) defined in the basic pattern of the container A. If it is determined that all of the data can be inserted into the container A, the size (width and height) of the container A defined in the basic pattern of the container A remains unchanged.

However, if it is determined that all of data cannot be inserted into the container A, the container A extends horizontally since the height of the container A is fixed due to the anchor setting. The layout editing application program 121 then computes the width of the container A that enables the container A to contain the computed amount of data to be inserted so that the size of the container A is determined.

Subsequently, the layout editing application program 121 optimizes the layout such that the size of the container to be laid out is as close to the actual content size as possible (step S903). For the containers that are associated with each other and that can dynamically change their sizes, the layout is optimized such that the sizes of contents inserted into the containers are as close to the sizes of the laid-out containers as possible.

The layout editing application program 121 determines the size of the union of containers computed at step S902, namely, the total size of the containers A and B and the link 1106 (fixed link in this example). The layout editing application program 121 then computes a difference between the total size and the size of a union of the containers in a basic layout (corresponding to distances between the upper left anchor icon of the container A and the upper right anchor icon of the container B and between the upper and lower left anchor icons of the container A in the example shown in FIG. 10). If the width of the containers A or B is determined to increase at step S903, the difference appears. The layout editing application program 121 carries out layout adjustment by evenly allocating the difference to each element of the union of containers. Thus, the positions and sizes of the containers can be determined so that the difference between the sizes of the content for the content data to be inserted and the container (data area) into which the content data is inserted is minimized.

The layout editing application program 121 optimizes the layout. If the layout does not follow a rule, the layout editing application program 121 computes the layout while avoiding the rule violation. As used herein, the term "rule" refers to a constraint defined by a user during layout generation. Examples of the constraints include the variable range and the position of a container size. In the case of using a variable link, examples of the restrictions further include the variable range of the length of the link. If it is determined in step S904 that the layout violates a rule, processing returns to step S903 to perform the optimization again until it is determined in step S904 that the layout does not violate any rules.

After the layout is computed while avoiding the rule violation, the layout for the union is achieved and it is determined whether computation has been completed for all unions of the containers (step S905). If it is determined that computation has not been completed for all unions of the containers processing returns to step S902 and processes at steps 902 through 904 are performed until it is determined in step S905 that computation has been completed for all the unions on the page. Thus, the layout editing application program 121 computes the layout for the entire page (step S905), and then processing of the layout computing method when no priority is assigned to the layout (FIG. 8) ends.

Figure 9A:
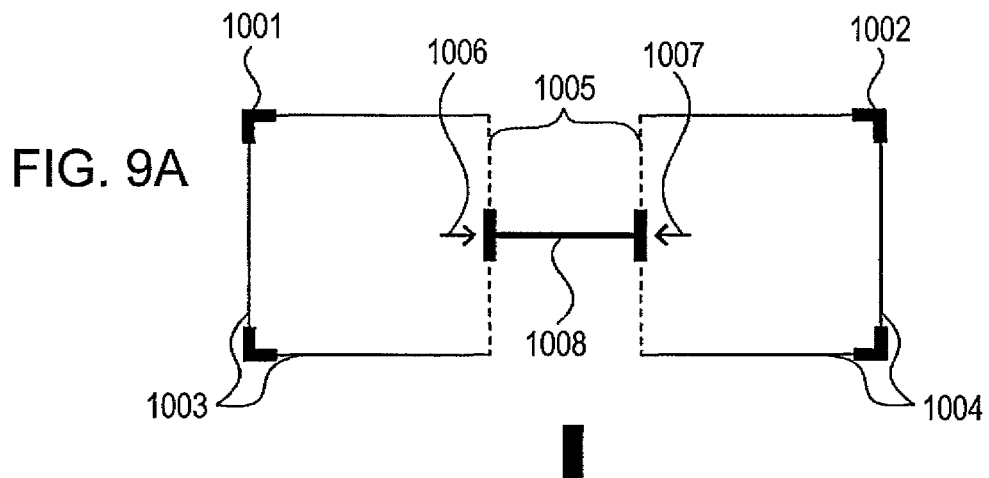
FIGS. 9A-C illustrate an example of UIs displayed during the layout computation.
Figure 9B:
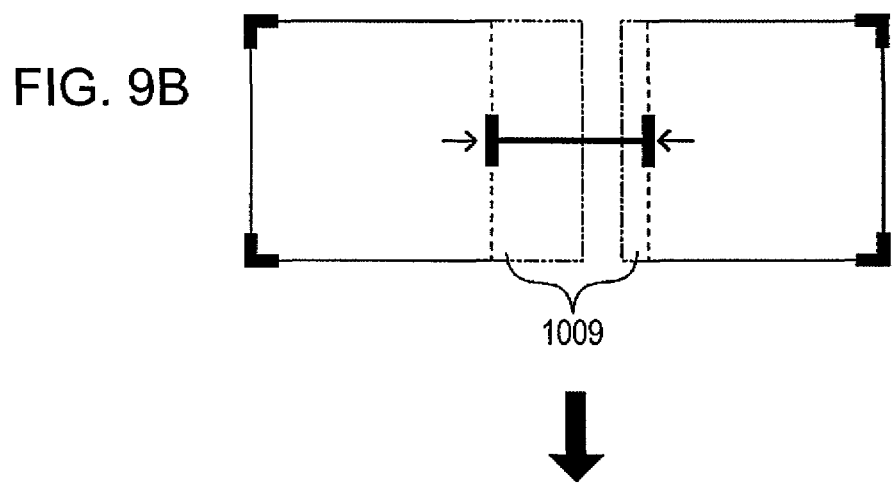
Figure 9C:
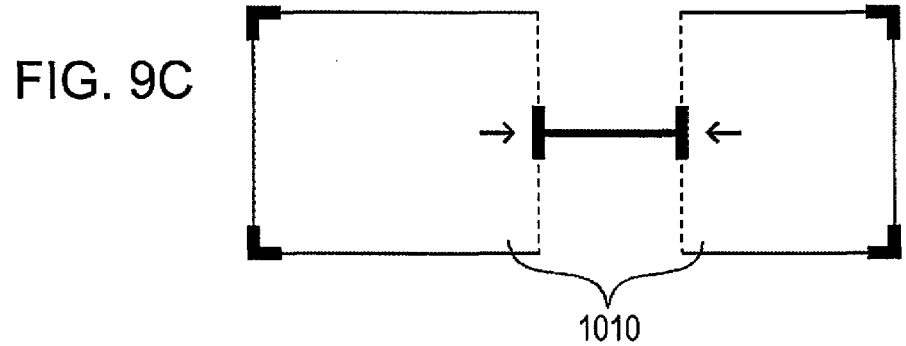

FIGS. 9A-C illustrate an example of UIs displayed during a layout process when no priority is assigned to a layout.

FIG. 9A illustrates a UI in which a record is inserted in a layout and the layout is determined. The UI includes anchors 1001 and 1002, fixed sides 1003 and 1004, variable sides 1005, arrows 1006 and 1007 which indicate the change directions of the variable sides, and a link 1008. In this state, the record is changed to another record to insert contents of different sizes.

FIG. 9B illustrates updated sizes of the contents overlaid over the containers shown in FIG. 9A. Content sizes 1009 indicate the sizes of contents inserted into the containers.

FIG. 9C illustrates the result of the layout computation. The new sizes of the containers are computed so that the change amounts for the containers are identical while avoiding any rule violation. As shown in FIG. 9C, the computed content sizes 1010 are determined so that the change amount for the left container is identical to the change amount for the right container.

Figure 11:
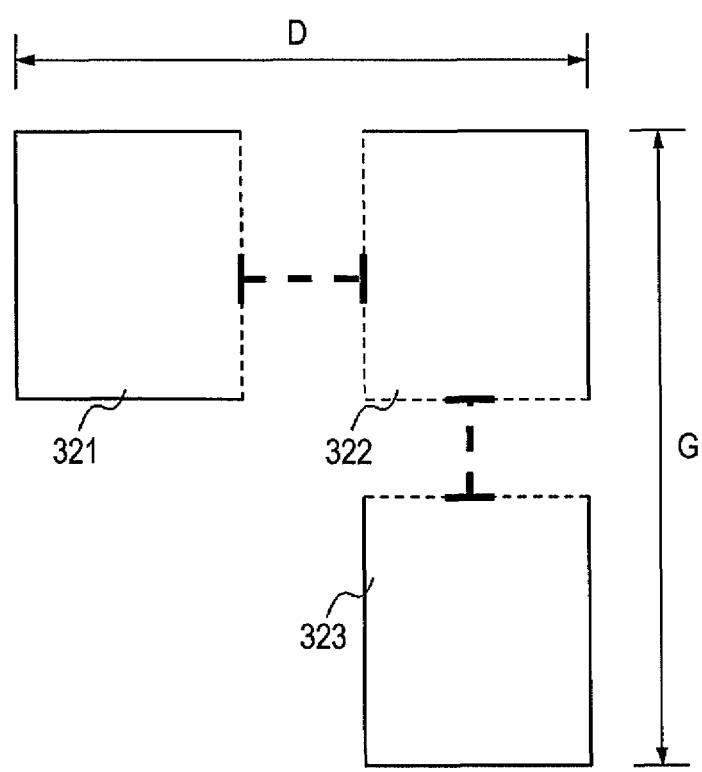
FIG. 11 illustrates an exemplary layout computing process according to an embodiment of the present invention.

In this method in which the container sizes are changed simply by the same change amount, if the layout is computed only in the horizontal direction as shown in FIG. 10, no problem occurs. However, as shown in FIG. 11, when layout computation in the vertical and horizontal directions is required, a problem may occur.

In the example shown in FIG. 11 in which two-dimensional layout in the vertical and horizontal directions is manipulated, adjustment in the horizontal direction is performed first, and, subsequently, adjustment in the vertical direction is performed using the layout computing method shown in FIG. 8. That is, layout adjustment can be performed for containers 321 and 322 using the above-described method so that the containers 321 and 322 are disposed within a predetermined distance D. Thereafter, layout adjustment can be performed for the container 322 and a container 323 using the above-described method so that the containers 322 and 323 are disposed within a predetermined distance G.

However, if adjustment is performed in the horizontal direction first, and, subsequently, adjustment is performed in the vertical direction, the resultant layout is anticipated to be shifted from a basic layout that a user desires.

Accordingly, in one method to minimize the shift of each container from a basic pattern (aspect ratio), a squared difference between the width of the basic pattern and the width after layout adjustment is added to a squared difference between the height of the basic pattern and the height after layout adjustment for every container.

Thereafter, the layout editing application program 121 may compute the width and height of each container to adjust a layout so that the width and height of each container minimizes the sum of the squared differences. By adjusting a layout using this least-square method, the layout editing application program 121 can adjust a layout so that a difference between the size of content data and the size of data area into which the content data is inserted is minimized. Thus, the layout editing application program 121 can determine the final well-balanced layout when viewed as a whole.

In addition, since a variable link, described in detail below, is set between the containers, the link size varies depending on the size of inserted content data. In this embodiment, the layout editing application program 121 includes such a layout adjustment module so as to be capable of adjusting the arrangement positions of a plurality of partial display areas (i.e., containers) depending on the assigned data sizes.

Setting of Flexible Link

Figure 12:
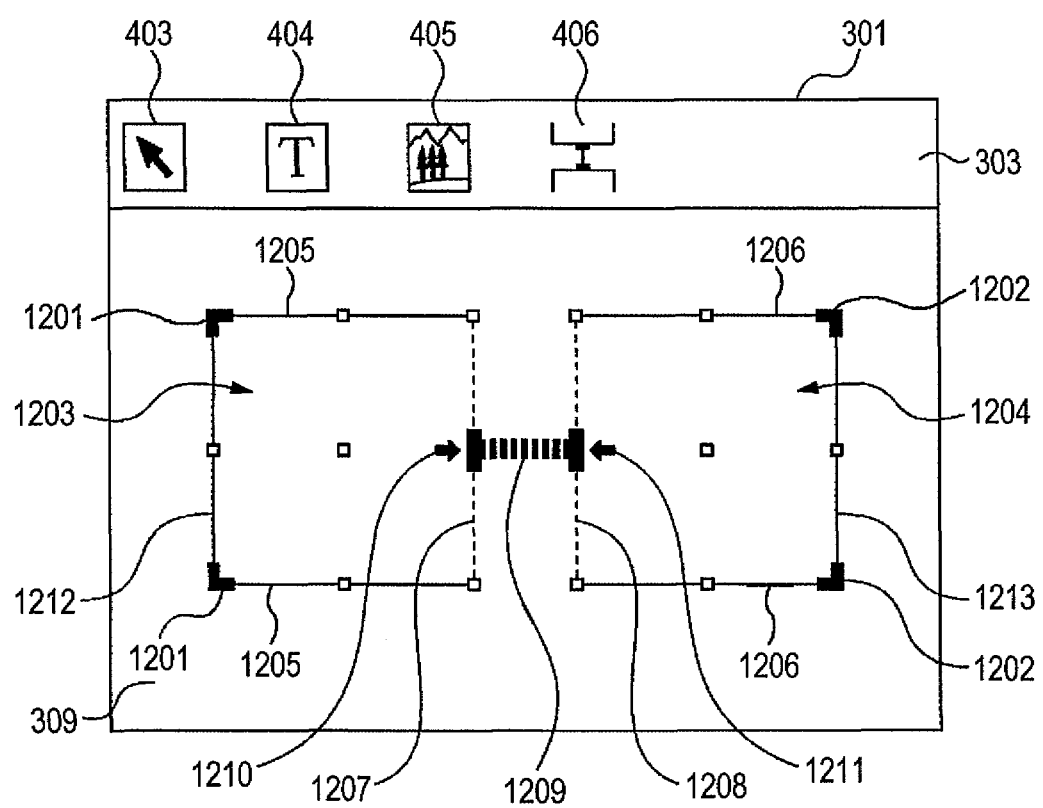
FIG. 12 illustrates a user interface when containers are arranged using a flexible link.

FIG. 12 illustrates a user interface for setting a flexible link. Like the user interface shown in FIG. 4, this user interface includes the application window 301 and the tool bar 303.

As shown in FIG. 12, the document template 309 includes containers 1203 and 1204. The containers 1203 and 1204 include anchor icons 1201 and 1202 and fixed sides 1205 and 1206, respectively.

A flexible link 1209 is set between the containers 1203 and 1204. Since the link is set between the containers 1203 and 1204, a right side 1207 of the container 1203 and a left side 1208 of the container 1204 are shown by dotted lines. Accordingly, arrows 1210 and 1211 are displayed in those containers to indicate that the right side 1207 of the left container 1203 and the left side 1208 of the right container 1204 are variable.

Figure 14:
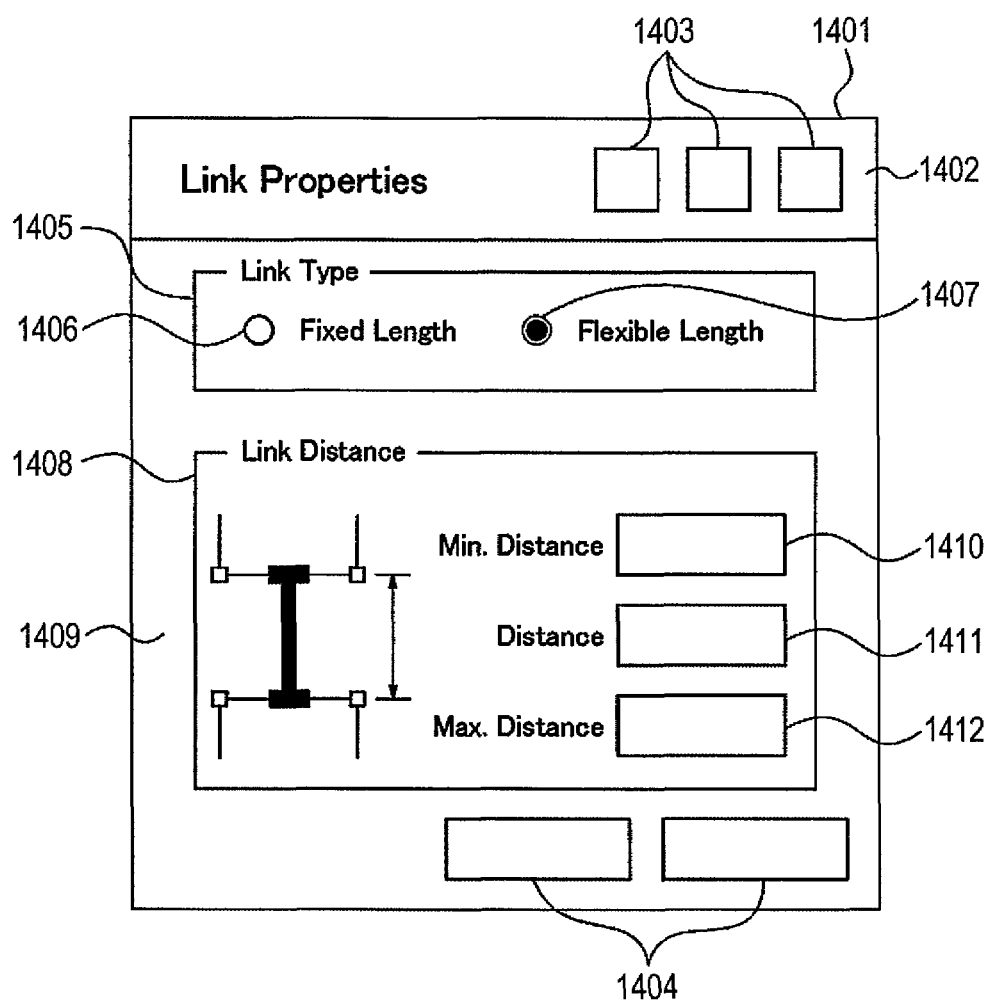
FIG. 14 illustrates an exemplary dialog window for setting a link.

FIG. 14 illustrates an exemplary user interface screen for setting a link. That is, FIG. 14 illustrates an example of a dialog window 1401 for setting information about the link 1209. The dialog window 1401 includes a title bar 1402, tool buttons 1403, buttons 1404 used to open and close the dialog window 1401, respectively, and an area 1409 used to set various types of information. In the dialog window 1401, a link can be set to be either a flexible link (1407) or a fixed link (1406). If the link type is variable (flexible link), the minimum link length ("Min. Distance" field 1410), the maximum link length ("Max. Distance" field 1412), and the standard value ("Distance" field 1411) can be set. For example, in the dialog window 1401 shown in FIG. 14, this setting area is displayed when a link is set between two containers by the link setting operation shown in FIGS. 6 and 7 and the set link is selected by clicking on the link or by an equivalent operation. Alternatively, immediately after the link is set, the dialog window 1401 related to the set link may be displayed automatically. As used herein, the standard value 1411 for a distance between containers represents a link length used when the sizes of the containers remain unchanged after data are inserted into the containers.

Figure 13:
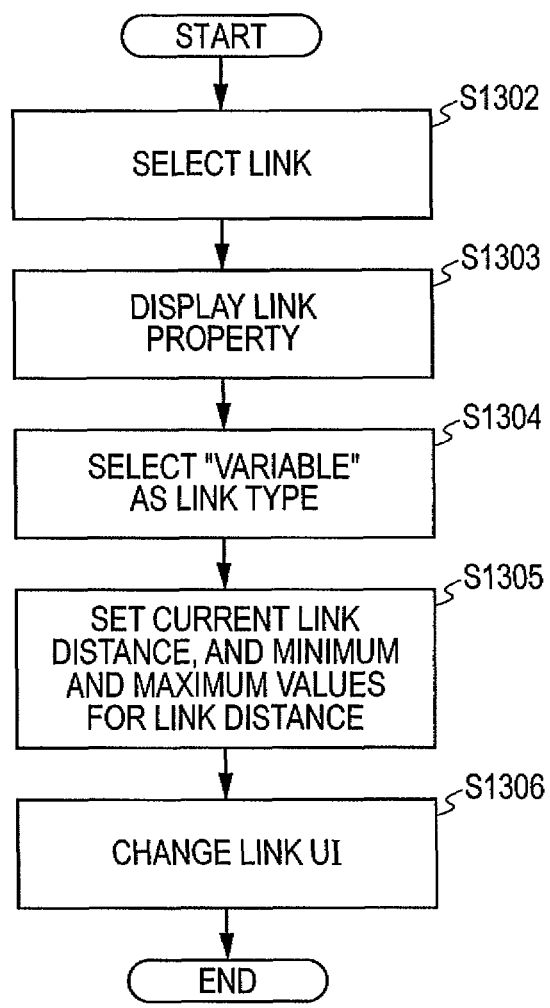
FIG. 13 is a flow chart illustrating a setting procedure of a variable link.

FIG. 13 is a flow chart illustrating the procedure to set up a variable link using the user interface 103 according to this embodiment. For example, when a link is set between the containers A and B shown in FIG. 10 using the procedure described in relation to FIGS. 6 and 7, the link becomes a fixed link. By selecting the link and performing a process shown in FIG. 13, the link can be changed from the fixed link 1106 (see FIG. 10) to the flexible link 1209 (see FIG. 12).

A user selects a desired link (e.g., link 1106) by using a mouse and performs a predetermined operation to display the link property (step S1302). The user interface 103 of the layout editing application program 121 recognizes that it received an instruction to display the link property. Upon recognizing the instruction to display the link property, the user interface 103 displays the property dialog window 1401 (see FIG. 14) corresponding to the selected link (hereinafter referred to as a "target link"). The user interface 103 then displays the link property (step S1303). To select the link, like the setting for a basic pattern of a container, the user may right-click on the link using the mouse, may press a predetermined key of the keyboard, or may perform any equivalent operation.

The dialog window 1401 displayed at step S1303 contains the current status of the selected link. In this example, since the link 1106 is selected, the link size is fixed at this stage. In a "Link Type" section 1405, an item "Fixed Length" 1406 for indicating a fixed length is selected.

In the dialog window 1401, in order to change the link from a fixed size to a variable size, the user selects an item "Flexible Length" 1407 for setting the link size to be variable in the "Link Type" field 1405. Thus, the "Max. Distance" field 1412, the "Min. Distance" field 1410, and "Distance" field 1411 in the "Link Distance" section 1408 are enabled, and therefore, the user can set values in these fields. To set the variable size of the link, the user can set the maximum length in the "Max. Distance" field 1412, the minimum length in the "Min. Distance" field 1410, and the current length in the "Distance" field 1411.

After the setting is completed, the user instructs the layout editing application program 121 by using the widely-used dialog window open/close button 1404 to apply the specified settings. Upon detecting this instruction, the user interface 103 advances the process from step S1303 to step S1304 so as to apply the settings to the target link.

That is, at step S1304, the layout editing application program 121 recognizes that a flexible link (having a variable length) is selected as a link type (step S1304).

If a variable size is selected at step S1304, the current length (standard length), the maximum length, and minimum length of the target link set via the dialog window 1401 are input (step S1305). Thereafter, at step S1306, the target link is displayed with a dotted line, which indicates a flexible link. Consequently, a UI display of the link is changed to that of the link 1209 shown in FIG. 12. The setting values in the dialog window 1401 are stored in the memory unit 136.

Additionally, the distance between containers in the current layout may be automatically set in the "Distance" field 1411 as a default value.

Figure 15:
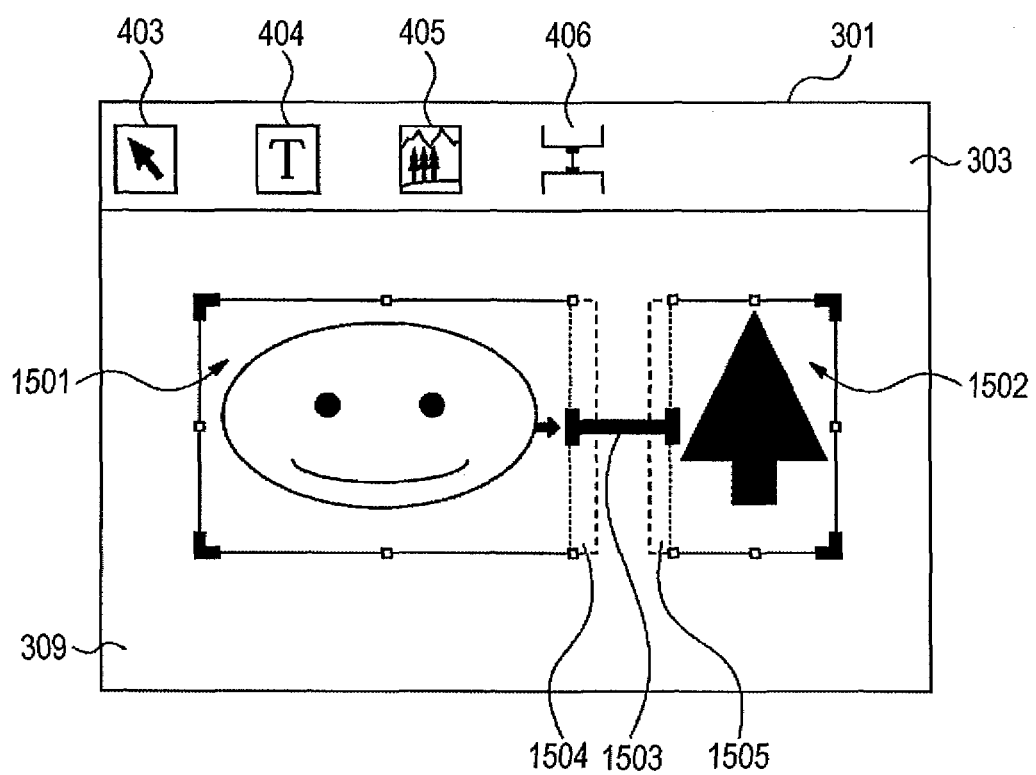
FIG. 15 illustrates an example of the layout result when a fixed link is used.

FIG. 15 illustrates the layout result when a fixed link is used and the content is inserted into the basic layout shown in FIG. 12. Although the link 1209 shown in FIG. 12 is a flexible link, it is assumed that a fixed link is set. Layout computing is performed according to the above-described layout computing method.

For example, image data having frames 1504 and 1505 of different sizes are inserted into the containers 1203 and 1204 shown in FIG. 12, respectively.

In this case, each container considers that the data size is appropriate. The container 1203 attempts to expand its size in the right direction so that the shape of the container 1203 is close to the shape of the frame 1504 that has the size of the inserted image (i.e., an optimum container size). Similarly, the container 1204 attempts to expand its size in the left direction so that the shape of the container 1204 is close to the shape of the frame 1505 that has the size of the inserted image (i.e., an optimum container size).

However, the containers 1203 and 1204 cannot move the left side 1212 and the right side 1213 due to the anchors 1201 and 1202, respectively. To change the sizes thereof, the distance between the containers 1203 and 1204 must be decreased. However, a fixed link 1503 is set between the containers 1203 and 1204, and therefore, the layout is computed while maintaining the length of the link 1503 unchanged. As a result, the sizes of containers 1203 and 1204 are changed.

As a result, the containers 1203 and 1204 cannot provide the optimum sizes matching the data sizes (i.e., the frames 1504 and 1505, respectively). Finally, as shown in FIG. 15, the containers 1203 and 1204 are smaller than the optimum sizes (the frames 1504 and 1505, respectively) (See containers 1501 and 1502).

That is, since the length of the link 1503 is fixed, the containers 1501 and 1502 cannot provide the optimum sizes (areas shown by dashed lines in both containers in FIG. 15).

Figure 16:
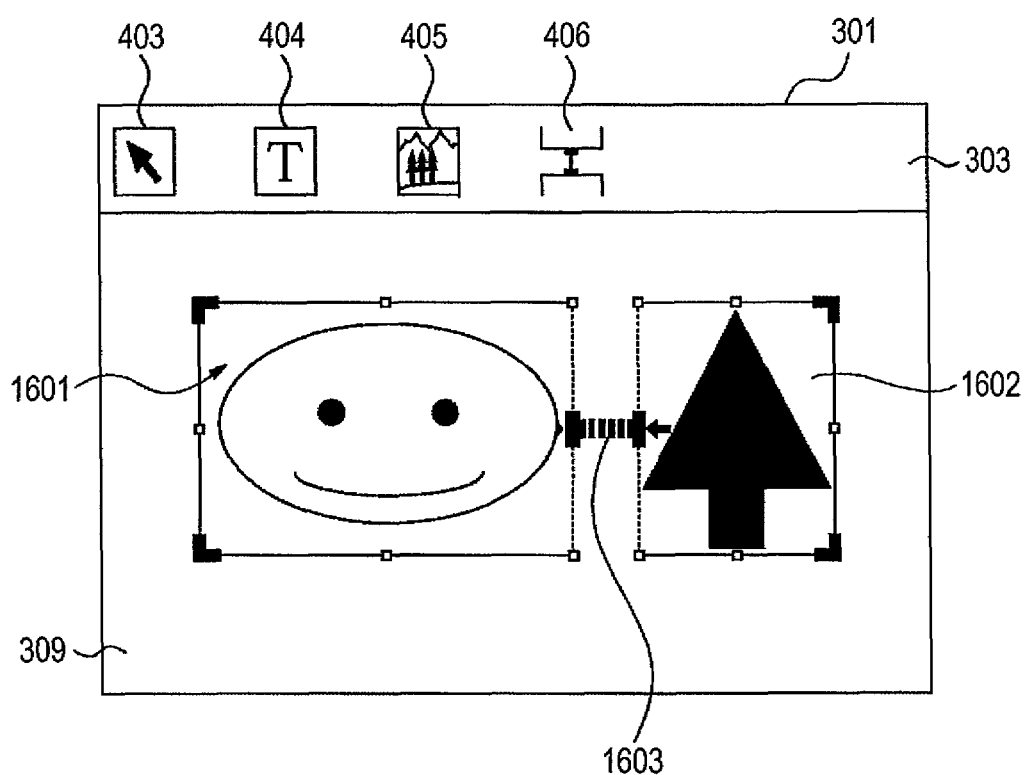
FIG. 16 illustrates an example of the layout result when a flexible link is used.

In contrast, FIG. 16 illustrates the layout result when the length of the link is variable under the same conditions as in FIG. 15. In this case, as shown in FIG. 16, a flexible link 1209 is set between the containers 1203 and 1204.

Accordingly, when the sizes of the containers 1203 and 1204 are changed, the sizes of the containers 1203 and 1204 can be increased to the sizes larger than those shown in FIG. 15 by reducing the link size.

As a result, the optimum sizes matching the sizes of the inserted data can be provided. Alternatively, the container frames close to the inserted data sizes (optimum sizes) can be set.

As shown in FIG. 16, after the layout is computed, the length of the flexible link 1209 is changed to the length of a flexible link 1603. In this state, the containers 1203 and 1204 have the optimum sizes matching the data sizes (see containers 1601 and 1602).

Multi-Record (Multi-Data) Function

An overview of a multi-record function is described next. As used herein, the "multi-record function" refers to a function in which information items in one record are laid out in accordance with a sub template described below and a plurality of sub templates is sequentially laid out in a flow area. Also, this operation is referred to as "inserting a sub template into a flow area."

In a normal document template, one record corresponds to one document. For a multi-record corresponding to a sub template, one document contains a plurality of records, since records prior to a break (separator) at which a reference item changes are inserted into a flow area. Accordingly, it is desirable that a database of variable data corresponding to a normal document template is different from a database of a multi-record of variable data corresponding to a sub template. The sub template will be described below.

Figure 17:
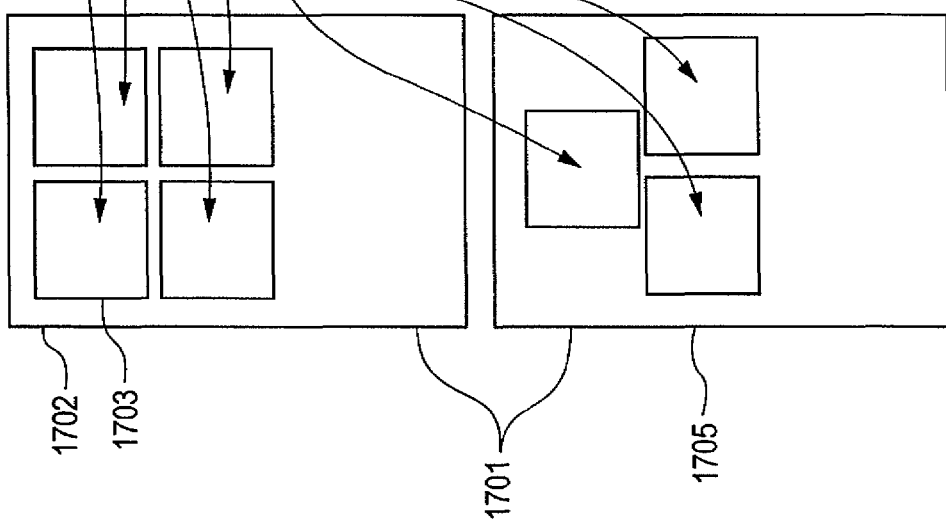
FIG. 17 illustrates an example of a multi-record.

FIG. 17 illustrates an example of a multi-record and a layout method for the multi-record. A document 1701, pages 1702 and 1705, a sub template 1703, and a database 1704 are shown in FIG. 17.

The database 1704 includes records 1 to 7. In a variable print in which one record corresponds to one document, since the database 1704 contains seven records, seven documents are generated. However, in a variable print that supports a multi-record function in which multiple records correspond to one document, the following process is performed.

A user specifies any column that selects a multi-record. For example, the user specifies the column during template creation. The information for identifying the specified field is stored in the memory unit 136 as multi-record information.

In the example shown in FIG. 17, "Field Name: Name" is specified. Thereafter, a record that has a field containing the same value as the specified field value is determined to be a record laid out in the same document, is laid out using the specified sub template, and is inserted into the same flow area.

In the example shown in FIG. 17, the records 1 to 4 have a "Name" field containing a value "Tom." Accordingly, these records are inserted into one flow area and are laid out on a document 1702. The records 5 to 7 have a "Name" field containing a value "Nancy." Accordingly, these records are laid out on a different document using the same template as used for the value "Tom." That is, after creation of the document 1702 for "Tom" is completed, a document 1705 for the value "Nancy" is created.

More specifically, a footer (not shown), for example, is added to the document for "Tom" in accordance with the settings for template data and a page feed is executed. Thus, the creation of the document for "Tom" is completed.

Subsequently, using the same template data as before, a header (not shown), for example, of the document for "Nancy" is added to a new page (not shown). Thereafter, records that have a "Name" field containing a value "Nancy" are laid out using a sub template set as the sub template information. The records are then inserted into a flow area defined in the template. This is the normal multi-record process.

In this embodiment, the same template data is used for the documents for "Tom" and "Nancy." However, the same sub template is not necessarily used for each record. This is because a sub template corresponding to the separately specified conditions can be used.

Figure 18:
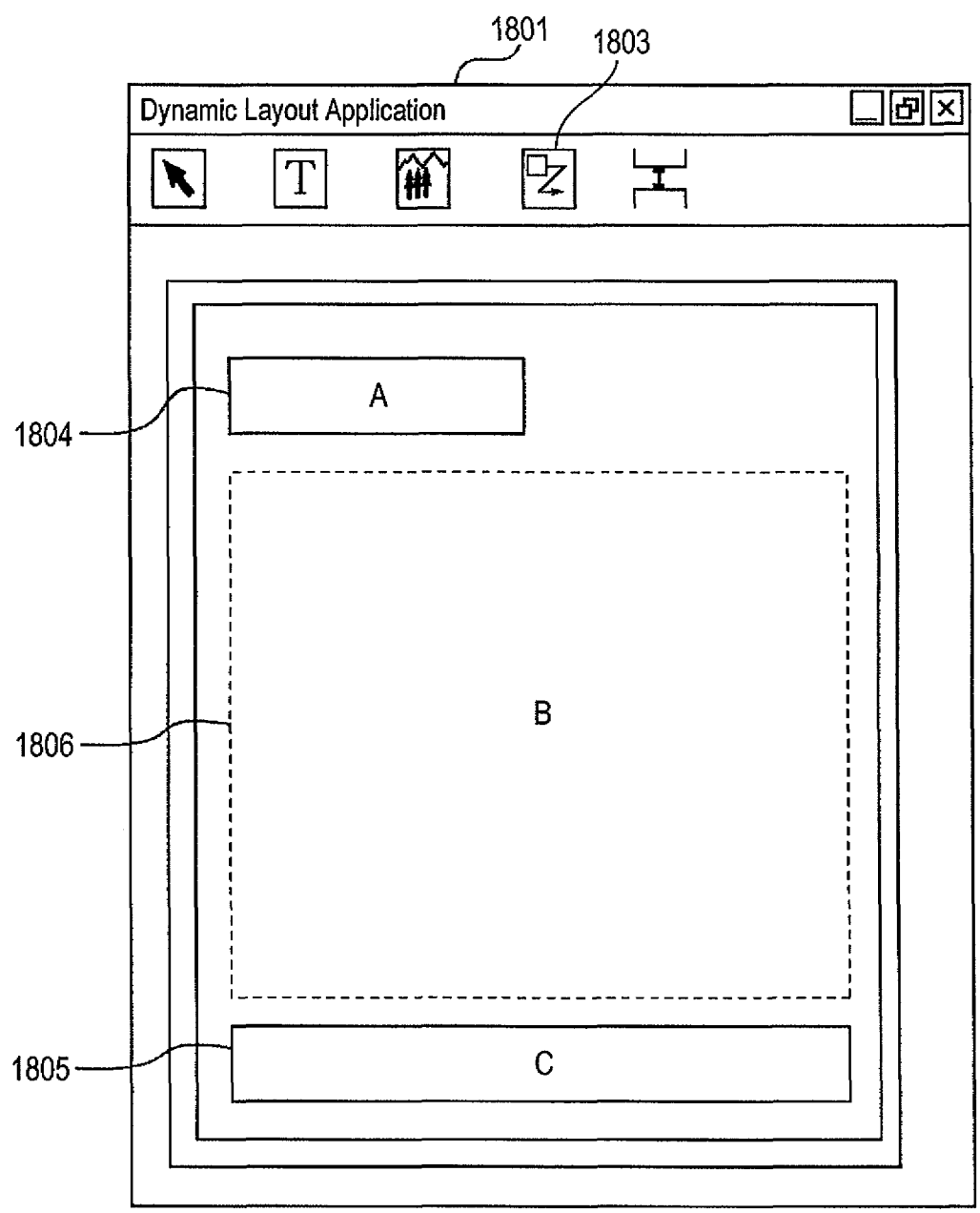
FIG. 18 illustrates an exemplary user interface for setting a flow area.

FIG. 18 illustrates a UI for describing a template creation mode of a layout editing system according to this embodiment.

After starting the layout editing application program 121, a user inputs an instruction to create a new template. A screen 1801 such as the one shown in FIG. 18 is then displayed. It should be noted that rectangles 1804, 1805, and 1806 are not shown in this display.

Upon recognizing that an icon (tool bar button) 1803 in FIG. 18 is depressed, the layout editing application program 121 enters a flow area creation mode, in which the user can draw a flow area by dragging the mouse. The position and size of the drawn flow area are stored in the memory unit 136 as flow area information.

The rectangles 1804 and 1805 indicate a text container and an image container, respectively, defined outside the flow area 1806. These containers are not related to a process to insert contents in the flow area 1806. These containers may be used for, for example, areas for a header and a footer. The input positions and sizes of these containers are also stored in the memory unit 136.

By differentiating the rectangular UI (e.g., the color and line type) from that for these containers, the flow area 1806 can be easily recognized by the user.

Additionally, the created flow area is associated with a database. For example, by inputting identifiers, such as a database name associated with the flow area and field names in a record, the flow area is associated with a database. More specifically, for example, the user clicks on the flow area to identify the target flow area and inputs required information while following a predetermined operation procedure. These input information items are also stored in the memory unit 136.

Property Setting of Flow Area

Figure 19:
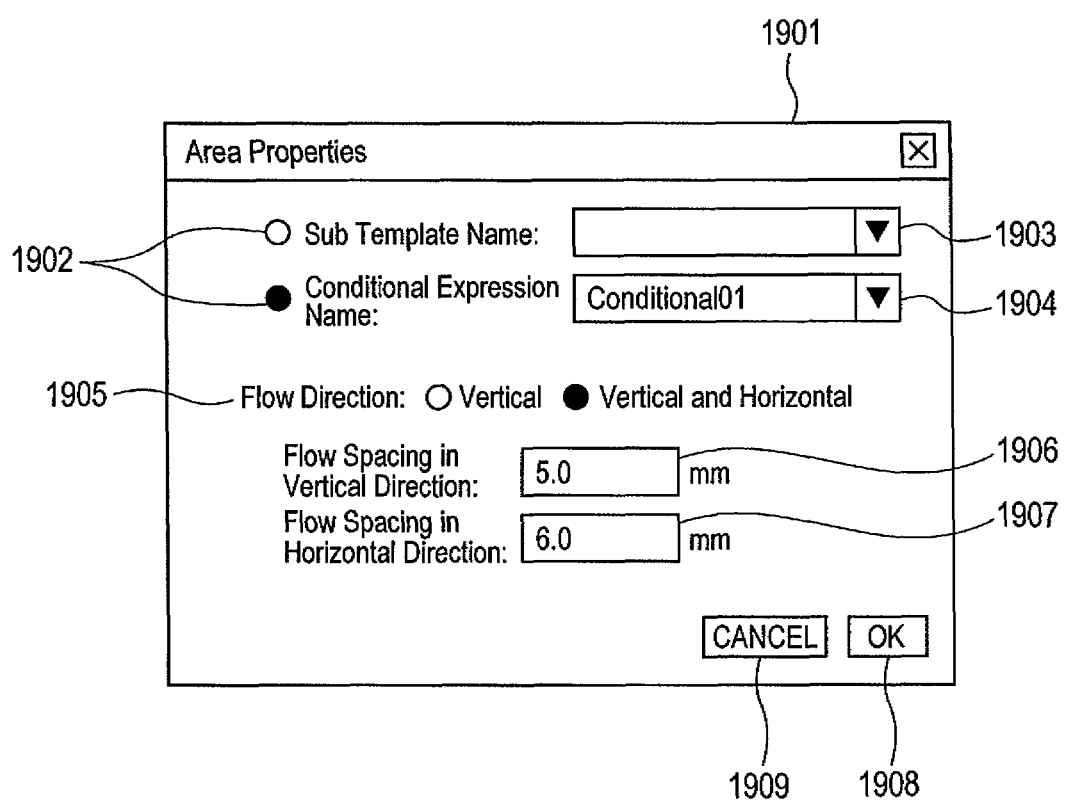
FIG. 19 illustrates an example of a setting dialog of a flow area.

FIG. 19 illustrates an example of a setting dialog 1901 for setting a variety of attributes of a flow area (property setting). Descriptions of a sub template and a conditional expression are provided later.

A user selects whether a sub template is associated with a flow area or a conditional expression is associated with a flow area by using radio buttons 1902. Thereafter, if a sub template is associated with a flow area, the user selects a sub template used for the flow area from a list box 1903. In contrast, if a conditional expression is associated with a flow area, the user selects a conditional expression used for the flow area from a list box 1904.

A sub template and a conditional expression can be created in the currently editing document template or in a predetermined location even outside the template using a dedicated UI. Additionally, a conditional expression can be created using a UI shown in FIG. 21, which is described below. In another method, a sub template and a conditional expression may be stored in a different file and the user may select a sub template or a conditional expression by selecting the file via this setting dialog.

In this embodiment, a plurality of sub templates and a plurality of conditional expressions can be created in a document template. Since the sub template or the conditional expression is selected from a list box, it is desirable that each sub template or conditional expression has a unique name. In addition to selecting a sub template or a conditional expression, this setting dialog 1901 is used to select, from a selection field 1905, a flow direction when a sub template is inserted into the flow area (i.e., the arrangement direction of contents). The spacing between the contents in the vertical and horizontal directions can be determined using setting fields 1906 and 1907, respectively.

To apply these settings, the user depresses an OK button 1908. When the OK button 1908 is depressed, the current settings are stored in the memory unit 136 as flow area information.

For example, the following information is stored in the memory unit 136: flag information about whether the target flow area is associated with a sub template or a conditional expression, a sub template name or a conditional expression name (a conditional expression file name) in accordance with the flag information, a flow direction, and the spacing. If a cancel button 1909 is depressed, the current settings are canceled, and therefore, the information is not stored.

Example of Layout of Sub Template

Figure 20:
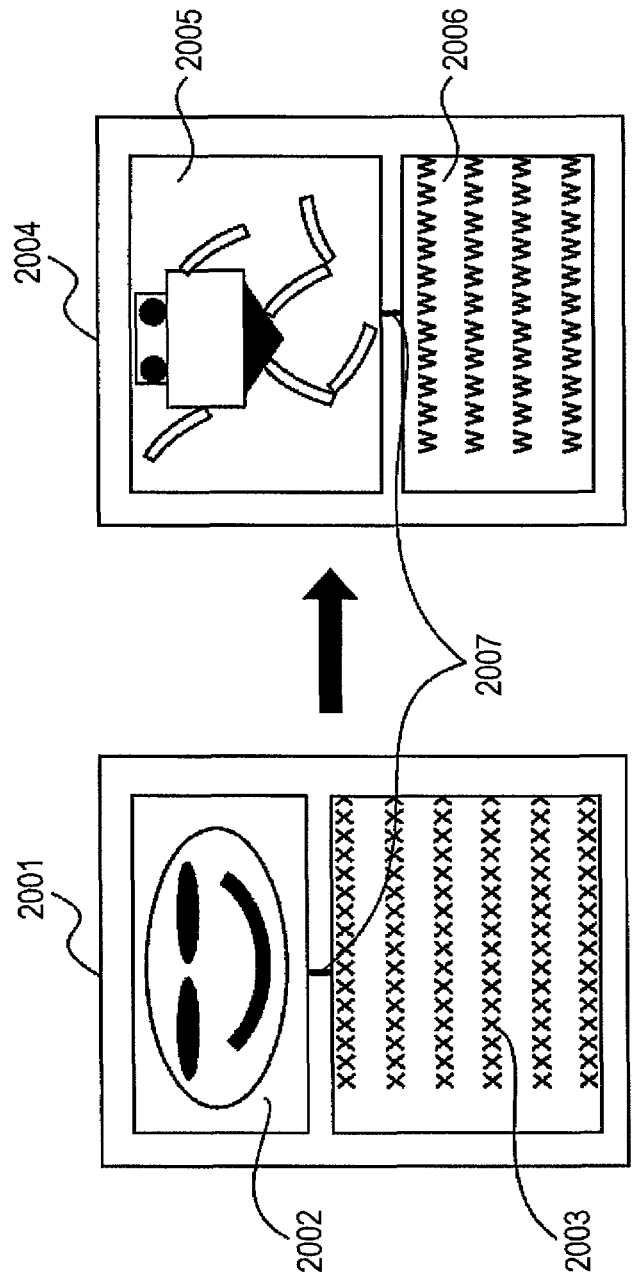
FIG. 20 illustrates an example of a layout of a sub template.

The outline of the above-described sub template is described next. FIG. 20 illustrates an example of the layout of a sub template. Hereinafter, the term "layout of a sub template" refers to the layout of data generated using a sub template.

A sub template is an area in which any number of image containers and text containers are arranged. A container arranged in the sub template is associated with a data item (field) in a record and is stored as a template. This design is helpful when the same layout is repeatedly used in a document.

Containers arranged in the sub template are similar to the above-described image container and text container. A link can be set between the containers. Accordingly, data to be laid out is inserted into the container arranged in the sub template and the layout size can be changed using the layout computing method shown in FIG. 8 so as to obtain the optimum layout size.

FIG. 20 illustrates an example of the layout of a sub template. In FIG. 20 shown are image containers 2002 and 2005, text containers 2003 and 2006, and a link 2007.

In FIG. 20, the content sizes of an image and text inserted into the containers arranged in sub templates 2001 and 2004 are different. Consequently, the optimum layout is computed for each record so as to change the layout. Thus, although the same sub template is used, the layout in the sub template 2001 is different from that in the sub template 2004. The size of the sub template may be changed depending on a change in the container size and the layout arranged in the sub template.

Sub Template Conditional Expression

A sub template conditional expression indicates a condition used to selectively assign a plurality of sub templates to one flow area. One of a sub template and a conditional expression can be associated with a flow area.

If a sub template is associated with a flow area, a retrieved record is inserted into the associated sub template. When a sub template is associated with the flow data, a conditional expression may be specified so that only records satisfying the conditional expression may be inserted into sub templates associated with the flow area.

Figure 21:
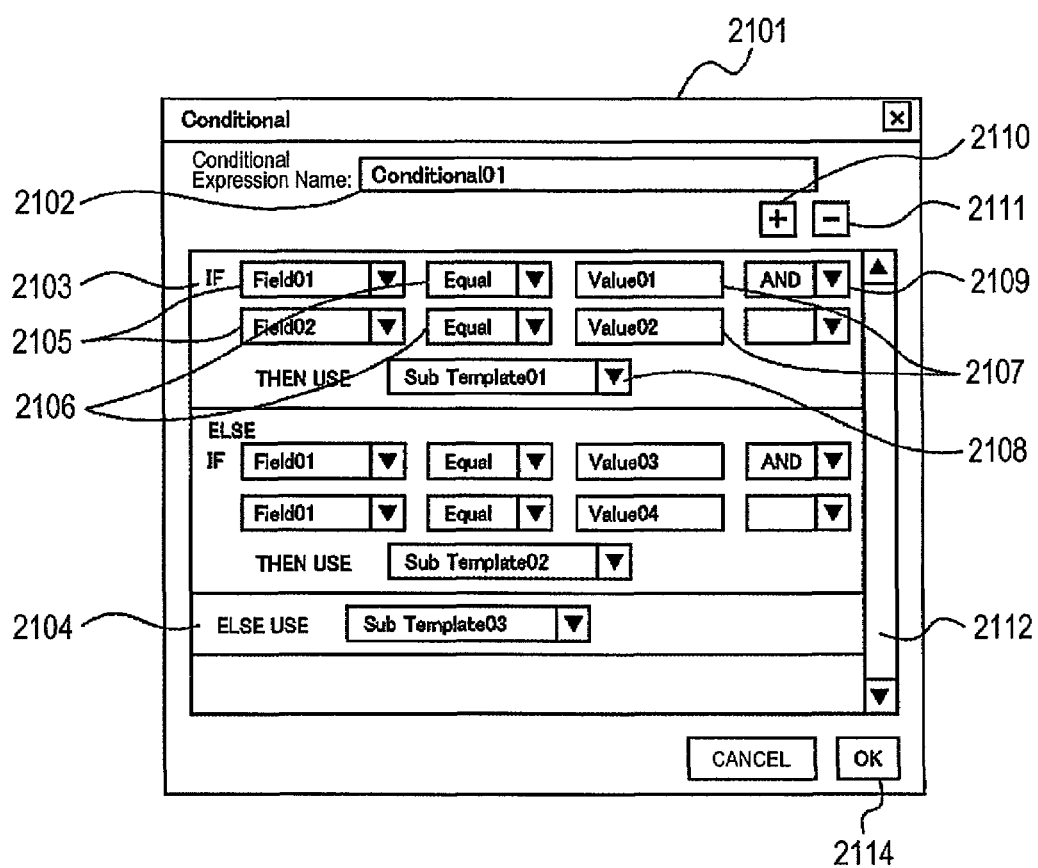
FIG. 21 illustrates an example of a UI for setting a conditional expression.

Additionally, a conditional expression includes identification information about a sub template applied when the condition is satisfied. FIG. 21 illustrates an example of a UI for setting a conditional expression. Content data of a record satisfying a conditional expression set for the flow area is inserted into the sub template. Thereafter, sub templates into which the content data of the record are arranged in the flow area.

An input area of the UI 2101 includes a text box 2102 used to name a conditional expression, a pair consisting of an IF statement input area 2103 and an ELSE statement input area 2104, which is essential for making a basic conditional determination. The IF statement input area 2103 includes list boxes 2105 used to select fields that are targets of the conditional determination, list boxes 2106 used to set a logical expression for the determination, text boxes 2107 used to input the values for determination, a THEN_USE processing statement field 2108 used to determine a sub template into which the record is to be inserted when the logical expression is true, and an ELSE_USE processing statement field 2104 used to determine a sub template into which the record is to be inserted when the logical expression is false. Each of the list boxes 2106 used to set an operator for the logical expression provides a variety of operators, such as "EQUAL" (equal), "NOT_EQUAL" (not equal), "LESS_THAN" (less than), "LARGER_THAN" (larger than), "START_WITH" (start with), and "END_WITH" (end with).

In order to set a more complicated conditional expression, a compound logical expression is set in the IF statement using a combo box 2109 for an AND or an OR connect statement. When the user selects a compound logical expression including AND or OR using the combo box 2109, one logical statement is added in the IF statement. If AND is selected and all the logical statements are evaluated to be true, the IF statement is evaluated to be true. If OR is selected and one of the logical statements is evaluated to be true, the IF statement is evaluated to be true.

In order to set a more complicated conditional branch, an ELSE_IF statement addition button 2110 is provided. When the button 2110 is depressed, a new ELSE_IF statement is inserted between the IF statement and the ELSE statement.

The description and operation of the ELSE_IF statement are identical to those of the IF statement.

If the IF statement is evaluated to be false, the ELSE_IF statement immediately beneath the IF statement is evaluated. If this IF statement is evaluated to be false, the ELSE_IF statement immediately beneath the IF statement is evaluated. This operation is repeated until the last ELSE statement is evaluated. A deletion button 2111 is used to delete the selected ELSE_IF statement. When many ELSE_IF statements are used, a scroll bar 2112 allows a list of conditions to be displayed. If one of the IF statements and the ELSE_IF statements is evaluated to be true, the associated USE processing statement is executed. In a USE processing statement, a sub template name is input (selected).

As described above, by setting a conditional expression, an appropriate sub template can be automatically selected for each record that has various values, and therefore, one conditional expression can provide a variety of layouts. By associating the conditional expression with the flow area, a plurality of sub templates having a variety of layouts can be arranged in a flow area.

After the user inputs the conditions, the user depresses an OK button 2114. When the OK button 2114 is depressed, information indicating the sub template condition set via the UI is stored in the memory unit 136. By using the conditional expression stored in the memory unit 136, the sub template into which content data is to be inserted can be selected. The outer frame size of the sub template may be changed depending on the size of a container in the sub template. Alternatively, the outer frame size of the sub template may be constant all the time.

Figure 22:
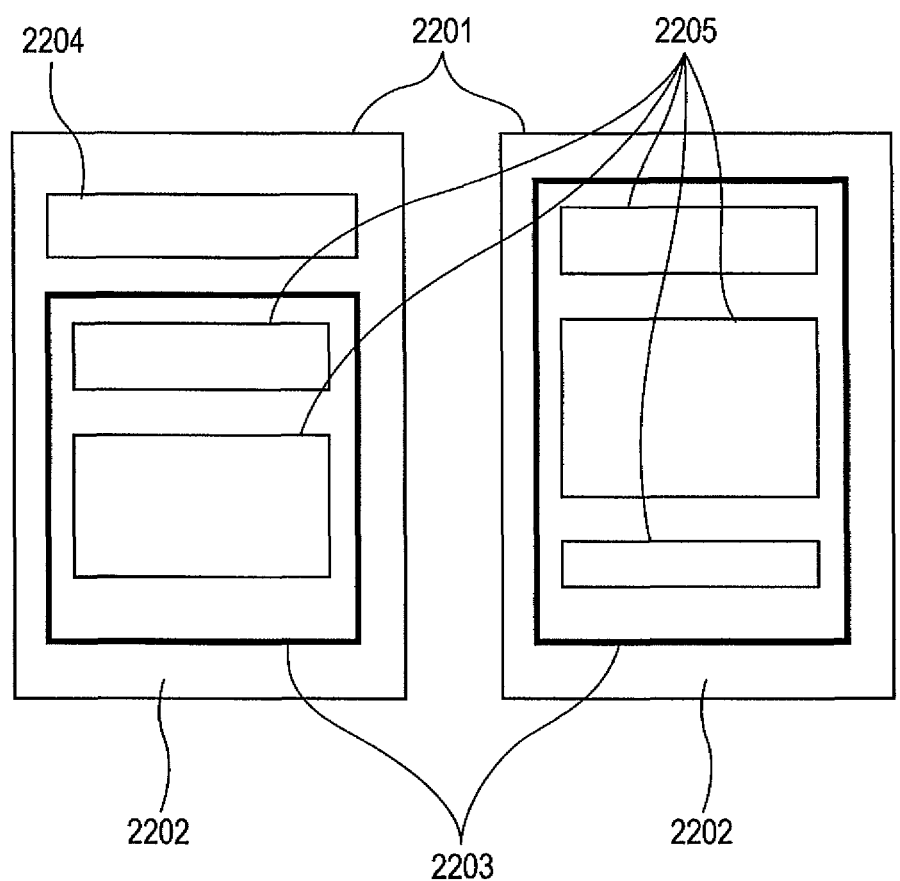
FIG. 22 illustrates an example of a document according to a first embodiment of the present invention.

FIG. 22 illustrates a document according to this embodiment. In FIG. 22 shown are a document 2201, pages 2202, flow areas 2203 for a multi-record, a container 2204, and sub templates 2205.

According to an embodiment of the present invention, a gap (distance) between the sub templates 2205 is changed on the basis of the determination whether the positions of sub templates arranged in a predetermined page and the ratio of the sub template area to the entire page area satisfy the conditions set for the page. Additionally, according to an embodiment of the present invention, a relayout method is defined for a normal print mode and a bookbinding print mode. As used herein, the term "gap" refers to a distance between sub templates.

Figure 23:
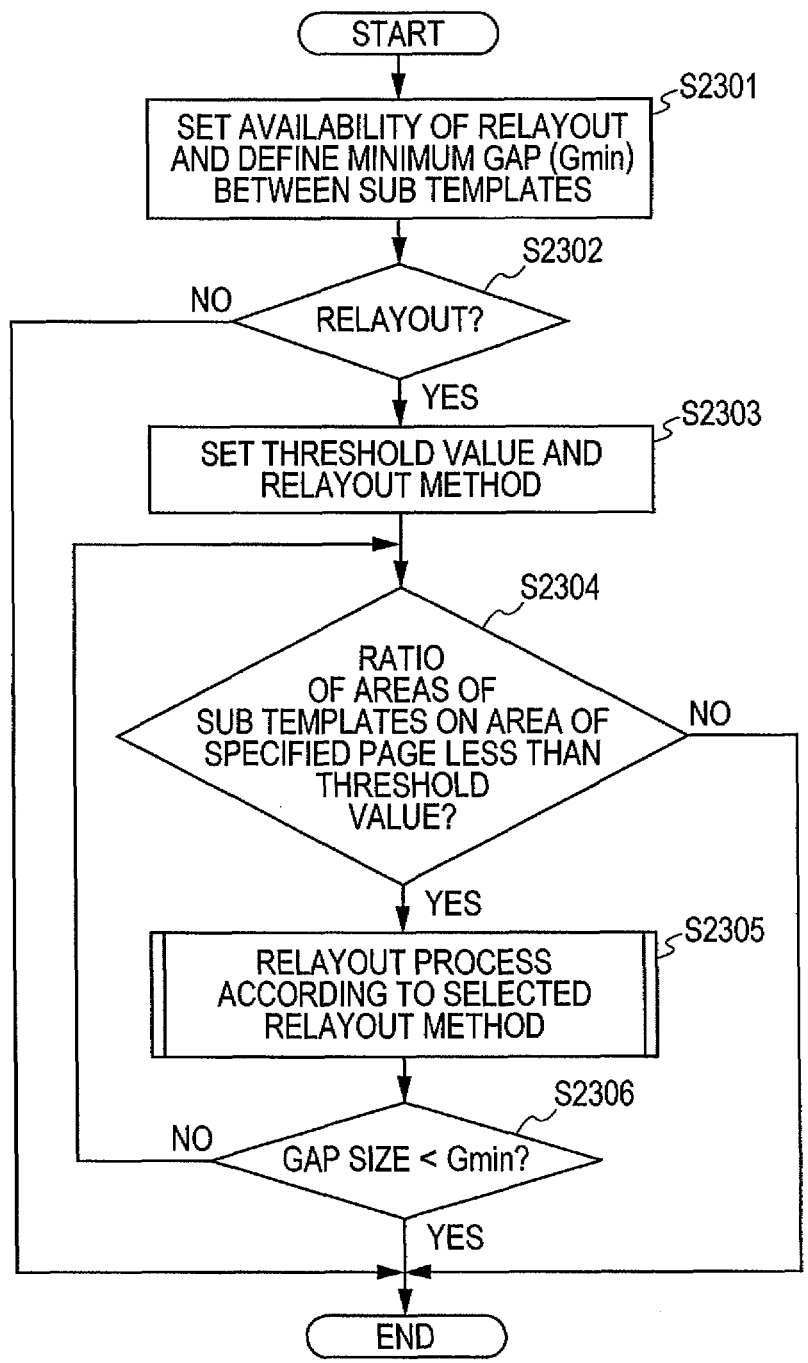
FIG. 23 is a flow chart of a process in a normal print mode according to an embodiment of the present invention.

FIG. 23 is a flow chart of a process in a normal print mode according to this embodiment.

Figure 24:
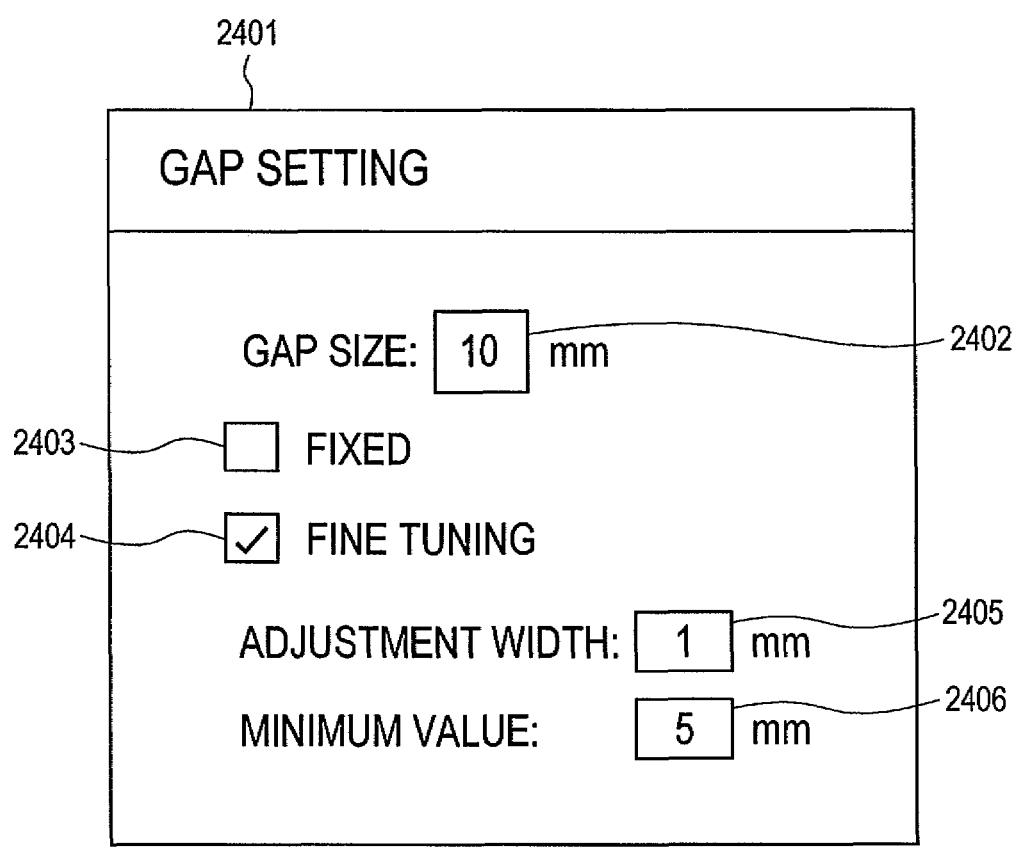
FIG. 24 illustrates an exemplary dialog window for setting the execution of a relayout process.

To set the parameters of a relayout process by a predetermined operation, the layout editing application program 121 displays a dialog window 2401 such as the one shown in FIG. 24.

The gap setting dialog window 2401 shown in FIG. 24 is described next. The gap setting dialog window 2401 includes a field 2402 used for setting a gap (distance) between sub templates required for printing. In FIG. 24, the gap is set to 10 mm. The sub templates are arranged in the flow area so that the sub templates maintain a 10-mm gap (distance) therebetween. That is, in the example shown in FIG. 24, the layout editing application program 121 determines the locations of the sub templates while maintaining a 10-mm gap between the sub templates.

In this embodiment, by changing a gap (distance) between sub templates, the relayout process is performed. Accordingly, a user selects whether the relayout process is performed or not using the gap setting dialog window 2401. More specifically, when a "Fixed" field 2403 is checked, the relayout process of changing the gap is not performed. If a "Fine Tuning" field 2404 is checked, the relayout process is performed by changing the gap (distance) between the sub templates. During the relayout process, the distance between the sub templates is changed. At that time, in order to perform the relayout process in a step-by-step approach, an "Adjustment Width" field 2405 is set.

In addition, in order to maintain a minimum gap between the sub templates, a minimum value (Gmin) is set in a "Minimum Value" field 2406.

The specific example shown in FIG. 24 is described next. In FIG. 24, the adjustment width is set to be 1 mm and the minimum value is set to be 5 mm. Therefore, the relayout process is performed such that the distance between the sub templates are changed to the minimum value (5 mm) and adjustments are made in increments of 1 mm. The layout editing application program 121 recognizes the values set in the gap setting dialog window 2401 and stores the values in the memory unit 136 (step S2301 of FIG. 23).

Subsequently, in step S2302, the layout editing application program 121 determines whether relayout is instructed at step S2301. More specifically, since the values set via the gap setting dialog window 2401 shown in FIG. 24 are stored in the memory unit 136, the layout editing application program 121 references the memory unit 136 to determine whether or not the "Fine Tuning" field 2404 is checked.

If it is determined at step S2302 that relayout is not instructed, processing ends. On the other hand, if it is determined at step S2302 that relayout is instructed, the layout editing application program 121 prompts the user to input a threshold value that determines whether the relayout is performed by displaying a dialog window 2501 shown in FIG. 25A. Thus, the threshold value is determined (step S2303). That is, the threshold value is a condition whether or not the distance between areas is changed in a relayout process at step S2305, which is described below.

Figure 25A:
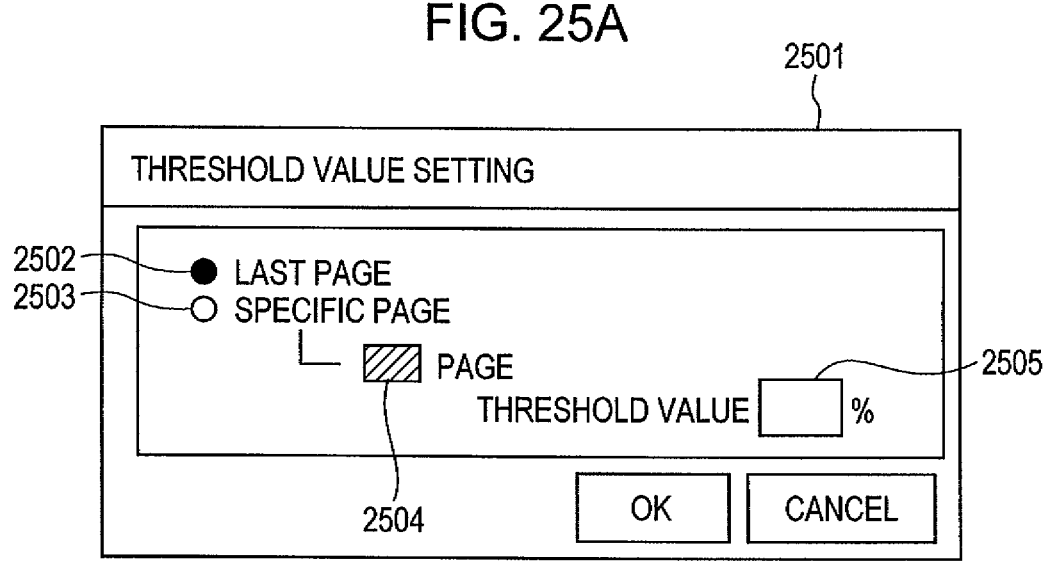
FIGS. 25A and 25B illustrate exemplary threshold value setting dialog windows.

The setting dialog window 2501 shown in FIG. 25A includes radio buttons 2502 and 2503 for selecting a target page. If the user selects the last page radio button 2502 and if the layout editing application program 121 determines that the ratio of areas of sub templates to the area of the last page is less than or equal to a predetermined threshold value, the layout editing application program 121 performs a relayout process to change a distance between the sub templates.

In contrast, if the specific page radio button 2503 is selected, a page setting field 2504 is enabled. If the layout editing application program 121 determines that the ratio of areas of sub templates to the area of the page specified in the page setting field 2504 is less than or equal to a predetermined threshold value, the layout editing application program 121 performs a relayout process to change a distance between the sub templates. In FIG. 25A, since the last page is selected, the page setting field 2504 is disabled, and therefore, the user cannot specify a page number. Additionally, in FIG. 25A, the determination is made depending on the ratio of area of sub templates. However, the criterion is not limited to this ratio. For example, the determination may be made depending on the position of a sub template. For example, if 50% is specified for the threshold value, the layout editing application program 121 determines whether the sub template is located in the upper section or the lower section with respect to the 50% position of the page (i.e., a border line between the upper half and lower half of the page in vertical direction). If the sub template is located in the upper section, the sub template does not reach the threshold value. Accordingly, the layout editing application program 121 determines that it should carry out a relayout process to change a distance between the sub templates. Information about the ratio of areas of sub templates to the area of the page on which the sub template is located and information about the position of the sub template are considered to be arrangement information. In this embodiment, the ratio information is used to determine whether or not a relayout process is performed.

After the page is selected using the dialog window 2501, a threshold value is set in a threshold value setting field 2505. For example, in the dialog window 2501, "Last Page" is selected and "10%" is set. Accordingly, if the ratio of the areas of sub templates to the area of the last page is less than or equal to 10% after the layout process shown in FIG. 8 is completed, the layout editing application program 121 performs a relayout process to change a distance between the sub templates.

Figure 25B:
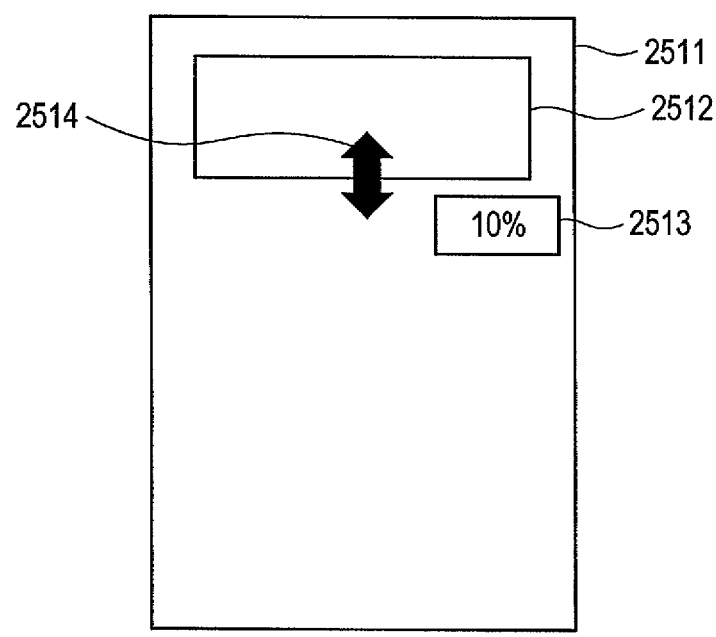

Furthermore, as shown in FIG. 25B, the threshold value can be set using a user interface (UI) 2511. To set a threshold value using the UI 2511, an area 2512 may be expanded or shrunk by operating the mouse and moving an arrow 2514. In the UI 2511 shown in FIG. 25B, by operating the arrow 2514 and changing the size of the area 2512, the threshold value is determined. The current threshold value is displayed in a field 2513 in accordance with the movement of the arrow 2514. The values set using the dialog window 2501 and the UI 2511 shown in FIGS. 25A and 25B are stored in the memory unit 136.

After the process at step S2303 is completed, the threshold value setting and the relayout method setting are completed. Subsequently, the layout editing application program 121 inserts content data into a container in the sub template and determines the positions of areas (e.g., sub template areas) into which content data is inserted on the basis of the size of the content data and the specified distance between the areas using the adjustment method shown in FIG. 8. The layout editing application program 121 arranges sub templates whose layout is determined using the adjustment method shown in FIG. 8 in a flow area of a document template. Concurrently, the layout editing application program 121 computes the ratio of areas of the sub templates to the area of the page specified using the dialog window 2501 shown in FIG. 25 and compares the ratio with the threshold value set at step S2303 (step S2304). That is, the layout editing application program 121 recognizes the position of the page on which the sub templates are arranged on the basis of the positions of the sub templates using the adjustment method shown in FIG. 8. Thereafter, the layout editing application program 121 identifies sub templates arranged on the page specified using the dialog window 2501 shown in FIG. 25 from the sub template that the layout editing application program 121 recognized. The layout editing application program 121 then determines whether the arrangement information of the sub templates arranged in the specified page satisfies the condition of the threshold value set using the dialog window 2501 shown in FIG. 25 (step S2304). More specifically, the layout editing application program 121 determines whether the position of area arranged on the page specified using the dialog window 2501 shown in FIG. 25 or the ratio of the area (sub template) arranged on the page specified using the dialog window 2501 to the area of the specified page exceeds the threshold value information set using the dialog window 2501 shown in FIG. 25. The arrangement information of each sub template can be computed by the layout engine, which is one of the modules of the layout editing application program 121. For example, the layout engine recognizes the positions of the sub templates using the coordinate values so as to compute the ratio of the area of the sub template to the area of the page specified at step S2303. By comparing the computed ratio of the area of sub templates with the threshold value set at step S2303, the process at step S2304 is carried out. That is, the layout editing application program 121 recognizes the positions of the sub templates determined by the layout process shown in FIG. 8 and, subsequently, analyzes the arrangement information of the sub template arranged on the page specified using the dialog window 2501 shown in FIG. 25A. As a result, the layout editing application program 121 can determine whether the arrangement information of the sub templates arranged on the page specified using the dialog window 2501 shown in FIG. 25A satisfies the condition set using the gap setting dialog window 2401 shown in FIG. 24.

In the comparison process at step S2304, if it is determined that the ration of areas of the sub templates on the area of the specified page is greater than or equal to the threshold value, processing ends. On the other hand, if the layout editing application program 121 determines that the ratio of the area of the sub templates arranged on the page specified using the dialog window 2501 shown in FIG. 25A to the area of the page does not satisfy the condition set in FIG. 25 (i.e., is less than the threshold value), the layout editing application program 121 changes the distance between the sub templates using the value set at step S2301 so as to carry out the relayout process (step S2305). The relayout process is carried out using the values set in the gap setting dialog window 2401 shown in FIG. 24. For example, if the ratio of the area of sub templates in the last page is less than or equal to the threshold value, the last page has a large white space. In this case, a distance between sub templates on a preceding page from the last page (e.g., an immediately previous page of the last page) is changed (reduced) using the adjustment width set in the gap setting dialog window 2401 shown in FIG. 24. At that time, a page subject to the relayout process needs to be specified. Therefore, before the relayout process at S2305 starts, the layout editing application program 121 displays a gap adjustment range selection dialog window 2601 such as the one shown in FIG. 26. The gap adjustment range selection dialog window 2601 includes selection buttons 2602 to 2604 for selecting target pages subject to the relayout process. This setting process is carried out using the gap adjustment range selection dialog window 2601 shown in FIG. 26 before the relayout adjustment process at step S2305 is carried out. For example, this setting process may be carried out at step S2301.

In this embodiment, the following three relayout methods are defined as examples: a first method "All Pages" (field 2602) in which a gap between sub templates on all pages is changed, a second method "Page Range" (field 2603) in which a gap between sub templates on the pages in the selected range is changed, and a third method "Selected Page" (field 2604) in which a gap between sub templates on the immediately previous page is changed. In either method, a distance between areas on a page different from the page specified in FIG. 25A is to be changed. The layout editing application program 121 then redetermines the positions of the areas into which content data is inserted using the changed distances between the areas (sub templates).

Figure 26:
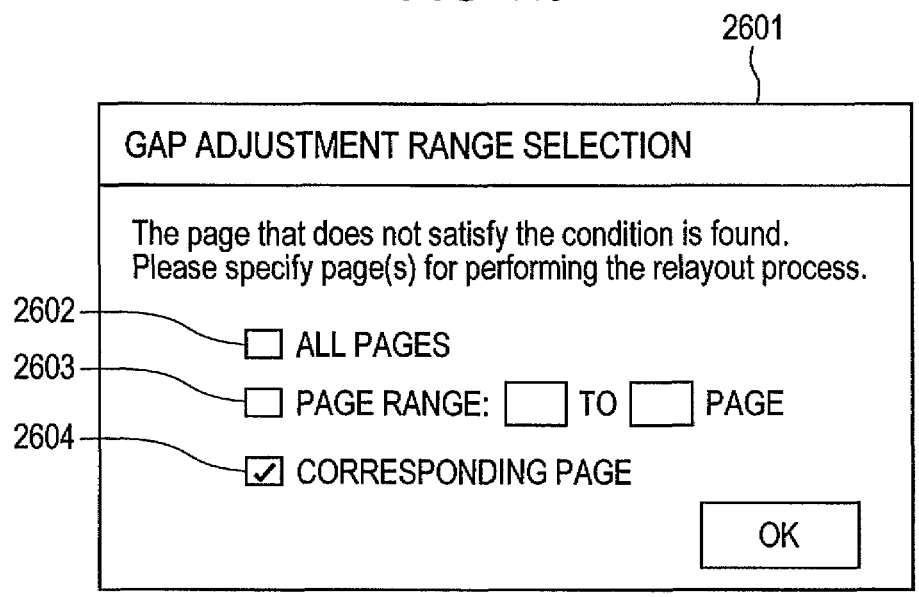
FIG. 26 illustrates an example of a dialog window for setting a target page of a relayout process.

For example, as shown in FIG. 26, if "Selected Page" field 2604 is checked, the relayout process at step S2305 changes a distance between the sub templates arranged on the page immediately before the last page using the adjustment width set in the gap setting dialog window 2401 in FIG. 24. That is, if it is determined at step S2304 that the positional information of the areas arranged on the page specified in the dialog window 2501 in FIG. 25 does not satisfy the condition (threshold value) set in the dialog window 2501 in FIG. 25 (i.e., less than the threshold value), the layout editing application program 121 changes a distance between areas arranged on a page (page specified in FIG. 26) different from the page specified in FIG. 25. Additionally, the layout editing application program 121 changes the distance between the areas using the adjustment width specified in the "Adjustment Width" field 2405 in FIG. 24 and then performs the relayout process using the changed distance between the areas. Thus, the layout editing application program 121 redetermines the positions of the sub templates.

After the relayout process at step S2305 is completed, the layout editing application program 121 determines whether a distance between the sub templates on the page specified as a target page of the relayout process in the gap adjustment range selection dialog window 2601 in FIG. 26 is greater than or equal to the minimum gap size Gmin (step S2306). More specifically, the minimum gap size Gmin set via the gap setting dialog window 2401 in FIG. 24 is stored in the memory unit 136. Accordingly, by referencing the memory unit 136, the layout editing application program 121 can recognize the minimum gap size Gmin. In addition, by recognizing the positions of the sub templates using the layout engine, the layout editing application program 121 can recognize the distance between the sub templates. Finally, by comparing the two values, a process at step S2306 can be carried out.

In the determination process at step S2306, if the layout editing application program 121 determines that a distance between the sub templates on the page specified as a target page of the relayout process in the gap adjustment range selection dialog window 2601 in FIG. 26 is greater than or equal to the minimum gap size Gmin ("No" at step S2306), the process returns to step S2304. At step S2304, the layout editing application program 121 redetermines whether the ratio of the sub template area to the entire area of the page specified at step S2304 is greater than or equal to the threshold value set in the dialog window 2501 shown in FIG. 25. That is, the layout editing application program 121 recognizes the position of the page in which the sub templates are arranged on the basis of the relayout process at step S2305 (i.e., the redetermination process of the arrangement position of the sub template). The layout editing application program 121 then redetermines whether the positional information of the sub template arranged on the page specified in the dialog window 2501 shown in FIG. 25 satisfies the condition set in the dialog window 2501 shown in FIG. 25 (i.e., greater than or equal to the threshold value). If it is determined that the ratio of the sub template area to the entire area of the specified page is greater than or equal to the threshold value ("No" at step S2304), the process shown in FIG. 23 is completed.

However, if it is determined at step S2304 again that the ratio is less than or equal to the threshold value ("Yes" at step S2304), the process proceeds to step S2305. At step S2305, the layout editing application program 121 changes (reduces) the distance between the sub templates on the target page set in the gap adjustment range selection dialog window 2601 shown in FIG. 26 using the adjustment width set in the gap setting dialog window 2401 shown in FIG. 24. Thus, in the process according to this flow chart, the distance between areas arranged on the page different from the page specified in the dialog window 2501 shown in FIG. 25 is changed until the distance becomes the minimum value specified in the gap setting dialog window 2401 shown in FIG. 24. That is, after the relayout process at step 2305 is carried out, the process of this flow chart is carried out until the ratio of the area of the sub template to be arranged on the page specified in the redetermination process at step S2304 reaches a value greater than or equal to the threshold value or the distance between the sub templates on the target page of the relayout process reaches a value less than the minimum value specified in the gap setting dialog window 2401 shown in FIG. 24.

As described above, by changing the distance between areas into which the content data are inserted, a well-balanced printout can be provided. Furthermore, unnecessary print expenses can be prevented. It is noted that the areas whose distance is changed may be the above-described containers (data area) or sub template areas.

Figure 27:
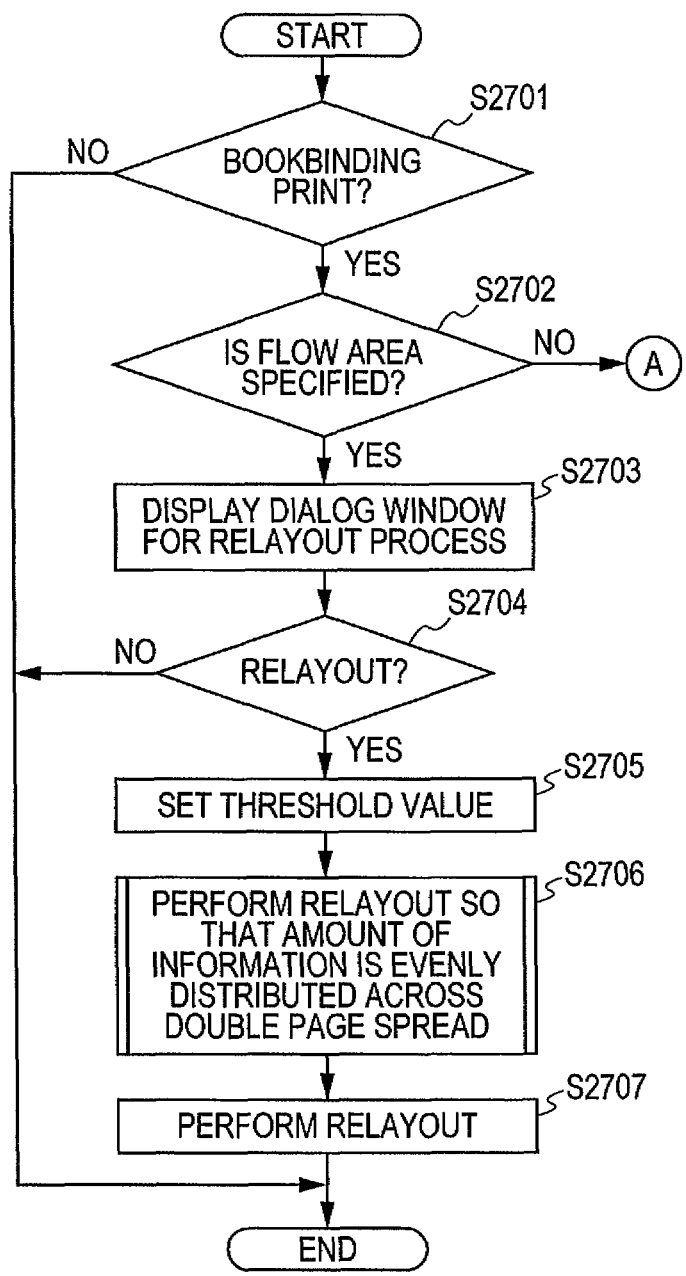
FIG. 27 illustrates a flow chart of an exemplary process in a bookbinding print mode.
Figure 41:
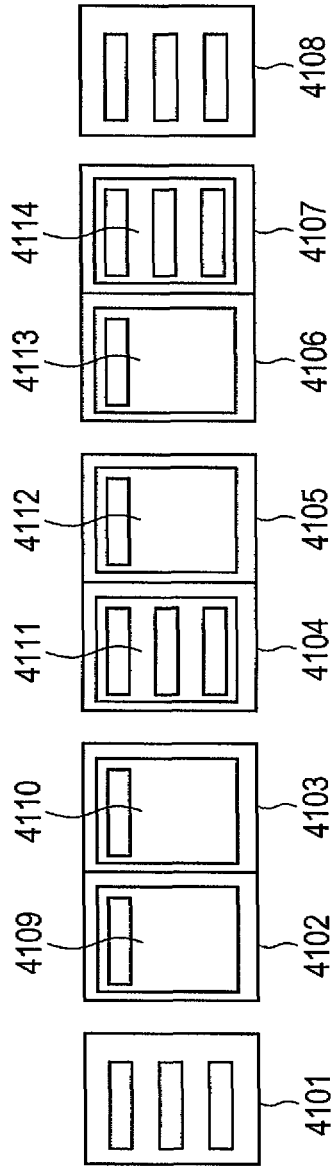
FIG. 41 illustrates a case where a relayout process is required in a bookbinding print mode.

FIG. 27 illustrates a flow chart of a process in a bookbinding print mode according to an embodiment of the present invention. Before the flow chart in FIG. 27 is described, the cases that require the relayout process in a bookbinding print mode are described with reference to FIGS. 41 and 42. In the case shown in FIG. 41, the above-described flow area is set in a document. As shown in FIG. 41, a plurality of flow areas provided in a document as shown by pages 4109 to 4114 may cause the number of sub templates on one page in a double page spread to be much greater than those on the other page, although depending on conditions set to the flow areas. For example, pages 4101-4108 are shown in FIG. 41. Of those, pages can be combined to form a double page spread. For example, the pages 4104 and 4105 form a double page spread. Since flow areas 4111 and 4112 have different set conditions, the numbers of sub templates arranged on these pages are different. The flow chart shown in FIGS. 27 and 29 describes a process to adjust such a difference in the numbers of sub templates that occurs in a double page spread.

In a bookbinding print mode, page areas for four pages are provided on one recording medium. Accordingly, when a bookbinding print mode is selected, the print data includes page areas in multiples of four. For example, as shown in FIG. 42, when print data for six pages is printed in a bookbinding print mode, each of the pages 4206 to 4208 has a large white space since two recording media has page areas for eight pages.

Figure 42:
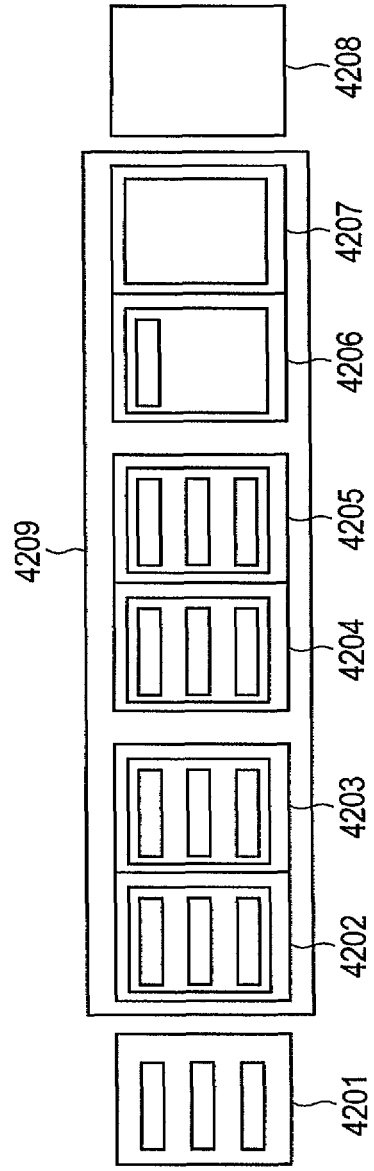
FIG. 42 illustrates a case where a relayout process is required in a bookbinding print mode.

As shown in FIG. 42, the content is supplied for the pages 4201 to 4205 to fill the entire page. However, the sufficient content is not supplied for the entire page 4206, and no content is supplied for the pages 4207 and 4208, and therefore, the pages 4207 and 4208 are blank pages. In this case, by carrying out the relayout process shown by the flow chart in FIG. 45, the content to be arranged on the six pages 4201 to 4206 can be evenly arranged on the specified pages in the range of the pages 4201 to 4208. As a result, the entire content can be evenly arranged on all pages. Thus, the page 4206 that has a large white space and the blank pages 4207 and 4208 shown in FIG. 42 can be effectively utilized.

A flow chart shown in FIG. 27 is described next. The layout editing application program 121 determines whether a bookbinding print mode is set in the print settings (or preview settings) of a document currently being processed (step S2701). More specifically, since the print settings for each document are stored in the memory unit 136, the layout editing application program 121 can carry out a process at step S2701 by referencing the memory unit 136.

If it is determined at step S2701 that a bookbinding mode is selected ("Yes" at step S2701), the layout editing application program 121 determines whether a flow area is specified for the document to be processed (step S2702). Since the layout editing application program 121 recognizes a flow area specified by a user and stores the information in the memory unit 136, the layout editing application program 121 can carry out the process at step S2702 by referencing the memory unit 136.

If it is determined at step S2702 that a flow area is specified ("Yes" at step S2702), the process proceeds to step S2703.

Figure 45:
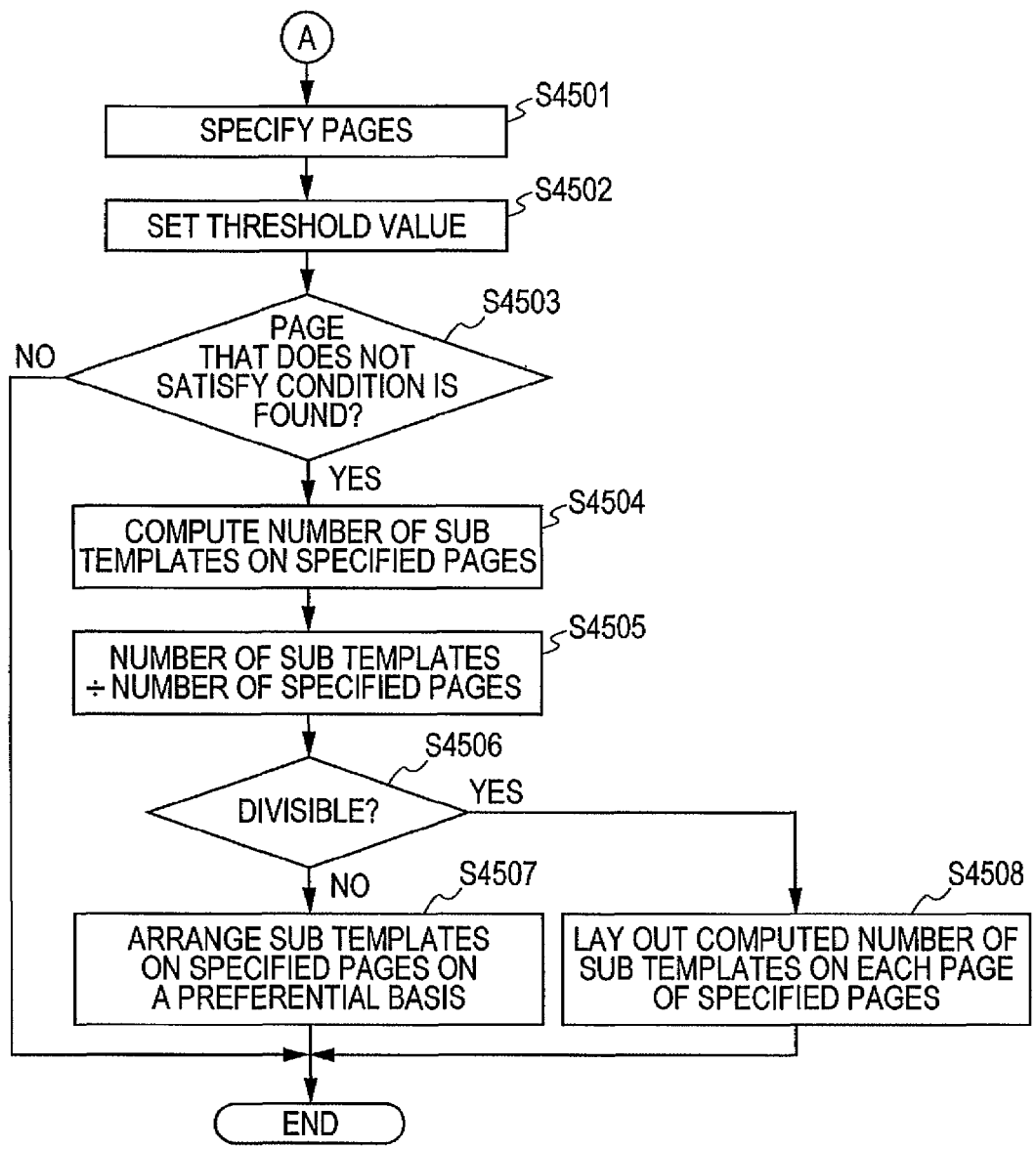
FIG. 45 illustrates a flow chart of a relayout process in a bookbinding print mode.

However, if it is determined at step S2702 that a flow area is not specified ("No" at step S2702), the process proceeds to the procedure of a flow chart shown in FIG. 45. The flow chart shown in FIG. 45 will be described below.

If it is determined at step S2702 that a flow area is specified ("Yes" at step S2702), the layout editing application program 121 displays the gap setting dialog window 2401 for the subsequent predetermined operation (step S2703). The gap setting dialog window 2401 has already been described in relation to FIG. 24, and therefore, the detailed description is not repeated. The layout editing application program 121 recognizes the values set in the gap setting dialog window 2401 and stores the values in the memory unit 136.

Subsequently, the layout editing application program 121 determines whether a relayout process is instructed to start via the gap setting dialog window 2401 (step S2704). This process is similar to the process at step S2302 shown in FIG. 23, and therefore, detailed description of the process is not repeated.

If, at step S2704, it is determined that a relayout process is instructed, the process proceeds to step S2705. Otherwise, the process of this flow chart is completed.

At step S2704, if the layout editing application program 121 determines that a relayout process is selected, the layout editing application program 121 displays a threshold value setting dialog window in order to determine the threshold value which is required as the condition of executing the relayout process (step S2705). The threshold value setting dialog window displayed at step S2705 is basically similar to that shown in FIG. 25. However, in this process flow, since a page group to be printed in a bookbinding mode is a target of the determination, the threshold information input to the dialog window 2501 shown in FIG. 25 is set for the page group.

Subsequently, the layout editing application program 121 inserts content data into a container in the sub template and determines the position of the sub template using the adjustment method shown in FIG. 8. While arranging the sub template subject to the arrangement position determination process in the flow area on the document template, the layout editing application program 121 computes the ratio of the area of the sub template arranged on each page to the page area and compares the ratio with the threshold set at step S2705. That is, the layout editing application program 121 determines whether at least one of the two pages forming the double page spread does not satisfy the condition set for a page group to be printed in a bookbinding mode. In a bookbinding mode, since the first page is never one of the two pages forming the double page spread, only the subsequent pages from the second page are processed in accordance with this flow chart.

Figure 28:
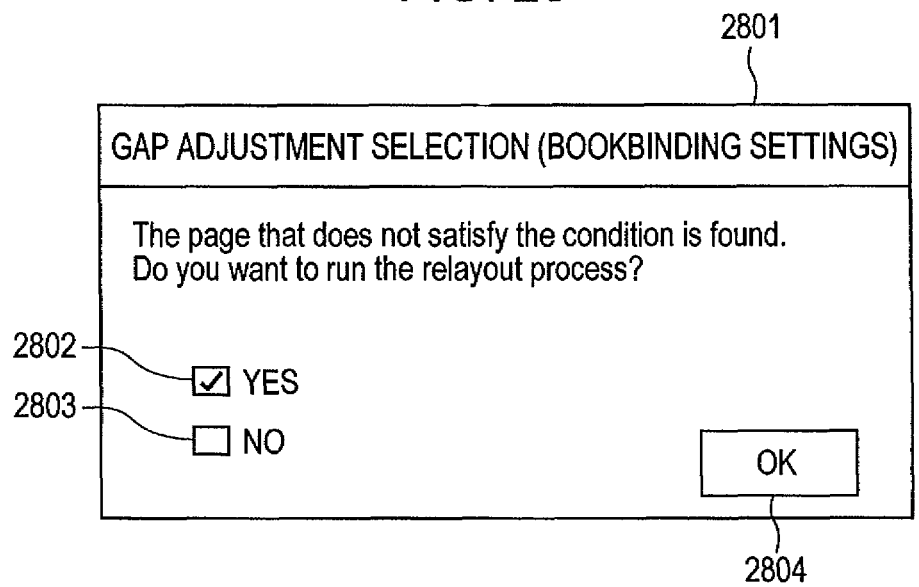
FIG. 28 illustrates an example of a gap adjustment confirmation dialog window in a bookbinding print mode.

The layout editing application program 121 computes the ratio of the area of the sub template arranged on each page to the page area and compares the ratio for each page in the double page spread with the threshold set at step S2705. After the comparison process is completed, if a page whose ratio of the area of sub template is less than or equal to the threshold value is found, that is, if a page that does not satisfy the condition (threshold) set for a page group to be printed in a bookbinding mode is found, a gap adjustment confirmation dialog window 2801 shown in FIG. 28 is displayed.

The gap adjustment confirmation dialog window 2801 includes selection buttons 2802 and 2803 for selecting whether a relayout process is carried out or not. Here, if the selection button 2802 is checked and an OK button 2804 is depressed, the layout editing application program 121 carries out a relayout process to change a distance between sub templates arranged in the double page spread so that amounts of information of the sub templates arranged in the double page spread become even (step S2706). The detailed process at step S2706 is shown in FIG. 29 and is described below.

The layout editing application program 121 carries out a relayout process using the distance between sub templates computed at step S2706 (step S2707). Processing then ends.

Figure 29:
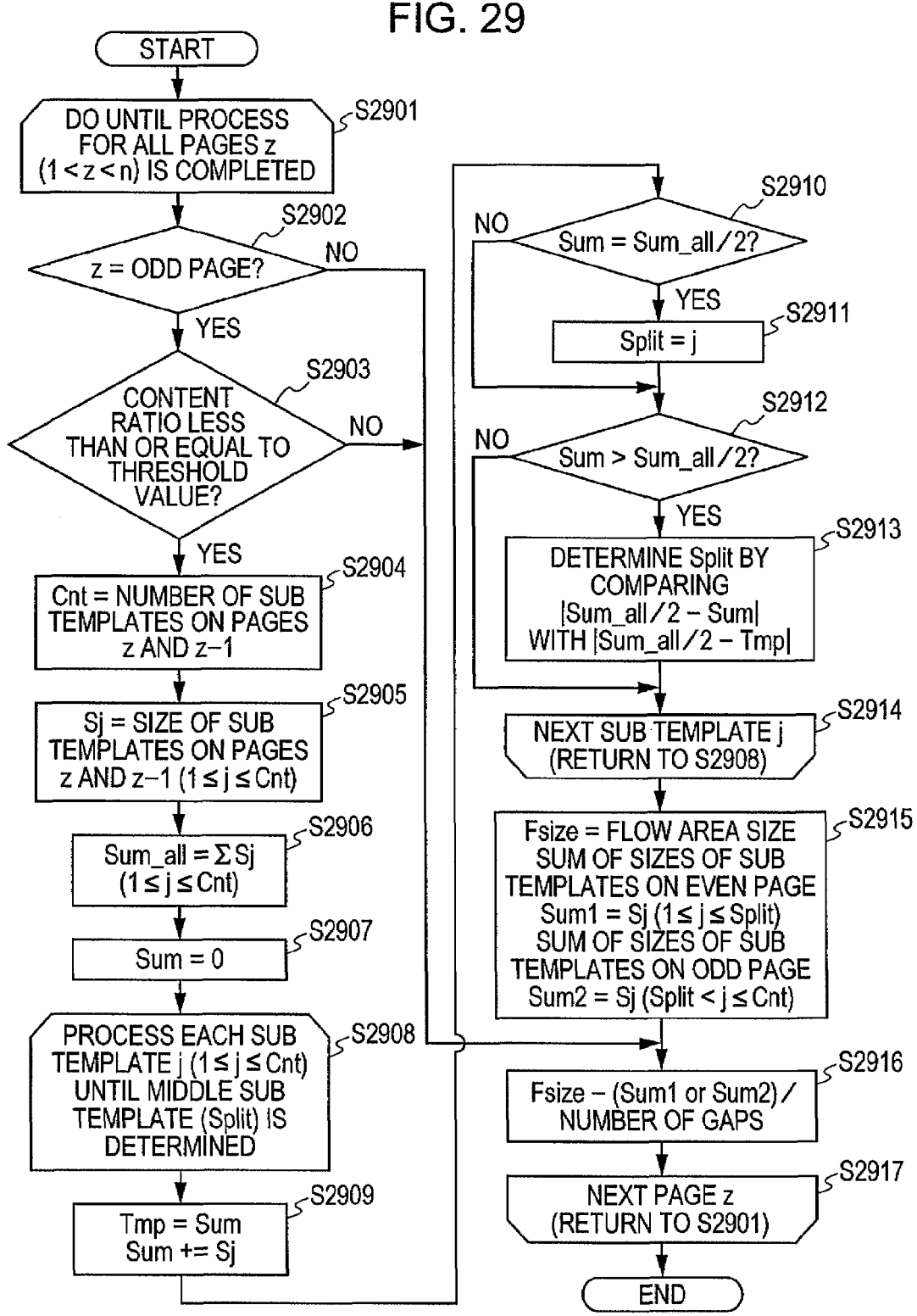
FIG. 29 is a flow chart illustrating an example of a gap size computing process in a bookbinding print mode.

FIG. 29 illustrates a flow chart of a process to compute a distance between sub templates to be changed in order to evenly arrange amounts of information of the sub templates in the double page spread in a bookbinding print mode according to this embodiment of the present invention. For example, to change a layout such as the one shown in FIG. 41 to a layout such as the one shown in FIG. 43. FIG. 43 includes pages 4301-4308. Of these pages, some pages are combined to form double page spreads, for example, pages 4304 and 4305 form a double page spread. In FIG. 41, the sub templates are not evenly distributed. For example, page 4104 contains three sub templates and page 4105 contains one sub template. In FIG. 43, the sub templates are evenly distributed. For example, there are two sub templates on page 4304 and two sub templates on page 4305.

The layout editing application program 121 repeats the following operation until this operation is carried out for all the pages z (1<z≤n) that has a flow area. In other words, the processing from step S2901 to step S2917 is carried out for each page z that satisfies (1<z≤n). Here, z represents any page number and n represents the page number of the last page that has a flow area.

The layout editing application program 121 determines whether the page number z is odd (step S2902). More specifically, since the attribute information for all pages are stored in the memory unit 136, the layout editing application program 121 can recognize the target page z by referencing the memory unit 136. Thus, the determination process at step S2902 can be carried out.

If, at step S2902, it is determined that the page z is an odd page, the layout editing application program 121 determines whether the ratio of the area of sub templates in the page (z−1) or the page z is less than or equal to the above-described threshold value (step S2903). Since this process is similar to the process at step S2304 shown in FIG. 23, the detailed description is not repeated.

If, at step S2903, it is determined that the ratio of the area of sub templates in the page (z−1) or the page z is less than or equal to the threshold value, the layout editing application program 121 acquires the number of sub templates Cnt contained in the page (z−1) and the page z (step S2904). More specifically, since the layout result after the layout process is completed is stored in the memory unit 136, the layout editing application program 121 can recognize the positions of the sub templates by referencing the memory unit 136. Thus, the process at step S2904 can be carried out.

Subsequently, the layout editing application program 121 acquires a size Sj (1≤j≤Cnt) of each sub template arranged in the page z and the page (z−1) (step S2905). Since the layout result computed by the above-described layout adjustment process shown in FIG. 8 is stored in the memory unit 136, the layout editing application program 121 can acquire the size of each sub template.

The layout editing application program 121 computes the sum (Sum_all) of sizes of all the sub templates contained in the page z and the page (z−1) (step S2906). The sum of the sub templates computed at step S2906 is stored in the memory unit 136 for each page.

At steps S2907 through S2914, a reference middle sub template is determined in order to substantially equalize amounts of sub templates (amounts of information) in the pages z and (z−1) which form a double page spread. That is, a sub template that serves as a border between sub templates to be arranged in the page (z−1) and in the page z is determined at these steps.

The layout editing application program 121 initializes a variable Sum used to store the total value of the sub templates to zero (step S2907).

The layout editing application program 121 repeats the process from step S2908 to step S2914 until a middle sub template Split is determined from among the sub templates arranged in the pages z and (z−1) (step S2908).

The layout editing application program 121 defines a variable Tmp used to store the sum of the sizes of sub templates prior to a sub template j of interest and stores the sum of the sizes of the first sub template to a sub template (j−1), which is a sub template immediately before the sub template j, in the variable Tmp. The layout editing application program 121 then adds the size of the sub template j to Sum (step S2909). The value computed at step S2909 is stored in the memory unit 136.

After the layout editing application program 121 adds the size of the sub template j to Sum, that is, after the process at step S2909 is completed, the layout editing application program 121 determines whether a half of the sum (Sum_all), which is the sum of the sizes of all the sub templates arranged in the pages z and (z−1) and which is computed at step S2906, is equal to the value of Sum computed at step S2909 (step S2910). More specifically, since the sum (Sum_all) of sizes of all the sub templates arranged in the pages z and (z−1) and which is computed at step S2906 is stored in the memory unit 136, the layout editing application program 121 can compare the half of Sum_all with Sum computed at step S2909.

If, at step S2910, it is determined that Sum computed at step S2909 is equal to the half of Sum_all computed at step S2906, the layout editing application program 121 determines the sub template j to be the middle sub template Split and stores it in the memory unit 136 (step S2911). That is, the sub template j of current interest is determined to be located at the middle of all the sub templates arranged in the pages z and (z−1). When, at step S2911, the middle sub template Split is determined, a flag that indicates that information is set. Thus, the layout editing application program 121 skips the processes at steps S2912 and S2913 and the process proceeds to step S2915.

However, if, at step S2910, it is determined that Sum is not equal to a half of Sum_all, the layout editing application program 121 determines whether Sum computed at step S2909 is greater than a half of Sum_all (step S2912). If, at step S2912, it is determined that Sum is smaller than a half of Sum_all, it is determined that the sub template j of current interest is a sub template prior to the middle sub template. Accordingly, the process returns to step S2908 to repeat the same process for the next sub template (j+1). If, at step S2912, it is determined that Sum is greater than a half of Sum_all, the layout editing application program 121 compares the sum of the sizes of sub template up to the sub template (j−1) with the sum of the sizes of sub template up to the sub template j. By this comparison process, the layout editing application program 121 determines the middle sub template Split such that the middle sub template Split is close to a half of Sum_all (step S2913). That is, if it is determined that the condition is satisfied at step S2912, it is determined that the sub template j of current interest exceeds the middle sub template and the process at step S2913 is carried out. More specifically, the absolute value of a difference between a half of Sum_all and the sum Sum of the sizes of the sub template up to the sub template j is compared with the absolute value of a difference between a half of Sum_all and the sum Tmp of the sizes of the sub template up to the sub template (j−1). The smaller value is stored in the memory unit 136 as the middle sub template Split.

Thus, if, at step S2912, the condition is satisfied, it is determined which one is considered to be the middle sub template, the sub template of current interest or the sub template immediately before the sub template of current interest. When, at step S2911 or S2913, the middle sub template (Split) is determined, the layout editing application program 121 terminates the processes at steps S2908 to S2914 and the process proceeds to step S2915.

After the layout editing application program 121 determines the middle sub template Split at steps S2908 to S2914, the layout editing application program 121 determines a distance between the sub templates on the pages z and (z−1). More specifically, the layout editing application program 121 acquires a size Fsize of a flow area of current interest. Since the size Fsize of a flow area is stored in the memory unit 136, the layout editing application program 121 can acquire the size Fsize by referencing the memory unit 136. Thereafter, the layout editing application program 121 computes a sum Sum1 of the sizes of the sub templates on the page (z−1) (i.e., the sum of the sizes of the sub templates up to the middle sub template) and a sum Sum2 of the sizes of the sub templates on the page z (i.e., the sum of the sizes of the sub templates from immediately after the middle sub template to the lowermost sub template on the page z) (step S2915). The process at step S2915 can be carried out by using the method for carrying out the process at step S2905.

Subsequently, the layout editing application program 121 carries out a computing process so that a distance between the sub templates on each page can be determined (step S2916). According to this embodiment, for example, the following equation is used to compute the distance to be changed between the sub templates: {Fsize−(Sum1 or Sum2)/number of gaps}, where, as described above, Sum1 is a sum of the sizes of the sub templates on the page (z−1) and Sum2 is a sum of the sizes of the sub templates on the page z. That is, the sum of distances between sub templates in the flow area is computed by using equation {Fsize−(Sum1 or Sum2)}. The computed sum is evenly allocated to the number of gaps between the sub templates in each page. Thus, the distance between the sub templates can be computed. It is noted that the number of gaps between sub templates is equal to (the number of sub templates on each page)+1.

If the layout editing application program 121 determines that the above-described process is completed for all the pages in the flow area of a multi-record (step S2917), the layout editing application program 121 terminates the process of the flow chart shown in FIG. 29.

In the process of the flow chart shown in FIG. 29, when, at step S2903, it is determined that at least one of the pages in a double page spread does not satisfy the condition set for a page group to be printed in a bookbinding mode, the distance between areas (sub templates) into which the content data are inserted can be changed so that the amount of information is evenly distributed on a double page spread basis for printing in a bookbinding mode. Consequently, a bookbinding printout having a well-balanced double page spread can be provided, for example see FIG. 43.

A flow chart shown in FIG. 45 is described next. The flow chart shown in FIG. 45 illustrates the process carried out when it is determined at step S2702 in FIG. 27 that a flow area is not present (i.e., "No" at step S2702). The layout editing application program 121 selects a page group that is a target of the relayout process (step S4501). Pages in the selection range specified at step S4501 are stored in the memory unit 136. The layout editing application program 121 displays a dialog window for prompting a user to specify a threshold value that is a condition to start the relayout process and receives the threshold value for the page group including the pages in the selected range (step S4502). At step S4502, the threshold value is set for a page group in the range selected at step S4501. The threshold value setting dialog window used here is similar to that shown in FIG. 25. The threshold value set at step S4502 is stored in the memory unit 136.

Next, the layout editing application program 121 determines whether a page that does not satisfy the threshold value (condition) set at step S4502 is found in the selected range (step S4503). More specifically, the layout editing application program 121 inserts content data into containers and determines the layout using the adjustment method shown in FIG. 8. While arranging the containers whose layout is adjusted in a document template, the layout editing application program 121 determines whether a page that does not satisfy the condition is present in the selected range. That is, the layout editing application program 121 determines whether a page on which all sub templates are less than the threshold value set at step S4502 is present. By carrying out the process at step S4503, when it is determined that a bookbinding printing mode is selected, the layout editing application program 121 can determine for each page whether the arrangement information of the sub template area arranged in a page group in the specified range satisfies the condition set for the page group.

If, at step S4503, it is determined that no pages that do not satisfy the condition are found ("No" at step S4503), the layout editing application program 121 determines that it need not carry out a relayout process and terminates the process shown by the flow chart in FIG. 45.

However, if, at step S4503, it is determined that a page that does not satisfy the condition is present ("Yes" at step S4503), the layout editing application program 121 computes the number of sub templates in the pages specified at step S4501 (step S4504). More specifically, since the layout editing application program 121 stores the layout result laid out using the adjustment method shown in FIG. 8, the layout editing application program 121 can recognize information about sub templates including a page area in which contents are arranged. Thus, the layout editing application program 121 can acquire the pages selected at step S4502 and the number of sub templates arranged in the selected pages by referencing the memory unit 136.

The layout editing application program 121 divides the number of sub templates arranged in the selected pages computed at step S4504 by the number of pages specified at step S4501 (step S4505). For example, as shown in FIG. 42, when the pages 4202 to 4207 are selected, the number of the sub templates laid out in the selected pages is 13. Accordingly, the layout editing application program 121 computes 13 (number of sub templates)/6 (number of selected pages).

If the layout editing application program 121 determines that the number of sub templates is divisible by the number of selected pages on the basis of the calculation at step S4505 ("Yes" at step S4506), the layout editing application program 121 lays out the computed number of the sub templates computed at step S4506 in each page of the selected pages (step S4508).

In contrast, if it is determined that the number of sub templates is not divisible by the number of selected pages on the basis of the calculation at step S4505 ("No" at step S4506), the layout editing application program 121 displays a UI asking a user on which page the sub templates corresponding to the remainder are laid out on a preferential basis. The layout editing application program 121 lays out the sub templates corresponding to the remainder on the pages selected in the UI on a preferential basis (S4507). For example, if it is specified that the sub templates are laid out from the top page, the remaining sub templates are arranged from the top page. In FIG. 42, according to the calculation 13 (number of sub templates)/6 (number of selected pages), two sub templates are arranged in each page and the remaining one sub template is laid out from the top page among the selected pages. FIG. 44 illustrates the result of this layout. It should be noted that the number of sub templates to be arranged in each page area determined at steps S4508 and S4507 has been changed from the number of sub templates initially arranged in each page. For example, as shown in FIG. 42, three sub templates are initially arranged on each of the pages 4202 to 4205, and one sub template is arranged on the page 4206. In contrast, after the process shown by the flow chart in FIG. 45 is executed, the number of the sub templates arranged on each page in the selected page range is changed, as shown in FIG. 44, i.e., there are three sub templates on the first selected page 4402 and two sub templates on the second-sixth selected pages 4403-4407, respectively. The number of sub templates in the non-selected pages 4401 and 4408 remains unchanged. In accordance with this change, the layout editing application program 121 changes a distance between the sub templates and determines the positions of the sub templates so that a plurality of sub templates arranged in a page group in the selected range is evenly allocated to the pages in the page group in the selected range.

As described above, in a bookbinding print mode, page areas for four pages are provided to one recording medium. Accordingly, page areas in multiples of four are always provided. In contrast, when print data generated in a bookbinding print mode is allocated to each page, the print data is not always allocated to the page areas in multiples of four, and therefore, a blank page area may be generated. Consequently, a well-balanced appearance is not necessarily obtained. To solve this problem, by carrying out the process shown in FIG. 45, areas (e.g., sub template areas) into which content data are inserted can be evenly arranged in the pages in a predetermined range in a bookbinding print mode. Thus, a bookbinding printout having a well-balanced appearance for the pages in the predetermined range can be obtained.

Figure 30:
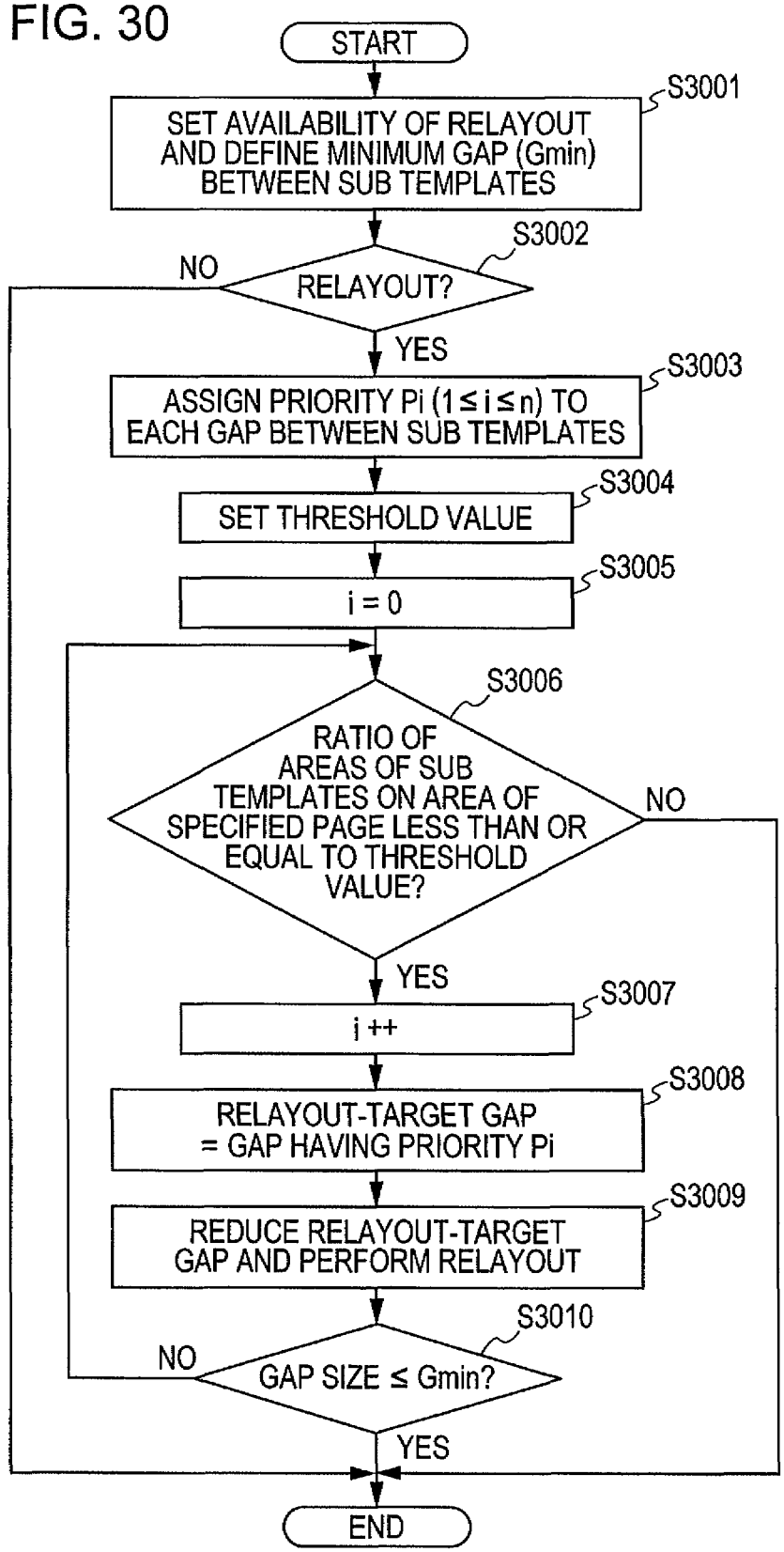
FIG. 30 is a flow chart of a process when a priority is assigned to a gap between sub templates.

FIG. 30 illustrates a flow chart of a process when a priority is assigned to a gap between sub templates according to this embodiment. For some users, there are two types of a gap: a gap which the users allow to have a variable length and a gap which the users desire to have a constant length if possible. Therefore, in FIG. 30, a priority is assigned to a gap between sub templates so that the change of the length of a gap having a high priority is minimized.

The layout editing application program 121 displays the gap setting dialog window 2401 shown in FIG. 24. Since the gap setting dialog window 2401 shown in FIG. 24 has already been described, the detailed description is not repeated. The layout editing application program 121 recognizes the values set in the dialog window 2401 and stores them in the memory unit 136 (step S3001).

The layout editing application program 121 then determines whether or not a relayout process is instructed to start at step S3001 (step S3002). Since the process at step S3002 is similar to the process at step S2302, the detailed description is not repeated.

If it is determined at step S3002 that the relayout process is not instructed to start, processing ends. However, if it is determined at step S3002 that the relayout process is instructed to start, the layout editing application program 121 displays a dialog window 3101 shown in FIG. 31A for setting a priority for a gap between sub templates so that a priority is set to a gap (step S3003). In FIG. 30, a priority is represented as Pi (1≤i≤n). The variable i of a higher value indicates a higher priority. The priority assigned to each gap is stored in the memory unit 136. That is, the layout editing application program 121 assigns the lowest priority to a gap between areas that is changed first.

Subsequently, to prompt, via a user interface, a user to set a threshold value which is a condition to start a relayout process, the layout editing application program 121 displays the dialog window 2501 shown in FIG. 25 so that the threshold value is set (step S3004). Since the dialog window 2501 shown in FIG. 25 has already been described, the detailed description is not repeated.

The layout editing application program 121 then initializes the variable i to zero in order to adjust the distances of the gaps between sub templates according to the priority order of gaps from low to high (step S3005).

By carrying out the processes up to step S3005, the setting of a threshold value and a relayout process are completed. The layout editing application program 121 inserts content data into containers in a sub template and carries out a layout adjustment process for the sub template using the adjustment method shown in FIG. 8. While arranging the sub template subject to the layout adjustment process in the document template, the layout editing application program 121 computes the ratio of the area of the sub template arranged on a page specified in the dialog window 2501 shown in FIG. 25 to the entire page area and compares the ratio with the threshold value set at step S3004 (step S3006). Since the process at step S3006 is similar to the process at step S2304 shown in FIG. 23, the detailed description is not repeated.

If it is determined at step S3006 that the ratio of the area of the sub template in the specified page is not less than or equal to the threshold value, processing ends. On the other hand, if it is determined at step S3006 that the ratio of the area of the sub template in the specified page is less than or equal to the threshold value, the layout editing application program 121 increments the variable i by one in order to change the distance of a gap between the sub templates in the order of priority (step S3007). The layout editing application program 121 selects a gap size to be laid out again in the priority order of gap from low to high (step S3008). More specifically, when the process at step S3008 is carried out for the first time, i=1. Therefore, a gap between sub templates having a priority Pi of 1 is selected as a target gap of the relayout process. Since the priorities of the gaps between the sub templates are stored in the memory unit 136, the layout editing application program 121 can acquire the priorities of the gaps between the sub templates by referencing the memory unit 136. The gap selected at step S3008 is temporarily stored in the memory unit 136.

After the target gap of the relayout process is selected, the layout editing application program 121 carries out a relayout process by adjusting the distance of the gap using the adjustment width set in the gap setting dialog window 2401 shown in FIG. 24 (step S3009). More specifically, since the target gap of the relayout process and the values used for the relayout process and set in the gap setting dialog window 2401 shown in FIG. 24 are stored in the memory unit 136, the layout editing application program 121 can carry out the process at step S3009 by referencing the memory unit 136.

The layout editing application program 121 recognizes the result of the relayout processing at step S3009 and determines whether the gap size between the sub templates is less than or equal to the minimum value (Gmin) (step S3010). If the gap is not less than or equal to (i.e., the gap is greater than) the minimum value (Gmin), the process returns to step S3006, where the layout editing application program 121 redetermines whether the ratio of the area of sub templates in the selected page is greater than or equal to the threshold value. If it is determined that the ratio of the area of sub templates in the selected page is less than or equal to than the threshold value, the process is completed normally. However, if it is determined at step S3006 that the ratio of the area of sub templates in the selected page is less than or equal to the threshold value, the process proceeds to step S3007, where a gap between sub templates having the next higher priority is selected and the relayout process is carried out for that gap. This process is repeated until the ratio of the area of sub templates in the page selected in the dialog window 2501 shown in FIG. 25 becomes greater than the threshold value or until the ratio becomes less than the minimum value.

By using the process shown in FIG. 30, the relayout process is carried out for gaps between sub templates starting from that having the lowest priority. Consequently, the layout can be achieved just as the user designed.

Figure 31A:
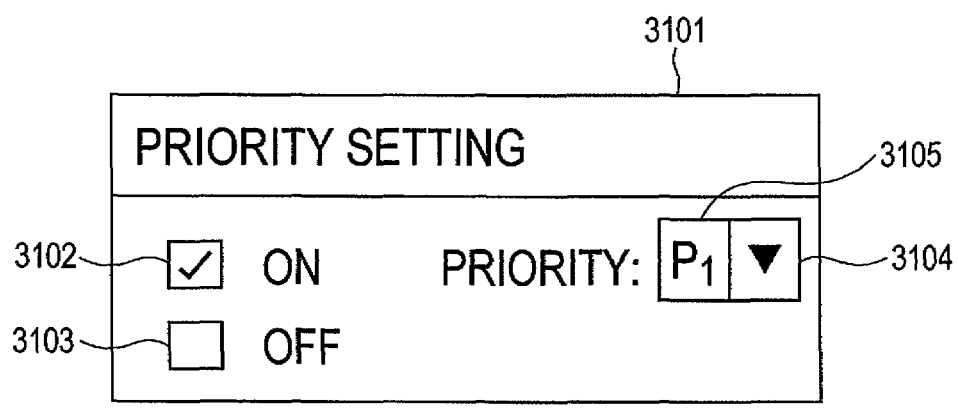
Figure 31B:
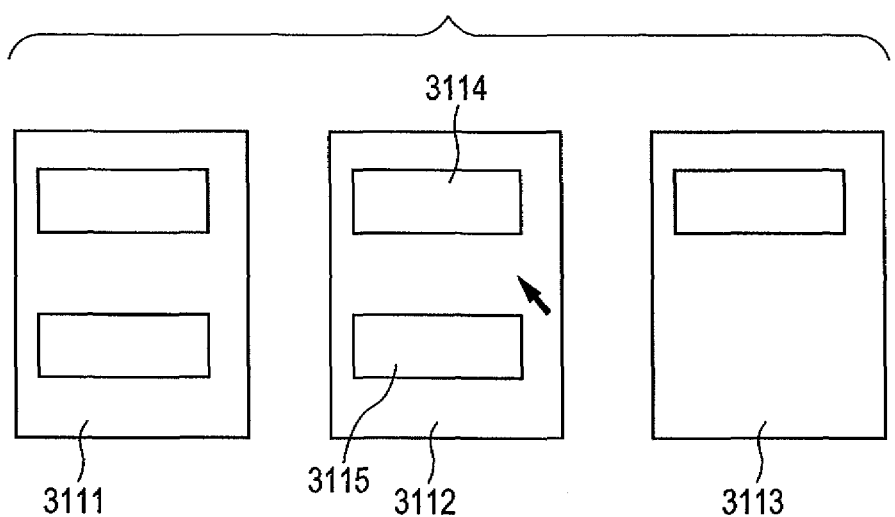
FIG. 31B illustrates examples of the priority setting dialog windows when a priory is set.

FIGS. 31A and 31B illustrate a dialog window for setting a priority for a gap between sub templates.

In FIG. 31A, a dialog window 3101 for setting a priority for a gap includes a drop-down menu 3104 for setting a priority level when a priority setting ON field 3102 is checked. By clicking on the drop-down menu 3104, a value indicating a priority is displayed in a field 3105. ON/OFF setting of the priority is applied to a flow area. When the priority setting is ON, priority settings for all the gaps between sub templates are turned on and the priorities for all the gaps are initialized to a priority of $P_1$. To change the priority of a gap, the priority in the dialog window 3101 needs to be changed. The priority setting can be turned off by checking an OFF field 3103.

FIG. 31B illustrates an example of a document template when a priority is changed using the dialog window shown in FIG. 31A.

A document template in which sub templates are arranged is displayed as shown in FIG. 31B. Accordingly, the user selects a gap to which the user desires to assign a priority by using, for example, a mouse. In the example shown in FIG. 31B, a document includes pages 3111 to 3113. The user selects a gap between the sub templates 3114 and 3115 on the page 3112 and performs a predetermined operation, so that the priority setting dialog window 3101 is displayed.

By checking the priority setting ON field 3102 shown in FIG. 31A and setting a priority using the drop-down menu 3104, the priority is assigned to the gap between the sub templates 3114 and 3115. It is noted that a unique priority may be set for a gap or the same priority may be set for a plurality of gaps. For the gaps between sub templates having the same priority, the relayout process is carried out at the same time. Additionally, the priority set here is stored in the memory unit 136.

Figure 32:
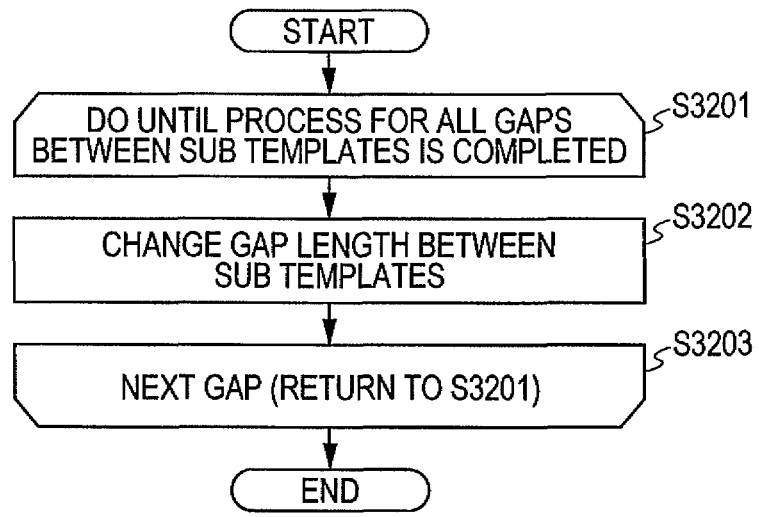
FIG. 32 is a flow chart of an example of a relayout process when gaps in all pages are adjusted in a normal print mode.

FIG. 32 is a flow chart of a relayout process when an "All Pages" field 2604 shown in FIG. 26 is checked.

The layout editing application program 121 carries out a relayout process using the adjustment width set in the gap setting dialog window 2401 shown in FIG. 24. That is, the layout editing application program 121 changes the distance between sub templates by the adjustment width specified in the gap setting dialog window 2401 shown in FIG. 24 (step S3202) until all the gaps between the sub template in the flow area of a multi-record are processed (steps S3201 and S3203). More specifically, the layout engine of the layout editing application program 121 moves one of the two sub templates that form a gap to be subjected to the relayout process by the adjustment width so as to carry out the relayout process. It is noted that the process at step S3202 may be carried out by moving each of the two sub templates that form the gap by a half of the adjustment width.

Figure 33:
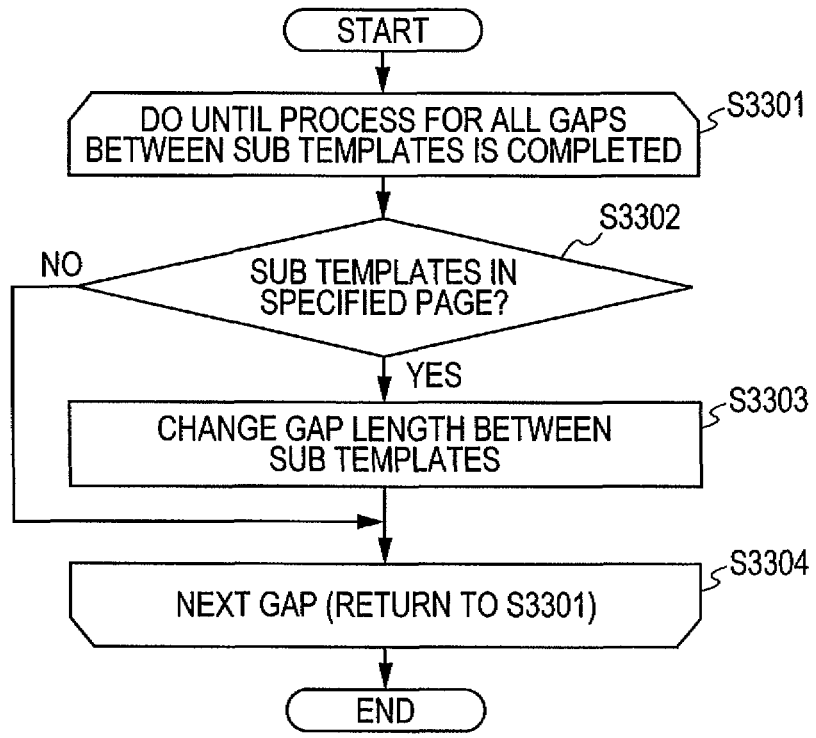
FIG. 33 illustrates a flow chart of a relayout process when gaps in the specified page range are adjusted in a normal print mode.

FIG. 33 illustrates a flow chart of a relayout process when a "Selection Page Range" field 2605 shown in FIG. 26 is selected.

The layout editing application program 121 repeats the following operation until all the gaps between sub template in a flow area on a document template (step S3301).

The layout editing application program 121 determines whether a gap between sub templates of current interest is one of the gaps of the sub templates on the page set in the gap adjustment range selection dialog window 2601 shown in FIG. 26 (step S3302). More specifically, by recognizing the positions of the sub templates that form the gap, the layout editing application program 121 determines which sub templates form the gap. To determine the sub templates, the layout editing application program 121 can identify the position of the gap between the sub template by using the positional information of sub templates stored in the memory unit 136. This identification process allows the process at step S3302 to be carried out.

If it is determined at step S3302 that the gap of current interest is one of the gaps of the sub templates on the page set in the gap adjustment range selection dialog window 2601, the layout editing application program 121 changes the distance of the gap using the adjustment width set in the gap setting dialog window 2401 shown in FIG. 24 (step S3303). Since this process is similar to that at step S3302, the description is not repeated. In contrast, if it is determined at step S3302 that the gap of current interest is not one of the gaps of the sub templates on the page set in the gap adjustment range selection dialog window 2601, the next gap between sub templates is processed (step S3304). When all the gaps are processed, the process shown by the flow chart in FIG. 33 is completed. By executing the process shown in FIG. 33 in which the distance between areas on the specified page is changed, the relayout can be achieved just as the user designed.

Figure 34:
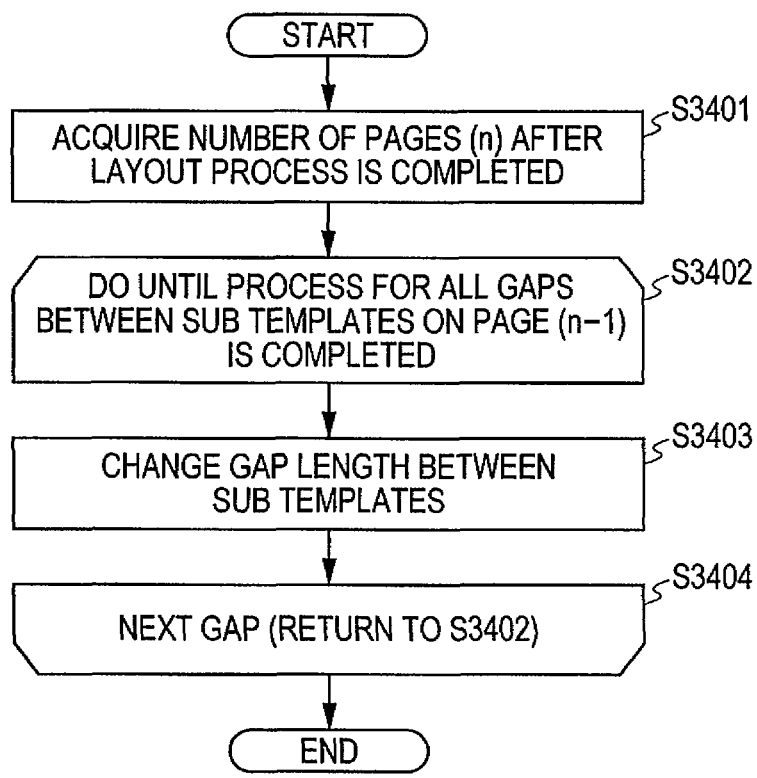
FIG. 34 illustrates a flow chart of a relayout process when gaps in the specified page are adjusted in a normal print mode.

FIG. 34 illustrates a flow chart of a relayout process when a "Corresponding Page (second last page)" field 2606 in FIG. 26 is selected.

The layout editing application program 121 acquires the page count n after a layout operation in which content data are inserted into sub templates and the sub templates are laid out in a flow area (step S3401). Since the layout information after the layout operation is carried out is stored in the memory unit 136, the layout editing application program 121 can acquire the page count after the layout operation by referencing the memory unit 136.

After the layout editing application program 121 acquired the page count at step S3401, the layout editing application program 121 changes the distance between gaps of sub templates on the page (n−1) immediately before the last page using the adjustment width set in the gap setting dialog window 2401 shown in FIG. 24 (step S3403) until all the gaps between the sub templates on the page (n−1) are processed (step S3402). Since the process at step S3403 is similar to that at step S3202 in FIG. 32, the detailed description is not repeated.

After carrying out the process at step S3403 for all the gaps between the sub templates on the page (n−1) immediately before the last page, the layout editing application program 121 terminates the process of the flow chart shown in FIG. 34.

Figure 35:
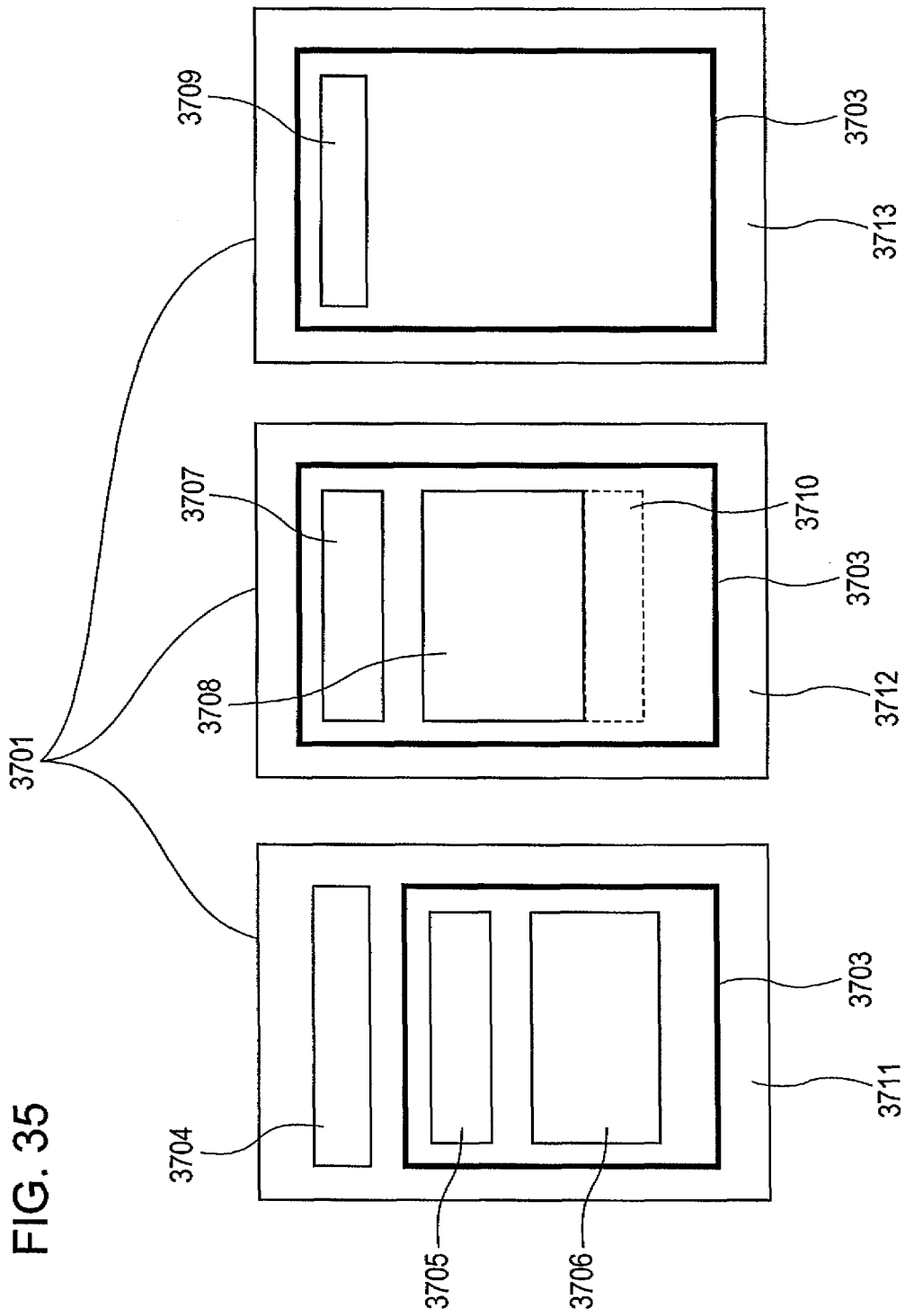
FIG. 35 illustrates a layout after a first layout adjustment process is completed in a normal print mode.

FIG. 35 illustrates the layout after the first layout adjustment process shown in FIG. 8 is completed in a normal print mode according to this embodiment.

In document templates 3701, containers into which content data are inserted are laid out. The frame 3703 with a heavy line represents a flow area in which sub templates are arranged. The content data are inserted into a container 3704. Sub templates 3705 to 3709 are arranged in the document templates 3701. Although not shown, containers into which content data are inserted are also arranged in the sub templates 3705 to 3709. The area 3710 surrounded by a dotted line indicates the expanded area of the sub template 3708 when the sub template 3708 is inserted with content data and is laid out. The expanded sub template 3708 causes the next sub template 3709 to move to a page 3713. As shown in FIG. 35, the sub templates are arranged over the following three pages: a first page 3711, a second page 3712, and the third page 3713. In FIG. 35, it is set using the threshold value setting dialog window 2501 shown in FIG. 25 that a relayout process is started when the area of sub templates on the last page is less than or equal to 50% of the area of the last page. In addition, in FIG. 35, the area of the sub template 3709, which is arranged on the last page 3713, is less than or equal to the threshold value.

Figure 36:
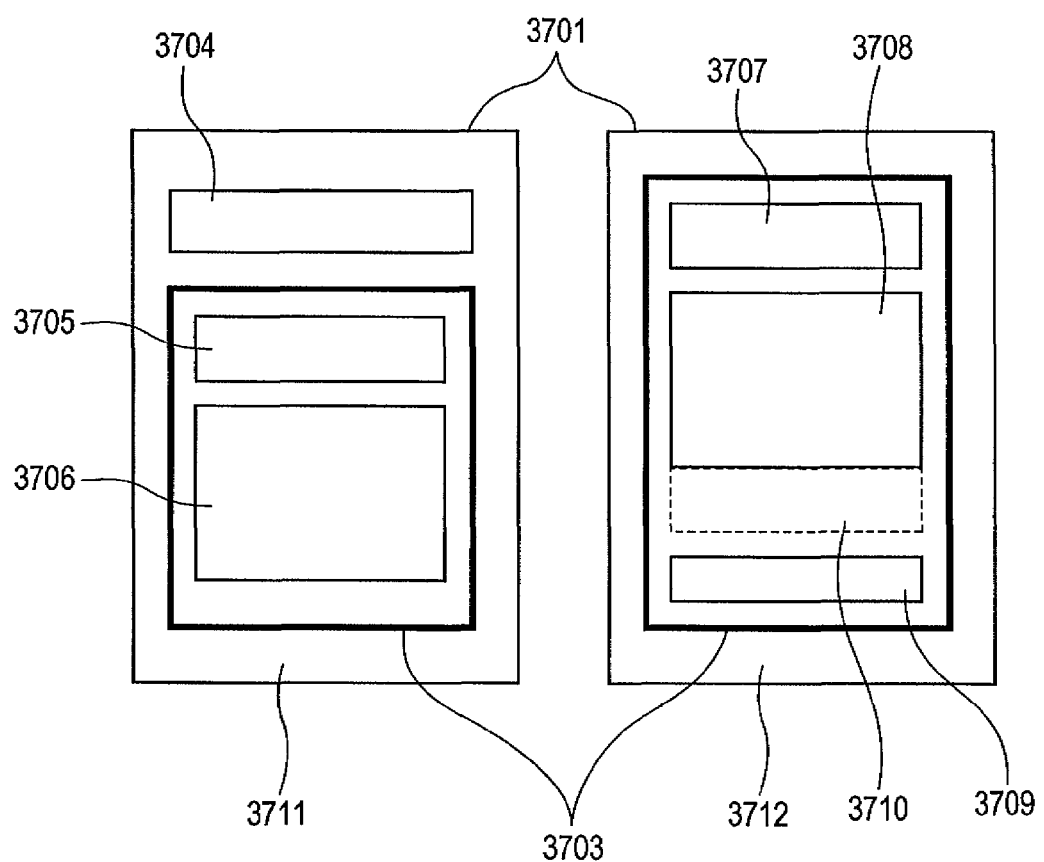
FIG. 36 illustrates a layout after the gaps between sub templates on pages are reduced when the "All Pages" field is checked.
Figure 37:
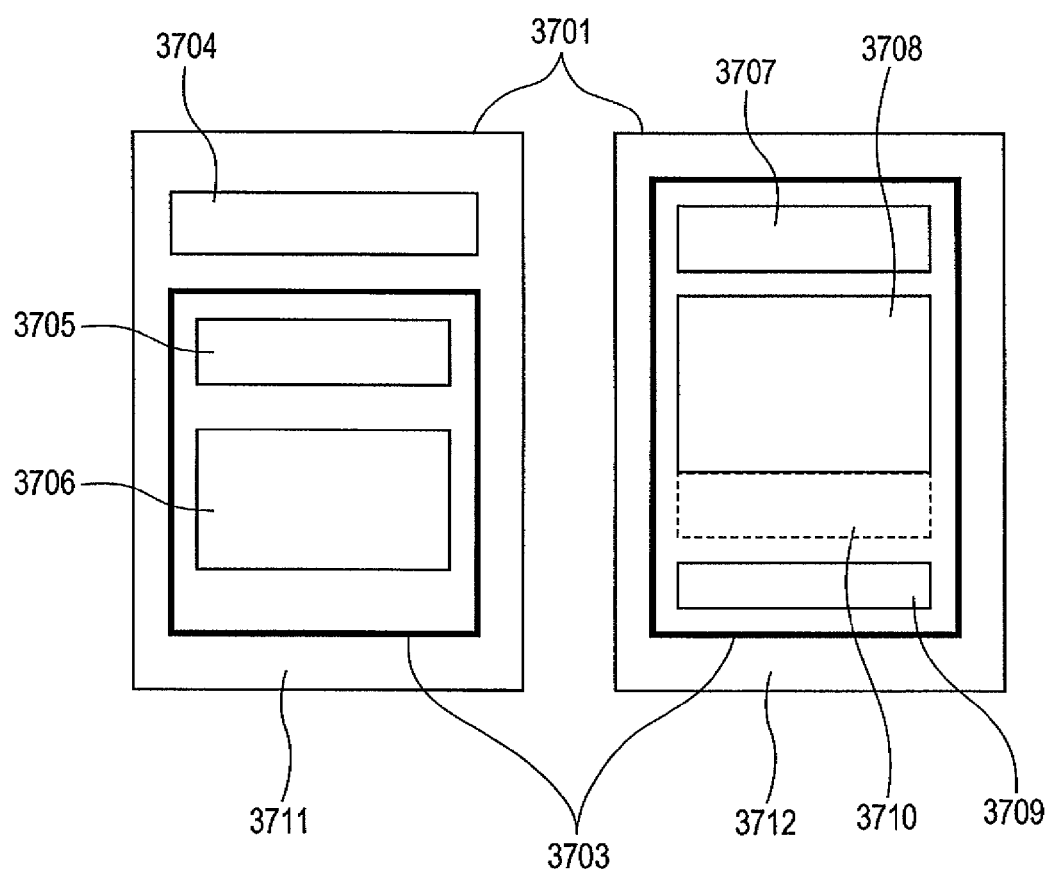
FIG. 37 illustrates a layout after the gaps between sub templates on pages specified in a "Page Range" field are reduced.
Figure 38:
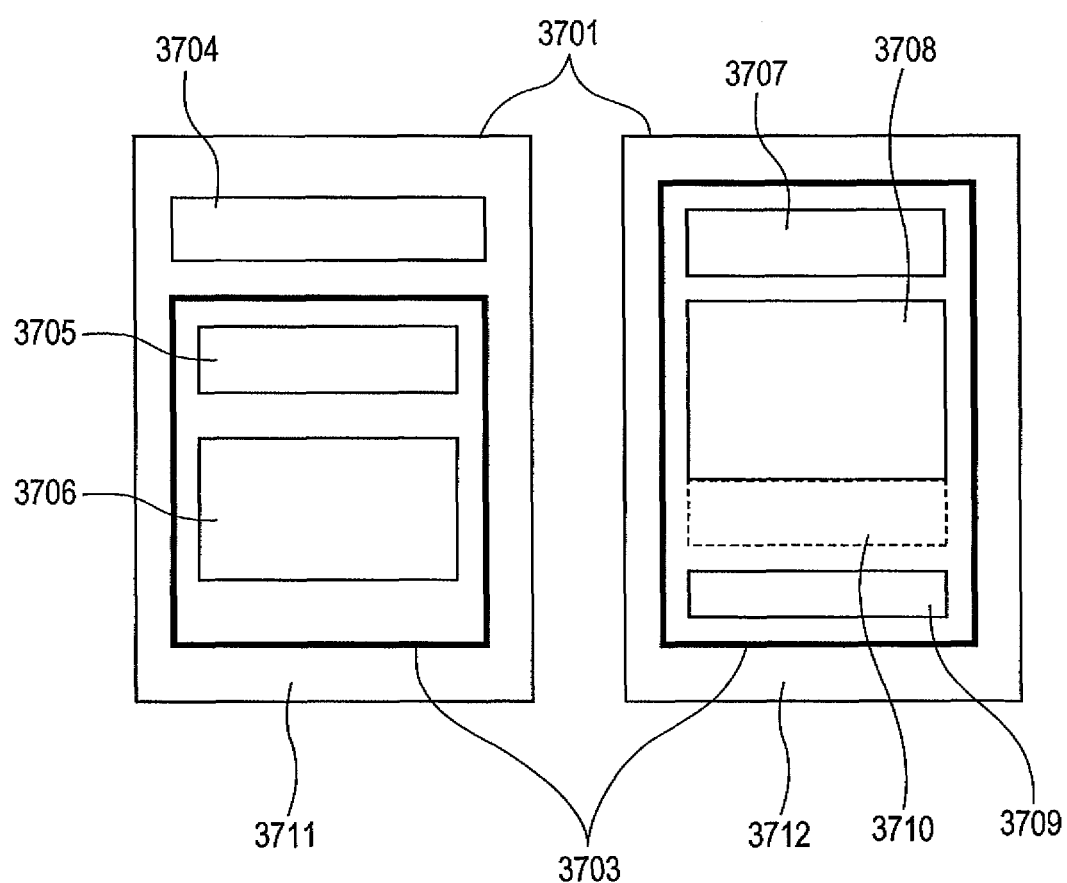
FIG. 38 illustrates a layout after the gaps between sub templates on a page are reduced when a "Page" field is checked.

FIGS. 36-38 illustrate the layouts after a relayout process in a normal print mode according to this embodiment is carried out for the layout shown in FIG. 35. In the relayout process, a distance between sub templates is changed (reduced).

In FIGS. 36-38, similar objects to those illustrated and described in relation to FIG. 35 are designated by similar reference numerals, and therefore, descriptions are not repeated.

FIG. 36 illustrates a layout after the gaps between the sub templates on all pages are reduced when the "All Pages" field is checked. In the relayout process, the gaps between all the templates 3705 to 3708 are reduced using the adjustment width set in the gap setting dialog window 2401 shown in FIG. 24 so that the sub template 3709 laid out on the page 3713 is moved to the page 3712, which is the second page.

According to this process, the distances between all the sub templates on all the pages can be evenly changed so that a relayout process can be carried out while maintaining the balance at layout start time.

FIG. 37 illustrates a layout after the distances between the sub templates on pages specified in the "Selection Page Range" field are reduced. In FIG. 37, the second page 3712 is the page that the use specified. The distance between the sub templates 3707 and 3708 located on the page 3712 before the relayout process is carried out is reduced so that the sub template 3709 is laid out on the page 3712.

According to this relayout process, the distances between the sub templates on only pages that a user specified are changed so that a relayout process can be carried out just as the user designed.

FIG. 38 illustrates a layout after the distances between the sub templates on a page specified in the "Corresponding Page" field are reduced. The distance between the sub templates 3707 and 3708 located on the page 3712, which is a page immediately before the last page 3713 (the third page when the relayout is not carried out), is reduced so that the sub template 3709 is laid out on the page 3712.

If only a sub template having an area less than or equal to the threshold value is laid out on the last page, the sub template on the last page can be laid out on the page immediately before the last page by reducing the distance between the sub templates on the page immediately before the last page. Accordingly, the need for the page required for one sub template can be eliminated.

Second Exemplary Embodiment

A second exemplary embodiment of the present invention is now herein described. According to the second embodiment, unlike the first exemplary embodiment, the layout process is not automatically carried out. A user selects a position at which gap adjustment is applied using a user interface, such as a mouse, to carry out a relayout process.

The manual gap adjustment according to this embodiment is effective regardless of the print settings. However, in this embodiment, a normal print setting is applied.

FIGS. 39A-C illustrate a document template according to this embodiment.

FIG. 39A illustrates a document template when contents are inserted into a container defined in the document template and the relayout process shown in FIG. 8 is carried out. In FIG. 39A shown are a document 3901, pages 3912 to 3914, a flow area 3903 for a multi-record, a container 3904, and sub templates 3905 to 3909, and an area 3910 surrounded by a dotted line indicating the expanded area of the sub template 3908 when the sub template 3908 is inserted with content data and is laid out, and a mouse cursor 3911. In FIGS. 39A-C, the same objects are designated by the same reference numerals.

FIG. 39B illustrates the operation of a mouse to change the distance between sub templates manually according to this embodiment. In FIG. 39B, a mouse pointer 3911 is operated to move the sub template 3908 upwards. As a result, in accordance with the mouse operation, the sub template 3908 moves upwards.

FIG. 39C illustrates the sub templates after the distance between the sub templates is manually changed according to this embodiment. In FIG. 39C, the sub template 3908 is operated to move upwards so that the distance between the sub templates 3907 and 3908 is reduced. As a result, the sub template 3909 laid out on the page 3914, which is a third page, is laid out on the page 3913, which is a second page.

According to the second embodiment, a user can carry out the relayout process while monitoring the desired sub template visually. Therefore, the user can carry out the relayout process just as the user designed.

In the above-described embodiments, the relayout process is carried out by changing a distance between sub templates. However, the present invention is not limited thereto. For example, a sub template can be considered to be a container (data area) into which content data is inserted in order to achieve the present invention and solves the problems. That is, in an information processing apparatus (layout determination method) according to the present invention, the distances between containers may also be changed. That is, according to the present invention, an area into which content data is inserted refers to a data area into which content data is inserted or a sub template area in which the data area is arranged, and a relayout process is carried out by changing the distance between the areas. Additionally, when the relayout process according to the present invention is carried out, a distance between sub template areas arranged in a flow area of a page different from the page specified in the dialog window shown in FIG. 25 may be changed in order not to change a distance between areas outside the flow area. According to the present invention, a printout having a well-balanced appearance can be provided. Furthermore, wasted print costs can be prevented.

The present invention can also be achieved by supplying a storage medium (or a recoding medium) storing software program code that achieves the functions of the above-described embodiments to a system or an apparatus and by causing a computer (central processing unit (CPU) or microprocessing unit (MPU)) of the system or apparatus to read and execute the software program code.

In such a case, the program code itself read out of the storage medium realizes the functions of the above-described embodiments. Therefore, the storage medium storing the program code can also realize the present invention. The functions of the above-described embodiments can be realized by another method in addition to executing the program code read out by the computer. For example, the functions of the above-described embodiments can be realized by a process in which an operating system (OS) running on the computer executes some of or all of the functions in the above-described embodiments under the control of the program code.

The present invention can also be achieved by writing the program code read out of the storage medium to a memory of an add-on expansion board of a computer or a memory of an add-on expansion unit connected to a computer. The functions of the above-described embodiments can be realized by a process in which, after the program code is written, a CPU in the add-on expansion board or in the add-on expansion unit executes some of or all of the functions in the above-described embodiments under the control of the program code.

The present invention can also be achieved by distributing program code that achieves the function of the above-described embodiment via a network and storing the program code in a storage device such as a hard disk and a memory of a system or an apparatus or a recording medium including a CD-RW (CD-rewritable) and a CD-R (CD recordable) and by a computer (CPU or MPU) of the system or the apparatus reading out the program code stored in the storage means or the recording medium and executing the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An information processing apparatus with a processor, the information processing apparatus comprising:
a display control unit displaying, using the processor, a definition screen to define a page range;
a definition unit defining, using the processor, a plurality of pages as the page range of a changing target in accordance with an instruction input via the definition screen by a user;
a reducing unit reducing a distance between objects arranged on a first page included in the page range to a predetermined distance, thereby generating a space of the first page, wherein the reducing unit does not reduce a distance between objects arranged on other pages except for the page range, and wherein the reducing unit does not reduce sizes of objects;
an arranging unit performing arranging processing to arrange an object of a second page following the first page in the space of the first page generated by the reducing unit; and
an eliminating unit eliminating the second page if the arranging unit arranges all objects of the second page in the space of the first page generated by the reducing unit.

2. The information processing apparatus according to claim 1,
wherein the changing target is either the page range or all pages input via the definition screen.

3. The information processing apparatus according to claim 1,
wherein the definition screen is provided by a layout editing application.

4. The information processing apparatus according to claim 1,
wherein the predetermined distance is set by a user.

5. An information processing method comprising:
displaying, using a processor, a definition screen to define a page range;
defining, using the processor, a plurality of pages as the page range of a changing target in accordance with an instruction input via the definition screen by a user;
reducing a distance between objects arranged on a first page included in the page range to a predetermined distance, thereby generating a space of the first page, wherein the reducing does not reduce a distance between objects arranged on other pages except for the page range, and wherein the reducing does not reduce sizes of objects;
performing arranging processing to arrange an object of a second page following the first page in the space of the first page generated by the reducing; and
eliminating the second page if the arranging arranges all objects of the second page in the space of the first page generated by the reducing.

6. The information processing method according to claim 5,
wherein the changing target is either the page range or all pages input via the definition screen.

7. The information processing method according to claim 5,
wherein the definition screen is provided by a layout editing application.

8. The information processing method according to claim 5,
wherein the predetermined distance is set by a user.

9. A non-transitory computer-readable medium storing a program for causing a computer with a processor to execute an information processing method comprising:
displaying, using a processor, a definition screen to define a page range;
defining, using the processor, a plurality of pages as the page range of a changing target in accordance with an instruction input via the definition screen by a user;
reducing a distance between objects arranged on a first page included in the page range to a predetermined distance, thereby generating a space of the first page, wherein the reducing does not reduce a distance between objects arranged on other pages except for the page range, and wherein the reducing does not reduce sizes of objects;
performing arranging processing to arrange an object on a second page following the first page in the space of the first page generated by the reducing; and
eliminating the second page if the arranging arranges all objects of the second page in the space of the first page generated by the reducing.

10. The computer-readable medium according to claim 9,
wherein the changing target is either the page range or all pages input via the definition screen.

11. The computer-readable medium according to claim 9,
wherein the definition screen is provided by a layout editing application.

12. The computer-readable medium according to claim 9,
wherein the predetermined distance is set by a user.

\* \* \* \* \*